United States Patent
Cha et al.

(10) Patent No.: US 10,630,366 B2
(45) Date of Patent: Apr. 21, 2020

(54) METHOD FOR REPORTING CHANNEL STATE INFORMATION IN WIRELESS COMMUNICATION SYSTEM AND APPARATUS THEREFOR

(71) Applicant: LG Electronics Inc., Seoul (KR)

(72) Inventors: Hyunsu Cha, Seoul (KR); Jiwon Kang, Seoul (KR); Kijun Kim, Seoul (KR); Jonghyun Park, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/344,281

(22) PCT Filed: Jun. 15, 2018

(86) PCT No.: PCT/KR2018/006791
§ 371 (c)(1),
(2) Date: Apr. 23, 2019

(87) PCT Pub. No.: WO2018/231011
PCT Pub. Date: Dec. 20, 2018

(65) Prior Publication Data
US 2019/0273544 A1    Sep. 5, 2019

Related U.S. Application Data

(60) Provisional application No. 62/571,305, filed on Oct. 12, 2017, provisional application No. 62/569,601, (Continued)

(51) Int. Cl.
*H04B 7/06* (2006.01)
*H04L 5/00* (2006.01)
(Continued)

(52) U.S. Cl.
CPC .............. *H04B 7/0626* (2013.01); *H04B 7/06* (2013.01); *H04L 1/00* (2013.01); *H04L 1/16* (2013.01); *H04L 5/00* (2013.01); *H04L 5/0048* (2013.01)

(58) Field of Classification Search
CPC ....... H04B 7/0626; H04B 7/06; H04L 5/0048; H04L 1/00; H04L 1/16; H04L 5/00
See application file for complete search history.

(56) References Cited

U.S. PATENT DOCUMENTS

| | | | |
|---|---|---|---|
| 2012/0155414 A1* | 6/2012 | Noh | H04B 7/0417 370/329 |
| 2016/0013906 A1* | 1/2016 | Guo | H04L 5/0048 370/329 |
| 2017/0202014 A1* | 7/2017 | Moon | H04B 7/0626 |

FOREIGN PATENT DOCUMENTS

| | | | |
|---|---|---|---|
| KR | 1020140099238 | | 8/2014 |
| WO | WO2018058456 | * | 9/2016 |
| WO | WO2017039399 | | 3/2017 |

OTHER PUBLICATIONS

Catt, "Discussion on CSI-RS for CSI acquisition", R1-1707485, 3GPP TSG RAN WG1 Meeting #89, Hangzhou, P.R. China, May 15-19, 2017, 6 pags.

(Continued)

*Primary Examiner* — Sophia Vlahos
(74) *Attorney, Agent, or Firm* — Fish & Richardson P.C.

(57) ABSTRACT

The present disclosure provides a method for reporting channel state information (CSI) in a wireless communication system.
Specifically, a method for reporting, by a user equipment (UE), channel state information (CSI) in a wireless communication system includes: receiving, from a base station, control information related to a configuration of a channel state information reference signal (CSI-RS) resource,
(Continued)

wherein the control information includes CDM type information representing a type of code division multiplexing (CDM) applied to the CSI-RS resource; receiving, from the base station, an X-port CSI-RS on one or more component CSI-RS resource element (RE) patterns; and reporting, to the base station, the CSI based on the received X-port CSI-RS.

Accordingly, the present disclosure can flexibly provide CSI-RS resource locations.

14 Claims, 40 Drawing Sheets

Related U.S. Application Data filed on Oct. 8, 2017, provisional application No. 62/560,109, filed on Sep. 18, 2017, provisional application No. 62/544,767, filed on Aug. 11, 2017, provisional application No. 62/542,815, filed on Aug. 9, 2017, provisional application No. 62/521,371, filed on Jun. 16, 2017, provisional application No. 62/520,545, filed on Jun. 15, 2017.

(51) Int. Cl.
*H04L 1/00* (2006.01)
*H04L 1/16* (2006.01)

(56) References Cited

OTHER PUBLICATIONS

Ericsson, "On CSI-RS design", R1-1702690, 3GPP TSG-RAN WG1 #88, Athens, Greece, Feb. 13-17, 2017, 11 pages.
Ericsson, "On CSI-RS Design", R1-1705900, 3GPP TSG-RAN WG1 #88bis, Spokane, WA, Apr. 3-7, 2017, 8 pages.
Samsung, "Discussions on fine time/frequency tracking for NR", R1-1707980, 3GPP TSG RAN WG1 Meeting #88bis, Hangzhou, China, May 15-19, 2017, 10 pages.
Qualcomm Incorporated, "Discussion on CSI-RS Design", R1-1708594, 3GPP TSG RAN WG1 #89, Hangzhou, China, May 15-19, 2017, 8 pages.

* cited by examiner (a)

(b)

(a)

(b)

24 ports, N=2

24 ports, N=4

32 ports, N=4

CDM Group 1
CDM Group 2
CDM Group 3
CDM Group 4

3910  3911

3920  3921

3930

3940

METHOD FOR REPORTING CHANNEL STATE INFORMATION IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/006791, filed on Jun. 15, 2018, which claims the benefit of U.S. Provisional Application No. 62/571,305, filed on Oct. 12, 2017, U.S. Provisional Application No. 62/569,601, filed on Oct. 8, 2017, U.S. Provisional Application No. 62/560,109, filed on Sep. 18, 2017, U.S. Provisional Application No. 62/544,767, filed on Aug. 11, 2017, U.S. Provisional Application No. 62/542,815, filed on Aug. 9, 2017, U.S. Provisional Application No. 62/521,371, filed on Jun. 16, 2017, and U.S. Provisional Application No. 62/520,545, filed on Jun. 15, 2017. The disclosures of the prior applications are incorporated by reference in their entirety.

TECHNICAL FIELD

The present disclosure relates to a wireless communication system and, more specifically, to a method for reporting channel state information (CSI) and an apparatus supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of the present disclosure is to provide a method for flexibly providing a start RE position of a component CSI-RS RE pattern used for CSI-RS transmission for acquisition of CSI.

In addition, an object of the present disclosure is to provide a method of applying CDM to each component CSI-RS RE pattern such that full power utilization can be used for CSI-RS transmission.

Furthermore, the present disclosure provides information representing usage of a CSI-RS through higher layer signaling.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present disclosure provides a method for reporting CSI in a wireless communication system.

Specifically, a method for reporting, by a user equipment (UE), channel state information (CSI) in a wireless communication system includes: receiving, from a base station, control information related to a configuration of a channel state information reference signal (CSI-RS) resource, wherein the control information includes CDM type information representing a type of code division multiplexing (CDM) applied to the CSI-RS resource; receiving, from the base station, an X-port CSI-RS on one or more component CSI-RS resource element (RE) patterns; and reporting, to the base station, the CSI based on the received X-port CSI-RS, wherein each of the one or more component CSI-RS RE patterns includes at least one RE to which the CDM type represented by the CDM type information is applied, wherein a number of one or more component CSI-RS RE patterns is determined by the X value and a length of the CDM, and wherein the X value is a number of CSI-RS antenna ports.

Further, in the present disclosure, the number of one or more component CSI-RS RE patterns may be X/L, and L may be the length of the CDM.

Further, in the present disclosure, the number of the one or more component CSI-RS RE patterns may be 8, and the type of the CDM may be CDM-4 if the X value is 32.

Further, in the present disclosure, 4 component CSI-RS RE patterns may be present in a first resource region and a second resource region, respectively.

Further, in the present disclosure, starting subcarrier locations of four component CSI-RS RE patterns included in each resource region may be different from each other, and starting symbol locations of the four component CSI-RS RE patterns may be the same.

Further, in the present disclosure, a starting subcarrier location of a first component CSI-RS RE pattern included in the first resource region and a starting subcarrier location of a second component CSI-RS RE pattern included in the second resource region may be the same.

Further, in the present disclosure, starting subcarrier locations of the one or more component CSI-RS RE patterns may be represented as a bitmap.

Further, in the present disclosure, the method may further include: receiving, from the base station, tracking reference signal (TRS) information representing whether the CSI-RS is used for a time and frequency tracking.

Further, in the present disclosure, the TRS information may be configured such that the CSI-RS is not used for the time and frequency tracking.

Further, A user equipment (UE) for reporting channel state information (CSI) in a wireless communication system includes: a radio frequency (RF) module configured to transmit and receive a wireless signal; and a processor functionally connected to the RF module and configured to: receive, from a base station, control information related to a configuration of a channel state information reference signal (CSI-RS) resource, wherein the control information includes CDM type information representing a type of CDM (Code Division Multiplexing) applied to the CSI-RS resource; receive, from the base station, an X-port CSI-RS on one or more component CSI-RS resource element (RE) patterns; and report, to the base station, the CSI based on the received X-port CSI-RS, wherein each of the one or more component CSI-RS RE patterns includes at least one RE to which the CDM type represented by the CDM type information is applied, wherein a number of one or more component CSI-RS RE patterns are determined by the X value and a length of the CDM, and wherein the X value is a number of CSI-RS antenna ports.

Advantageous Effects

The present disclosure can flexibly provide a start RE position of a component CSI-RS RE pattern used for CSI-RS transmission for acquisition of CSI.

In addition, the present can apply CDM to each component CSI-RS RE pattern such that full power utilization can be used for CSI-RS transmission.

Furthermore, the present disclosure provides information representing usage of a CSI-RS through higher layer signaling.

It will be appreciated by persons skilled in the art that the effects that can be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR CARRYING OUT THE INVENTION

Figure 1:
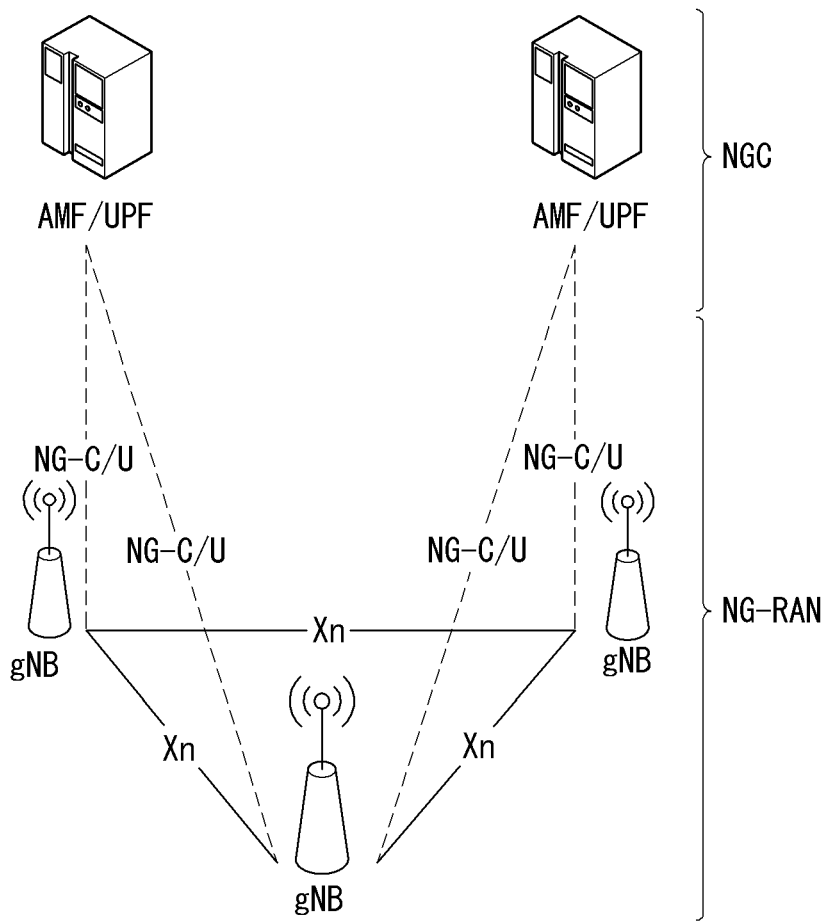
FIG. 1 is a diagram showing an example of an overall system structure of NR to which a method proposed in the present disclosure can be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s = 1/(\Delta f_{max} \cdot N_f)$. In this case, $\Delta_{max} = 480 \cdot 10^3$, and $N_f = 4096$ DL and UL transmission is configured as a radio frame having a section of $T_f = (\Delta f_{max} N_f/100) \cdot T_s = 10$ ms. The radio frame is composed of ten subframes each having a section of $T_{sf} = (\Delta f_{max} N_f/1000) \cdot T_s = 1$ ms. In this case, there may be a set of UL frames and a set of DL frames.

Figure 2:
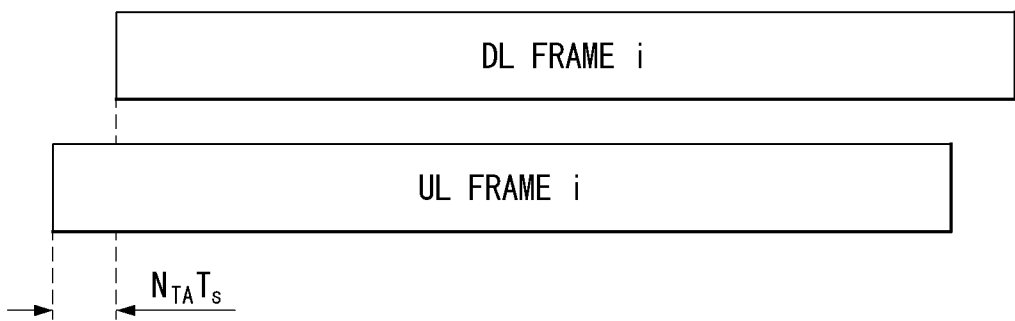
FIG. 2 shows a relationship between an uplink frame and a downlink frame in a wireless communication system to which the method proposed in the present disclosure can be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA} = N_{TA} T_s$ before the start of a corresponding DL frame in the UE.

Regarding the numerology µ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology µ, and Table 3 shows the number of OFDM symbols per slot for an extended CP in the numerology µ.

TABLE 2

| | Slot configuration | | | | | |
|---|---|---|---|---|---|---|
| | 0 | | | 1 | | |
| µ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| µ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
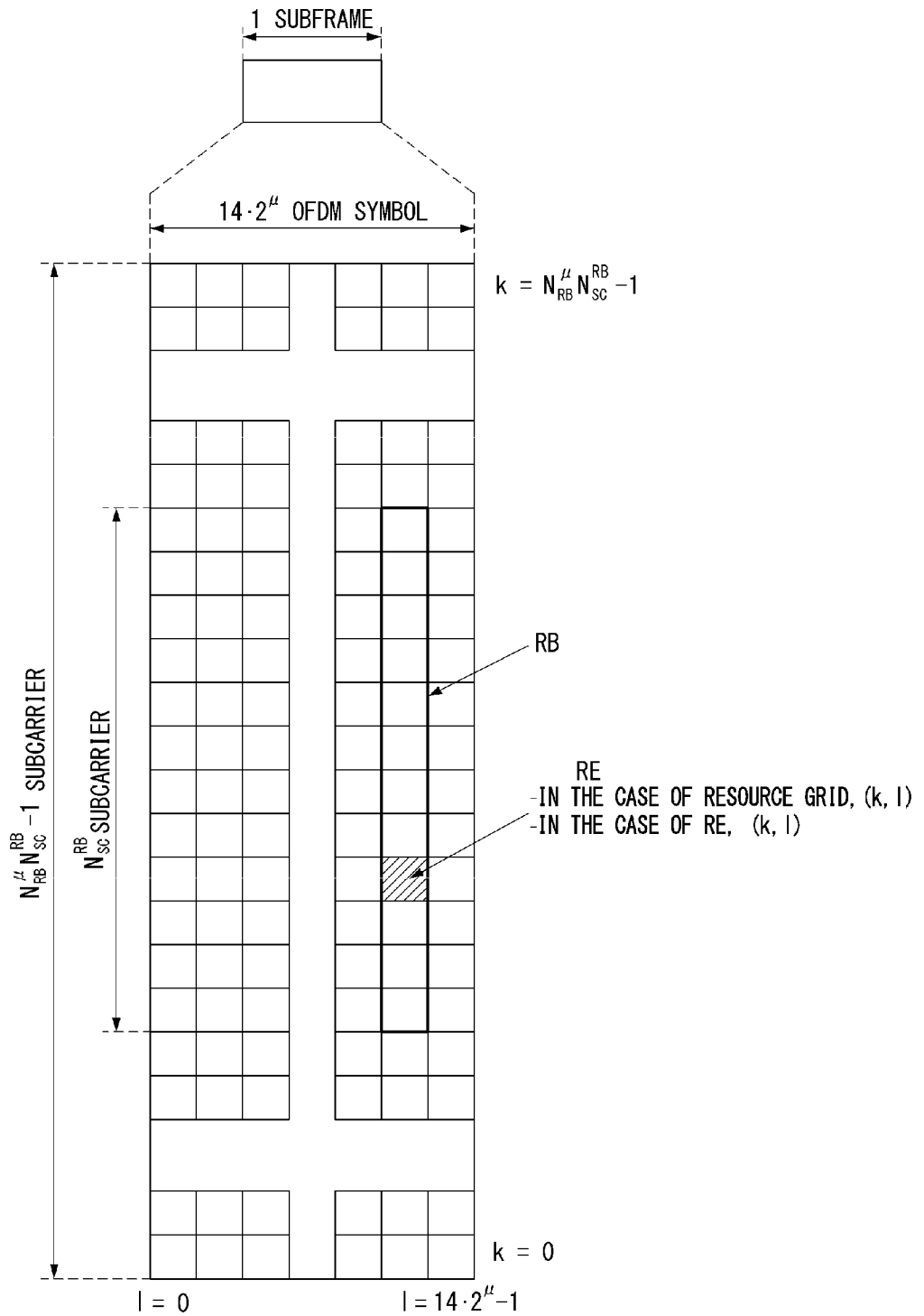
FIG. 3 shows an example of a resource grid supported by a wireless communication system to which the method proposed in the present disclosure can be applied.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of $14.2\mu$ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology $\mu$ and an antenna port p.

Each element of the resource grid for the numerology $\mu$ and the antenna port p is indicated as a resource element, and may be uniquely identified by an index pair (k,l̄). Herein, $k=0, \ldots, N_{RB}^{\mu} N_{sc}^{RB}-1$ is an index in the frequency domain, and $\bar{l}=0, \ldots, 2^{\mu} N_{symb}^{(\mu)}-1$ indicates a location of a symbol in a subframe. To indicate a resource element in a slot, the index pair (k,l̄) is used. Herein, $l=0, \ldots, N_{symb}^{\mu}-1$.

The resource element (k,l̄) for the numerology $\mu$ and the antenna port p corresponds to a complex value $a_{k,\bar{l}}^{(p,\mu)}$. When there is no risk of confusion or when a specific antenna port or numerology is specified, the indexes p and $\mu$ may be dropped and thereby the complex value may become $a_{k,\bar{l}}^{(p)}$ or $a_{k,\bar{l}}$.

In addition, a physical resource block is defined as $N_{RB}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

Figure 4:
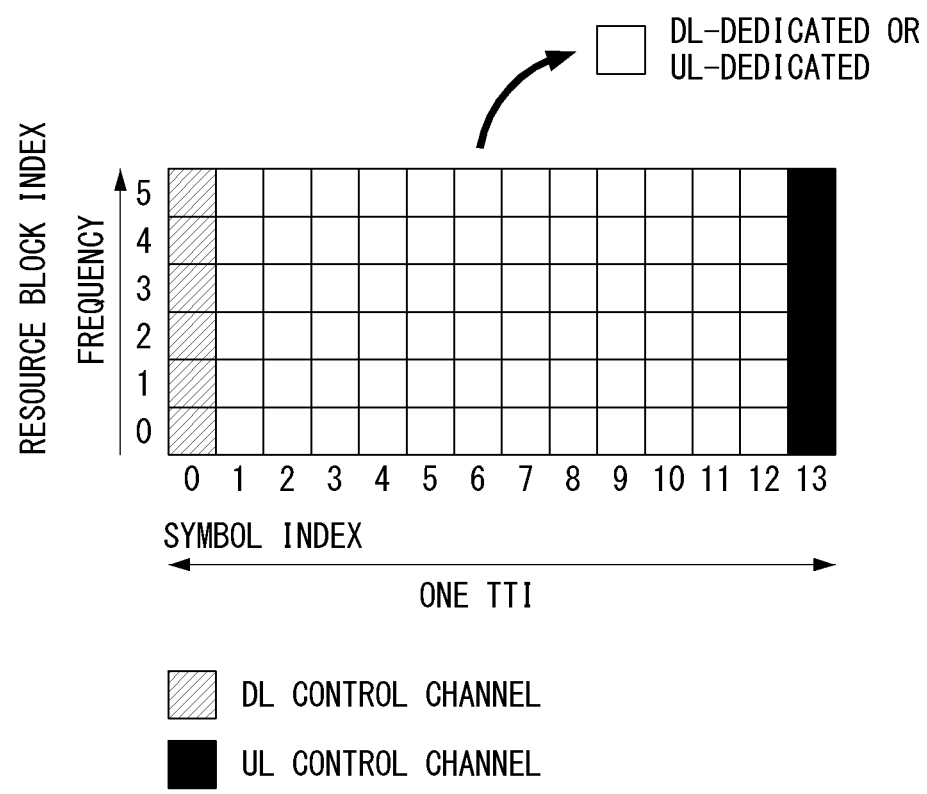
FIG. 4 shows an example of a self-contained subframe structure to which the method proposed in the present disclosure can be applied.

FIG. 4 is a diagram illustrating a self-contained subframe structure in a wireless communication system to which the present invention can be applied.

To minimize transmission latency in TDD systems, 5G (5 generation) new RAT consider a self-contained subframe structure as shown in FIG. 4.

In FIG. 4, a hatched region (symbol index 0) represents a downlink (DL) control region and a block region (symbol index 13) represents an uplink (UL) control region. Blank regions may be used for DL data transmission or UL data transmission. This structure has characteristics that DL transmission and UL transmission are sequentially performed in one subframe and thus DL data can be transmitted and UL ACK/NACK can be received within a subframe. Consequently, a time taken until data retransmission when a data transmission error is generated, and thus latency of final data delivery can be minimized.

In such a self-contained subframe structure, a time gap for a process of switching from a transmission mode to a reception mode or a process of switching from a reception mode to a transmission in an eNB and a UE is required. To this end, some OFDM symbols at a time when DL switches to UL is set to a guard period (GP) in the self-contained subframe structure.

Analog Beamforming

Millimeter waves (mmW) have short wavelengths and thus a large number of antenna elements can be installed in the same area. That is, 30 GHz has a wavelength of 1 cm and a total of 64 (8×8) antenna elements can be arranged at an interval of 0.5λ (i.e., wavelength) in a 2-dimensional array form on a panel having a size of 4×4 cm. Accordingly, a beamforming (BF) gain is increased to enhance coverage or throughput using a plurality of antenna elements in mmW.

In this case, if a transceiver unit (TXRU) is provided to control transmission power and phase per antenna element, independent beamforming for each frequency resource can be performed. However, installation of TXRUs for all of about 100 antenna elements deteriorates effectiveness in terms of price. Accordingly, a method of mapping a plurality of antenna elements to one TXRU and controlling a beam direction using an analog phase shifter is considered. Such an analog BF method can generate only one beam direction in the entire band and thus cannot perform frequency selective BF.

Hybrid beamforming (BF) that is a hybrid of digital BF and analog BF and has a number B of TXRUs, which is less than a number Q of antenna elements can be considered. In this case, the number of directions of beams that can be simultaneously transmitted is limited to B or less although it depends on a method of connecting the B TXRUs to the Q antenna elements.

Hereinafter, typical examples of methods of connecting TXRUs to antenna elements will be described.

Figure 5:
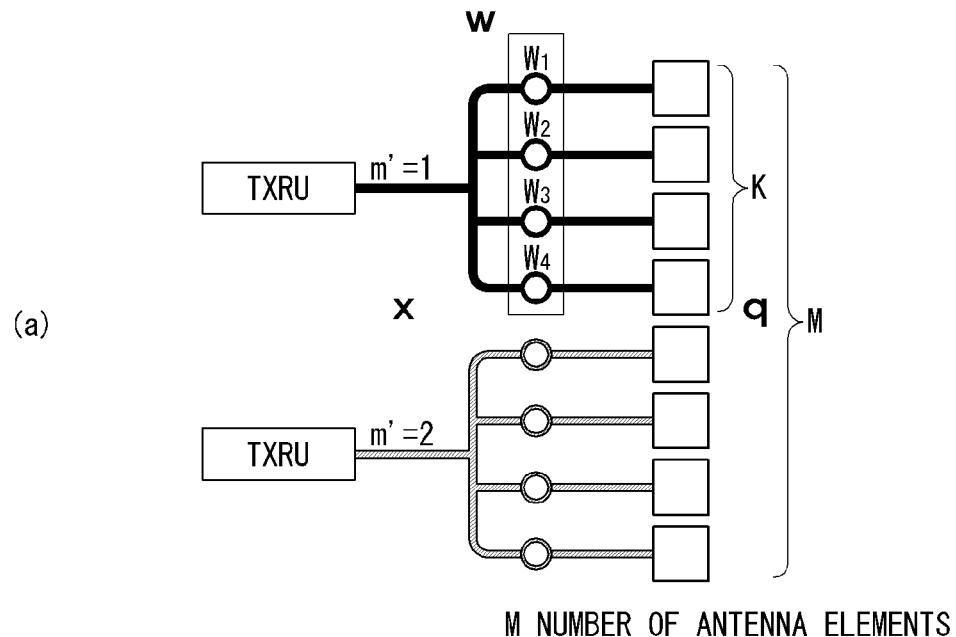
FIG. 5 illustrates a transceiver unit model in a wireless communication system to which the present invention can be applied.
Figure 5:
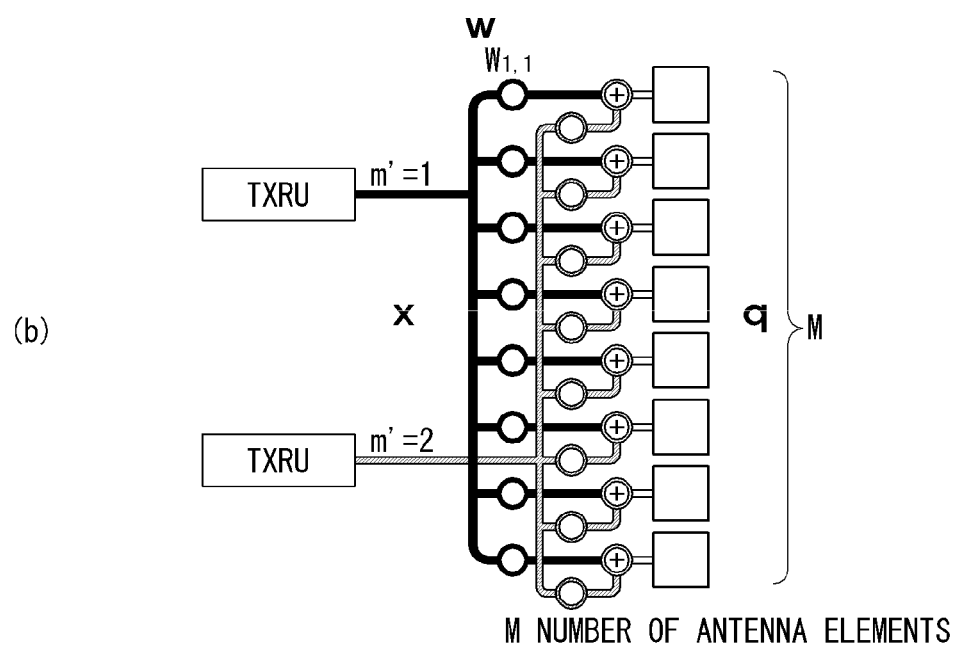

FIG. 5 illustrates a transceiver unit model in a wireless communication system to which the present invention is applicable.

A TXRU virtualization model represents a relationship between output signals of TXRUs and output signals of antenna elements. The TXRU virtualization model can be divided into TXRU virtualization model option-1: sub-array partition model, as shown in FIG. 5(a) and TXRU virtualization model option-2: full-connection model, as shown in FIG. 5(b) according to correlation between antenna elements and TXRUs.

Referring to FIG. 5(a), in the case of the sub-array partition model, antenna elements are divided into multiple antenna element groups and each TXRU is connected to one of the groups. In this case, an antenna element is connected to only one TXRU.

Referring to FIG. 5(b), in the case of the full-connection model, multiple TXRU signals are combined and delivered to a single antenna element (or an array of antenna elements). That is, this model indicates that TXRUs are connected to all antenna elements. In this case, antenna elements are connected all TXRUs.

In FIG. 5, q is a transmission signal vector of M co-polarized antenna elements in one column. w is a wideband TXRU virtualization weight vector and W represents a phase vector multiplied by an analog phase shifter. That is, an analog beamforming direction is determined by W. x is a signal vector of M_TXRU TXRUs.

Here, antenna ports and TXRUs may be mapped one-to-one or one-to-many.

In FIG. 5, TXRU-to-element mapping is an example and the present invention is not limited thereto and can be equally applied to TXRU-to-element mapping that can be realized in various manners.

Further, when multiple antennas are used in NewRAT system, a hybrid beamforming technique that is a hybrid of digital beamforming and analog beamforming has emerged. Here, analog beamforming (or radio frequency (RF) beam-forming) refers to an operation of performing precoding (or combining) at an RF stage. In hybrid beamforming, a baseband state and an RF stage respectively perform precoding (or combining) and thus it is possible to obtain performance close to digital beamforming while reducing the number of RF chains and digital-to-analog (or analog-to-digital) converters. A hybrid beamforming structure may be represented by N transceiver units (TXRUs) and M physical antennas for convenience. Then, digital beamforming for L data layers to be transmitted by a transmission end can be represented by an N×L matrix, and N converted digital signals is converted into analog signals through TXRUs and then analog beamforming represented by an ML matrix is applied thereto.

Figure 6:
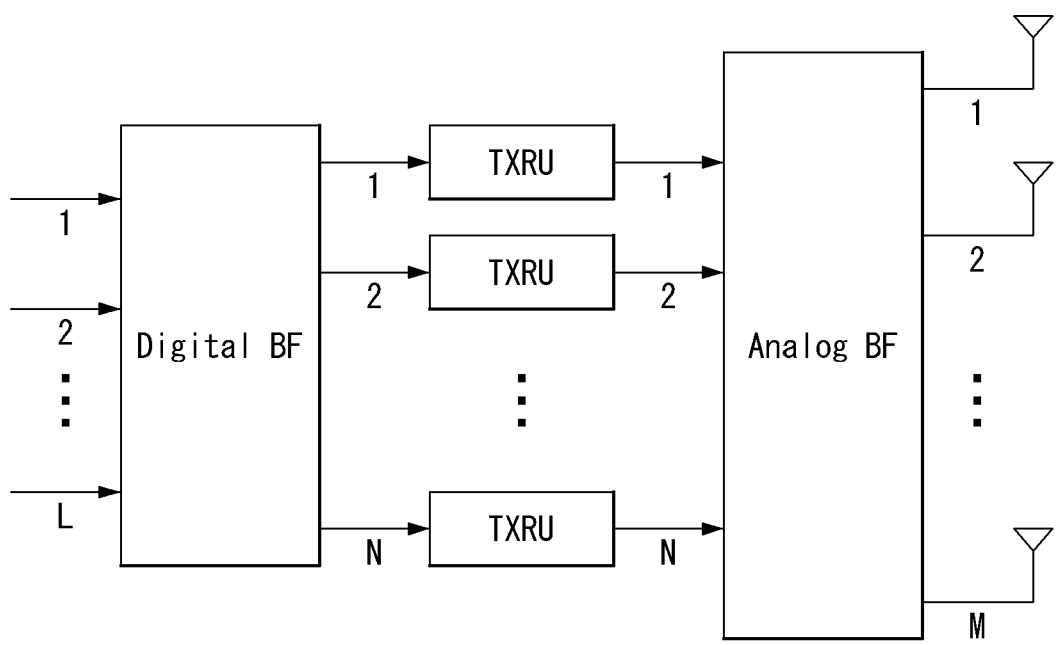
FIG. 6 is a diagram illustrating a hybrid beamforming structure from the viewpoint of a TXRU and physical antennas in a wireless communication system to which the present invention can be applied.

FIG. 6 is a diagram illustrating a hybrid beamforming structure from the viewpoint of TXRUs and physical antennas in a wireless communication system to which the present invention is applicable.

FIG. 6 illustrates a case in which the number of digital beams is L and the number of analog beams is N.

In NewRAT system, an eNB designs analog beamforming such that the analog beamforming can be changed in units of symbol to support more efficient beamforming to UEs located in a specific area. Furthermore, when N specific TXRUs and M RF antennas are defined as one antenna panel in FIG. 6, NewRAT system even considers introduction of a plurality of antenna panels capable of applying independent hybrid beamforming.

Channel State Information (CSI) Feedback

In GPP LTE/LTE-A system, a UE is defined to report channel state information (CSI) to a base station (BS or eNB).

CSI commonly refers to information that can represent quality of a radio channel (or link) formed between a UE and an antenna port. For example, a rank indicator (RI), a precoding matrix indicator (PMI), a channel quality indicator (CQI) and the like correspond to the CSI.

Here, the RI indicates channel rank information and refers to the number of streams received by a UE through the same time-frequency resources. This value is determined depending on long-term fading of a channel and thus it is fed back from a UE to a BS having a longer period than the PMI and the CQI, in general. The PMI is a value reflecting channel space characteristics and indicates a precoding index preferred by a UE on the basis of metric such as a signal-to-interference-plus-noise ratio (SINR). The CQI is a value indicating channel intensity and refers to a reception SINR that can be obtained when a BS uses a PMI.

In 3GPP LTE/LTE-A system, a BS may configure a plurality of CSI processes for a UE and receive a report on CSI with respect to each process. Here, a CSI process is composed of a CSI-RS for signal quality measurement from a BS and CSI-interference measurement (CSI-IM) for interference measurement.

Reference Signal (RS) Virtualization

In mmW, a PDSCH can be transmitted in only one analog beam direction at a time according to analog beamforming. In this case, data can be transmitted from a BS to only a small number of UEs located in the corresponding direction. Accordingly, it is possible to simultaneously transmit data to a plurality of UEs located in a plurality of analog beam directions by setting different analog beam directions for antenna ports.

Figure 7:
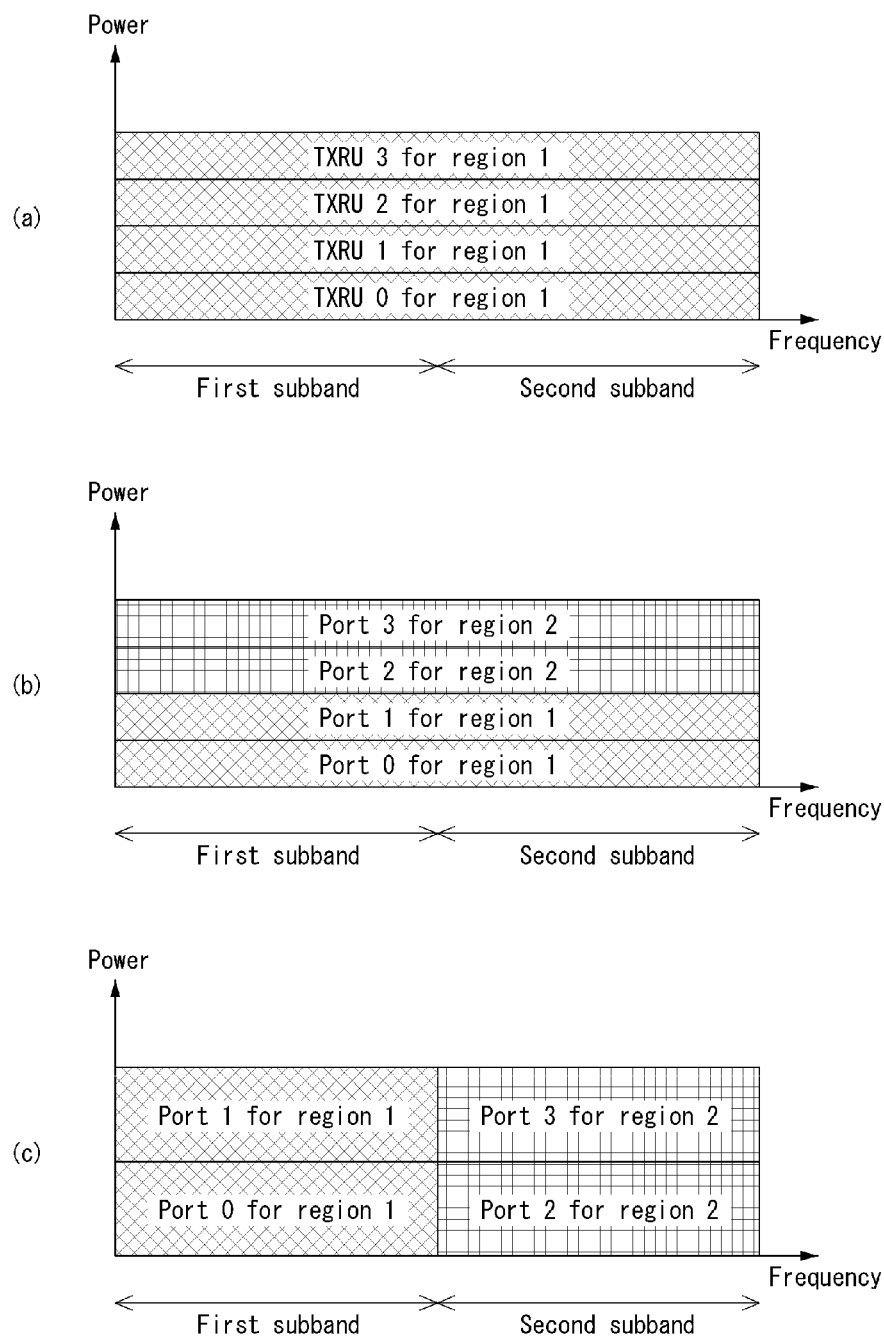
FIG. 7 is a diagram illustrating a service region per transceiver unit in wireless communication system to which the present invention can be applied.

FIG. 7 is a diagram illustrating a service region per transceiver unit in a wireless communication system to which the present invention is applicable.

In FIG. 7, a structure in which 256 antenna elements are divided into four groups to form four sub-arrays and TXRUs are connected to the sub-arrays as shown in FIG. 5 is described as an example.

If each sub-array includes 64 (8×8) antenna elements in a 2-dimensional arrangement form, an area corresponding to a region of a horizontal angle of 15° and a region of a vertical angle of 15° can be covered according to specific analog beamforming. That is, an area to which a BS needs to provide a service is divided into a plurality of regions and the service is provided to the regions one by one.

In the following description, it is assumed that CSI-RS antenna ports are one-to-one mapped to TXRUs. Accordingly, the same applies to antenna ports and TXRUs in the following description.

When all TXRUs (antenna ports, sub-array) (i.e., TXRUs 0, 1, 2 and 3) have the same analog beamforming direction (i.e., region 1), as shown in FIG. 7(a), a digital beam having higher resolution can be formed to increase the throughput of the corresponding area. Further, the rank of data transmitted to the corresponding area can be increased to enhance the throughput of the corresponding area.

If the TXRUs (antenna ports, sub-array) (i.e., ports 0, 1, 2 and 3) have different analog beamforming directions (i.e., region 1 and region 2), as shown in FIGS. 7(b) and 7(c), data can be transmitted to UEs distributed in a wider area in the corresponding subframe (SF).

As shown in the examples of FIGS. 7(b) and 7(c), two of four antenna ports are used for PDSCH transmission to UE1 located in region 1 and the remaining two antenna ports are used for PDSCH transmission to UE2 located in region 2.

Particularly, FIG. 7(b) shows an example in which PDSCH1 transmitted to UE1 and PDSCH2 transmitted to UE2 are spatial-division-multiplexed (SDM). Alternatively, PDSCH1 transmitted to UE1 and PDSCH2 transmitted to UE2 may be frequency-division-multiplexed (FDM) and transmitted as shown in FIG. 7(c).

To maximize cell throughput, a preferred method may change between a method of serving one region using all antenna ports and a method of dividing antenna ports and simultaneously serving multiple regions according to ranks and modulation and coding schemes (MCSs) provided to UEs. Further, the preferred method may change according to the quantity of data to be transmitted to each UE.

A BS calculates cell throughput or scheduling metric that can be obtained when one region is served using all antenna ports and calculates cell throughput or scheduling metric that can be obtained when antenna ports are divided and two regions are served. The BS can compare cell throughputs and scheduling metrics that can be obtained through the respective methods to select a final transmission method. Consequently, the number of antenna ports participating in PDSCH transmission can change SF by SF. In order for the BS to calculate a transmission MCS for the PDSCH according to the number of antenna ports and apply a scheduling algorithm, CSI feedback from a UE suitable therefor is required.

In the following, a CSI-RS design method for CSI acquisition in NR (New Radio) will be described.

For at least CSI acquisition,
For N=2 OFDM symbols, neighboring OFDM symbols for one CSI-RS resource are supported.
For N=4 OFDM symbols, down-selection between 2 and 4 is performed for a minimum number of neighboring OFDM symbols for one CSI-RS resource.
For at least CSI acquisition, a uniform RE mapping pattern in which the same subcarriers are occupied by each symbol of one CSI-RS resource is supported for N=2 OFDM symbols.
At least OCC is supported as a CDM sequence type.
CDM of CSI-RS antenna ports on RE-level comb based on a cyclic shift sequence
When X=32, at least CDM 8 for at least X-port CSI-RS resource is supported. Here, X I the number of antenna ports.
With respect to X-port CSI-RS resource, density D21 RE/port/PRB is supported for at least X=1.
When density D=1 RE/port/PRB and X>4 for at least CSI acquisition,
X=8, 12 ports are supported in the case of N=1 OFDM symbol.
X=8, 12, 16 ports are supported in the case of N=2 OFDM symbols.
X=32 port is supported in the case of N=4 OFDM symbols.
For at least CSI acquisition, the following options are supported when density D=1 RE/port/PRB and X>4.
When N=1 OFDM symbol, a minimum number of neighboring REs is [2 or or 4] in the frequency domain for one CSI-RS resource.
When N=2 OFDM symbols, a minimum number of neighboring REs is [2 or 4] in the frequency domain for one CSI-RS resource.
When N=4 OFDM symbols, a minimum number of neighboring REs is [2 or 4] in the frequency domain for one CSI-RS resource.
For a CDM pattern per X-port CSI-RS for CSI acquisition,
in the case of X=2 corresponding to CSI-RS RE pattern (M,N)=(2,1),
FD-CDM2 is supported.
In the case of X=4 corresponding to CSI-RS RE pattern (M,N)=(4,1),
FD-CDM2 is supported.
In the case of X=4 corresponding to CSI-RS RE pattern (M,N)=(2,2)
FD-CDM2 is supported.
Here, M relates to a position at frequency and N relates to a position at time.
The overall of CSI-RS will be briefly described.

Since CSI-RS supports beam management for NR, CSI-RS design needs to consider analog beamforming.

Design requirements for CSI-RS beam management may differ from CSI-RS for CSI acquisition in terms of the number ports, time/frequency density and port multiplexing method.

Accordingly, it is necessary to optimize CSI-RS design in order to achieve beam management and CSI acquisition while maintaining commonness between two CSI-RS types such as CSI-RS RE location.

A main purpose of CSI-RS for CSI acquisition is link adaptation similar to that of LTE CSI-RS and a main purpose of CSI-RS of the other type is DL Tx/Rx beam management that does not necessarily require measurement accuracy for link adaptation.

Accordingly, CSI-RS for beam management may be sparser than CSI-RS for CSI acquisition in terms of frequency density.

However, CSI-RS for beam management may need to support transmission of a larger number of RSs in a slot in order to permit measurement of a large set on the premise of {Tx beam, Rx beam}.

With respect to unified CSI-RS design that considers both the two purposes, both the CSI-RS types can be included in CSI-RS resource configuration and a separate report configuration can be individually connected for CSI reporting and beam reporting.

(Proposition 1): NR needs to consider independent optimization of two types of NZP CSI-RS.
CSI-RS type A: mainly for DL CSI acquisition
CSI-RS type B: mainly for DL beam management
CSI-RS for CSI Acquisition
A plurality of OFDM symbols in a slot can be used for CSI-RS transmission and may be adjacent or non-adjacent.

With respect to CSI measurement accuracy, it is desirable that a CSI-RS pattern be defined in neighboring symbols due to a phase drift issue.

In addition, to completely obtain CDM gain, a TD (Time Domain)-CDM (Code Division Multiplexing) pattern need to be applied over neighboring OFDM symbols.

Meanwhile, occupation of consecutive OFDM symbols may limit not only a degree of freedom in design of other RS such as additional DMRS positions but also network flexibility.

When symbols that are not consecutive are supported, a permitted TD-CDM length can be limited.

Careful CSI-RS design in consideration of balance between RS design flexibility and CSI estimation performance is required in association with CSI-RS symbol positions.

CSI-RS RE pattern (M, N)=(2, 1) for X=2 is appointed and support of (M, N)=(1, 2) for X=2 is not decided. Considering flexible CSI-RS allocation and power utilization profit, CSI-RS RE pattern (M, N)=(1,2) needs to be supported even at 6 GHz or lower.

(Proposition 2): CSI-RS resources (1, 2) for X=2 are supported at 6 GHz or lower.

FD (Frequency Domain)-CDM2 is supported not only for X=4 having (M, N)=(4, 1), (2, 2) but also for X=2 having CSI-RS pattern (M, N)=(2, 1) for a CDM pattern per X-port CSI-RS for CSI acquisition.

In the case of X=4 ports corresponding to CSI-RS RE pattern (M, N)=(2, 2), 3 dB gain of CDM-2 can be obtained when CSI-RS ports are multiplexed with FD-CDM2.

In addition, when CSI-RS ports are multiplexed without FDM and TDM, that is, CDM, 3 dB power boosting can be accomplished from frequency-division-multiplexed 2 REs.

In the case of TD-CDM2, 3 dB gain from TD-CDM2 and 3 dB gain from power amplification from frequency-division-multiplexed 2 REs, that is, a total of 6 dB gain, can be accomplished.

Further, when CDM is composed of time and frequency domains (represented as TFD-CDM4), it is apparent that 6 dB gain can be achieved from CDM-4 processing having a maximum power utilization rate for X=4.

In summary, both TD-CDM2 and TFD-CDM4 provide a maximum power utilization rate when X=4.

Similarly, for X=4 having CSI-RS RE pattern (M, N)=(4, 1), FD-CDM4 can provide maximum power utilization. Accordingly, FD-CDM4 and TFD-CDM4 need to be supported for X=4 for flexible setting of CDM length and type that reflect channel change in the frequency domain or the time domain.

(Proposition 3): For X=4 having CSI-RS RE pattern (M, N)=(4, 1), NR supports FD-CDM4 for at least CSI acquisition.

(Proposition 4): When X=4 in CSI-RS RE pattern (M, N)=(2, 2), NR supports TFD-CDM4 and TD-CDM2 for at least CSI acquisition.

A configuration necessary for CSI-RS resources for CSI acquisition according to a higher layer including at least the following parameters can be summarized.

1) The number of X CSI-RS ports, X∈{1, 2, 4, 8, 12, 16, 24, 32}

2) Density D (RE/PRB/port), D∈{½, 1}

3) One of joint configurations of (CDM length (L), CDM type), that is, {(2, FD-CDM), (2, TD-CDM), (4, FD-CDM), (4, FD-CDM), (8, TFD-CDM)}, is limited in selection depending on a set value of X. For example, (2, FD-CDM) and (2, TD-CDM) can be configured only when X≥4.

In addition, (8, TFD-CDM) can be configured only when X=8, 16, 24 or 32. Here, a specific pattern for (8, TFD-CDM) will be described later.

4) Aggregation of a plurality of component CSI-RS RE patterns is generated when X>L according to a start RE location (ki, li) with respect to an i-th component CSI-RS RE pattern, that is, i=1, . . . , X/L, and available CSI-RS RE pattern aggregation depending on set values of X and L.

(Proposition 5): CSI-RS resource configuration for CSI acquisition according to a higher layer includes at least the following parameters.

Number of CSI-RS ports X∈{1, 2, 4, 8, 12, 16, 24, 32}
Density D (RE/PRB/port) ∈{½, 1}
(CDM length(L), CDM type)∈{(2, FD-CDM), (2, TD-CDM), (4, FD-CDM), (4, TF-CDM), (8, TF-CDM)} for X>=2:
(2, FD-CDM) can be configured when X>=2
(2, TD-CDM) can be configured when X>=2
(4, FD-CDM) can be configured when X>=4
(4, TFD-CDM) can be configured when X>=4
(8, TFD-CDM) can be configured when X=8, 16, 24, or 32
Starting RE position (ki,li) for i-th component CSI-RS RE pattern, for which i=1, . . . , X/L, here,
li: OFDM symbol index within a slot.
ki: subcarrier index within a PRB.

The aforementioned conditions such as X≥2, X≥4, . . . may be changed to conditions of different numerical numbers, and the number of X/L component CSI-RS RE patterns aggregated depending on the key point proposed in the present invention, e.g., CDM length/type selected as (CDM length(L), CDM type), can be changed.

In addition, the scope of the present invention that a payload set according thereto can be changed is applied.

Accurate RE patterns for (8, TFD-CDM) have not yet been defined.

It is advantageous that CSI-RS RE pattern mapping has higher flexibility with respect to the CDM-8 option.

For example, a CSI-RS RE pattern may be regarded as (2, 4) or (4, 2) for (8, TFD-CDM), but it is still considerably restrictive in consideration of other available RSs (DMRS positioned in the same slot).

Accordingly, it is desirable to introduce some configurable parameters for flexible CSI-RS RE patterns for (8, TFD-CDM) when X=8, 16, 24 or 32.

Figure 8:
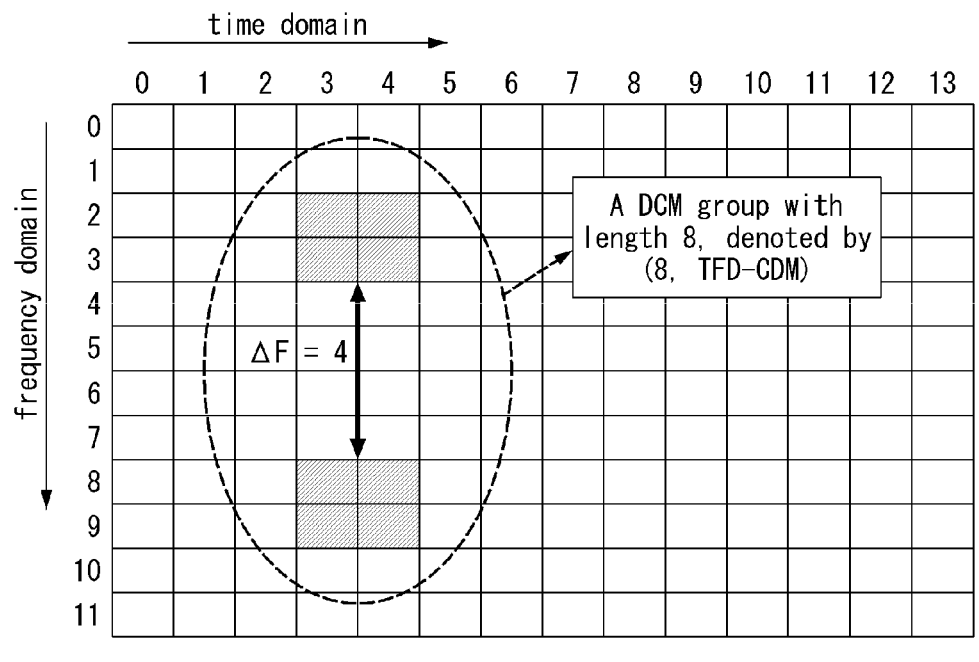
FIG. 8 is a diagram showing an example of component CSI-RS RE pattern location proposed in the present disclosure.
Figure 8:
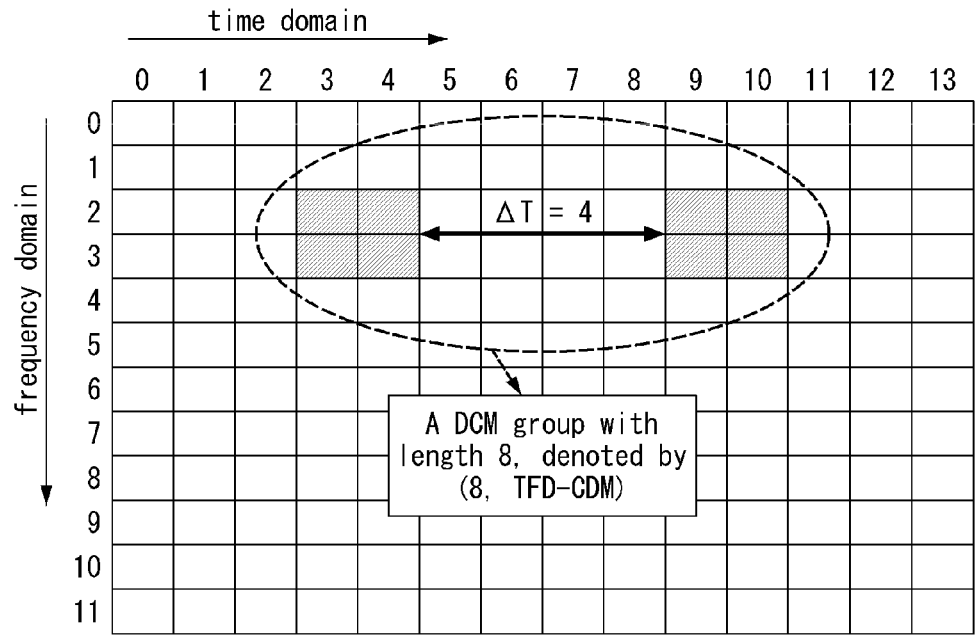

Here, two parameters, ΔT (in time domain RE offset) and ΔF (in frequency domain RE offset), can be present in a (8, TFD-CDM) CDM group, as shown in FIG. 8. It is sufficient to define a range in which additional parameters can be configured, such as ΔT∈{0, 1, 2, 3, 4} and ΔF∈{0, 2, [4]}.

FIG. 8 is a diagram showing examples of CSI-RS RE pattern location proposed in the present disclosure.

Figure 9:
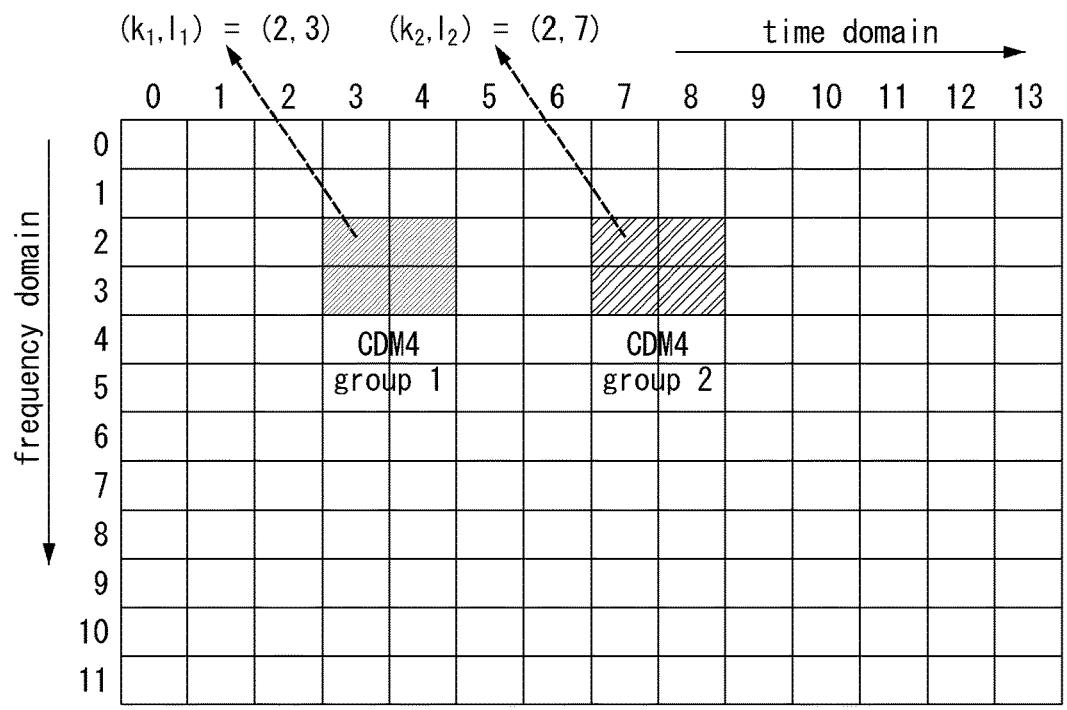
FIG. 9 is a diagram showing another example of component CSI-RS RE pattern location proposed in the present disclosure.

FIG. 9 shows an example of a CSI-RS resource configuration having X=8 ports and (4, TFD-CDM) in association with proposition 5.

As shown in FIG. 9, two component CSI-RS RE patterns are combined for each of i=1 and i=2.

That is, FIG. 9 shows another example of a CSI-RS RE pattern location proposed in the present disclosure.

Specifically, FIG. 9 shows a CSI-RS resource configuration having X=8 ports and (4, TFD-CDM).

Referring to FIG. 9, two component CSI-RS RE patterns are combined and CDM4 is applied thereto.

With respect to possible CSI-RS location, aperiodic CSI-RS indication and CSI reporting request need to be decoded first from a control channel, and thus CSI-RS symbols can be positioned after a DL control channel.

Furthermore, a front-loaded DMRS needs to be positioned immediately after the DL control channel.

It is not desirable that a DMRS be multiplexed with a CSI-RS in the same OFDM symbols in consideration of DMRS for high-order MU-MIMO transmission.

Accordingly, when 1 symbol for a DL control channel and 1 symbol for a DMRS are assumed as minimum values, the third symbol can be the earliest symbol for CSI-RS transmission.

When initial CSI reporting in a slot is supported, a CSI-RS needs to be transmitted at least after a DL control channel and a front-loaded DL DMRS.

Different RSs including CSI-RS, such as DMRS (particularly, for additional DMRS) and PTRS, for example, CSI-RS types A and B, can be transmitted in the same slot.

RE location for different RSs are overlapped, some or all REs may collide to deteriorate performance.

Accordingly, CSI-RS RE location needs to be determined in consideration of different RS patterns such as DMRS and PTRS.

A priority rule for determining which RSs are dropped or avoided needs to be considered for overlapped RSs.

For example, DMRS may have higher priority than CSI-RS type A.

(Proposition 6): CSI-RS design needs to consider collision between CSI-RS and other RSs (DMRS and PTRS).

Next, signaling will be described.

Signaling methods for aperiodic CSI reporting of DCI, semi-persistent CSI-RS activation/deactivation and semi-persistent CSI reporting activation/deactivation are under discussion.

In the case of semi-persistent CSI-RS and CSI reporting, it may be desirable to use MAC CE for activation and deactivation because wrong detection of DCI by a UE may have a considerable influence.

A UE and a gNB cannot identify whether DCI transmission and reception are performed when ACK/NACK transmission for DCI reception is not supported, channel performance may deteriorate when deactivation signaling is missed, and loss of data demodulation performance due to inaccurate rate matching may become serious when activation signaling is missed.

When there are many resources to be enabled/disabled for semi-persistent CSI-RS or additional configurations such as a period and an offset need to be provided for enable/disable signaling, DCI overhead is considerable.

In this case, MAC signaling that provides a larger payload may be advantageous for activating/deactivating signaling for semi-persistent CSI-RS.

(Proposition 7): Semi-persistent CSI-RS is enabled/disabled by MAC CE.

With respect to a resource grouping configuration method, two options for selecting resources for aperiodic CSI-RS on the basis of at least the number S of supported CSI-RS resource sets and the number Ks of CSI-RS resources per set may be as follows.

Option 1: RRC+MAC CE+DCI are used.
Option 2: RRC+DCI are used.

LTE eFD-MIMO, option 1 is adopted in order to control DCI overhead within a reasonable range. In NR, adoption of option 1 may be more reasonable because DCI overhead is a still important issue.

(Proposition 8): Selection of option 1: RRC+MAC CE+DCI are used for a method of reducing the number of resource candidates for at least aperiodic CSI-RS.

In LTE eFD-MIMO, a DCI field in which only joint triggering of aperiodic CSI report and aperiodic CSI-RS is present for aperiodic CSI report triggering is reused such that the number of DCI fields is not increased.

In NR, a CSI framework is designed to support a larger number of options for time and frequency domain operations and to support more flexible operations by separating an RS related configuration from a report related configuration.

In this regard, it is desirable to design separated DCI fields for aperiodic CSI-RS triggering and aperiodic CSI report triggering.

In this design scheme, independent triggering and joint triggering of an RS and a report can be supported. Definition of a separated aperiodic CSI-RS triggering DCI field is particularly useful when P-3 operation, that is, RS triggering without reporting is considered.

(Proposition 9): Separated DCI fields need to be respectively designed for aperiodic CSI-RS triggering and aperiodic CSI report triggering.

There are two latent directions of dynamic resource triggering/activation/deactivation.

One is dynamic selection of a resource set level and the other is dynamic selection of a resource level as follows.

One or more CSI-RS resource sets selected from at least one resource setting
One or more CSI-RS resources selected from at least one CSI-RS resource set In general, the method of reducing the number of resource candidates for L1/L2 signaling has a problem because resource setting may include a large amount of CSI-RS resources such as ZP (zero-power)/NZP (non-zero power), resources having different time region operations.

A method of mitigating such a problem is to classify resources according to resource characteristics (e.g., time domain behavior, type and power) such that dynamic resource selection is performed within a corresponding range.

Furthermore, down-selection of resources/resource sets may be performed according to network indication through an implicit or explicit method. For example, resource setting, link or linked report setting may be indicated through a previous time instance or MAC CE.

(Proposition 10): Reduction in the number of candidate resources for dynamic triggering/activation/deactivation among RRC configured CSI-RS resources can be performed through categorization having predefined rules (according to RRC parameters with respect to resource/measurement/report setting, for example).

Moreover, down-selection can be performed through implicit/explicit indication of resource setting, link or linked report setting.

CDM-8 Configuration Having (2,4) RE Pattern

Next, CDM-8 configuration having (2,4) CSI-RS RE pattern will be described.

The following table 4 shows whether a full power utilization gain can be acquired for cases in which the number of antenna ports is 12, 16, 24 and 32 in consideration of 6 dB power boosting constraint (RAN4 requirement).

N refers to the number of used time-axis resources (contiguous or non-contiguous time-axis resources) and can be defined as the number of OFDM symbols.

TABLE 4

| | 12 ports | 16 ports | | 24 ports | | 32 ports |
|---|---|---|---|---|---|---|
| | N = 1 | N = 2 | N = 2 | N = 4 | N = 2 | N = 4 | N = 4 |
| FD-CDM4 | ○ | | X | X | X | X | X |
| TD-CDM4 | | | | ○ | | X | X |
| TFD-CDM4 | | ○ | ○ | X | X | X | X |
| TFD-CDM8 | | | ○ | ○ | ○ | ○ | ○ |

Table 4 shows whether a full power utilization gain can be acquired with respect to CDM type and CDM length.

In Table 4, a blank represents "not applicable", FD-CDM represents CDM in the frequency domain, TD-CDM represents CDM in the time domain, and TFD-CDM represents CDM in the time and frequency domains.

Figure 10:
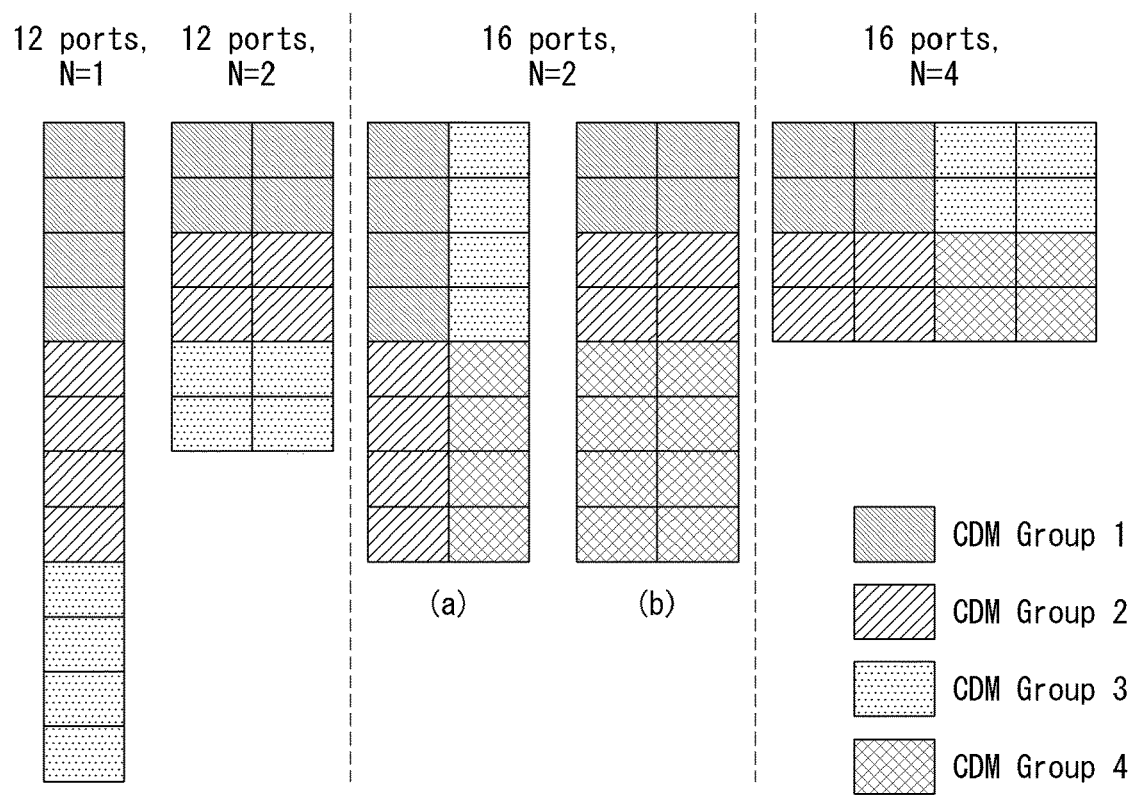
FIGS. 10 to 12 show examples of CSI-RS mapping methods proposed in the present disclosure.

FIG. 10 shows possible FD-CDM and TFD-CDM patterns in consideration of the numbers of used OFDM symbols, 1, 2 and 4, when the number of antenna ports is 12 and 16.

Figure 11:
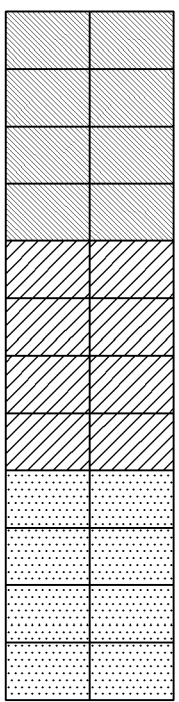
Figure 11:
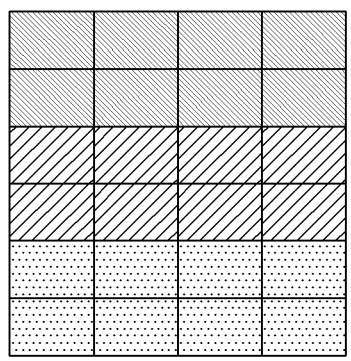
Figure 11:
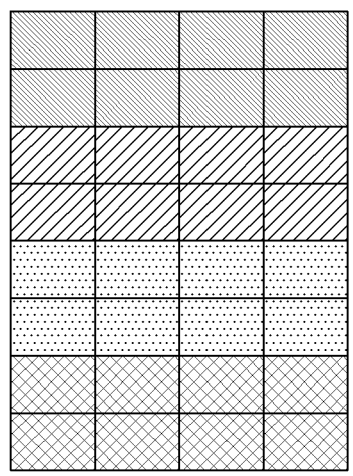
Figure 12:
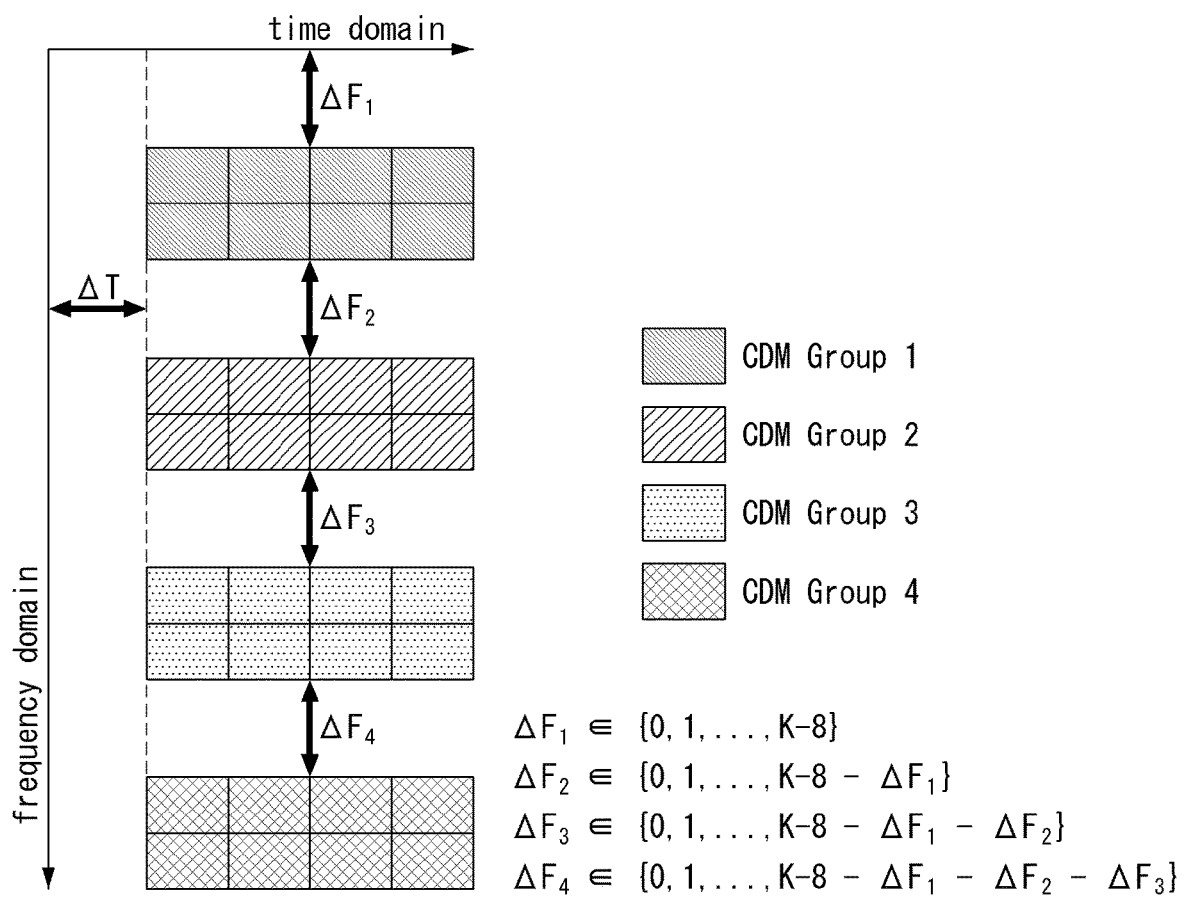

FIGS. 10 to 12 show examples of a CSI-RS RE mapping method proposed in the present disclosure.

(12 Ports CSI-RS)

When a BS determines that channel information needs to be rapidly updated in the same slot, the BS can set N=1, determine the CDM type as FD and determine the CDM length as 4 using only CSI-RS RE pattern (4,1), as shown in FIG. 10.

(16 Ports, N=2 (Two Contiguous or Non-Contiguous OFDM Symbols))

When the number of antenna ports is 16 and two contiguous (or non-contiguous) OFDM symbols, the CDM length is set to 4.

When the BS determines that channel information needs to be rapidly updated in one slot (a case in which a UE having low mobility moves at a high speed or the like can be considered), FD-CDM4 can be set.

When there is no additional information, a UE expects only TFD-CDM4 setting that can accomplish full power utilization.

Since full power utilization can be achieved even when TFD-CDM4 is set and frequency domain channel fluctuation is aggravated when TFD-CDM8 is used, exclusion of setting of TFD-CDM8 may be desirable.

(32 Ports, N=4 (Four Contiguous or Non-Contiguous OFDM Symbols))

When the number of antenna ports is 32 and the number of used OFDM symbols is 4, a minimum CDM length necessary to obtain a full power utilization gain is 8.

In addition, the full power utilization gain can be obtained when only 2×4 TFD-CDM8 pattern is used among CDM-8.

Based on this, the following is proposed.

Upon recognizing that the total number of ports is 32 (through higher layer signaling) in a BS or TRP to which a UE belongs, the UE recognizes component CSI-RS RE pattern (2,4) (component CSI-RS RE pattern (2,4) refers to 8 REs in a rectangular form corresponding to two contiguous subcarriers and four contiguous OFDM symbols) and setting of TFD-CDM8 without additional signaling. A BS uses only 32-port CSI-RS RE pattern (2,4) and sets TFD-CDM8.

A method of defining the total number of frequency resources (the number of subcarriers) constituting one PRB and the number of time resources as K and L (e.g., K=12 and L=14 in the case of a normal CP of LTE system) and mapping CSI-RS RE pattern (2,4) to the PRB is proposed.

The proposed method is a method that can be flexibly set by a BS in consideration of positions of RSs other than CSI-RS and effectively signaled to a UE.

A total of four component CSI-RS RE patterns (2,4) are arranged to perform 32-port CSI-RS RE mapping. First, the first component CSI-RS RE pattern (2,4) is disposed in the $\Delta F_1$-th subcarrier of the ($\Delta T \in \{1, 2, \ldots, L\}$)-th OFDM symbol. This is shown in FIG. 12.

The remaining three component CSI-RS RE patterns are disposed in the same OFDM symbol (time-domain resource). The second component CSI-RS RE pattern is disposed having a frequency offset $\Delta F_2$ from the first component CSI-RS RE pattern.

Similarly, the third component CSI-RS RE pattern is disposed having a frequency offset $\Delta F_3$ from the second component CSI-RS RE.

Finally, the fourth component CSI-RS RE pattern is disposed having a frequency offset $\Delta F_4$ from the third component CSI-RS RE pattern.

Here, candidates for the values $\Delta F_1$, $\Delta F_2$, $\Delta F_3$, $\Delta F_4$ are defined in FIG. 12.

For example, if the number of subcarriers constituting one PRB is 12 and the number of OFDM symbols is 14 (K=12, L=14), $\Delta F_1$ can be determined as 0, 1, 2, 3 or 4.

In addition, an possible combination of ($\Delta F_1$, $\Delta F_2$, $\Delta F_2$, $\Delta F_4$) can be defined as a set and this set can be defined as preliminary information of a BS and a UE.

Based on this, the BS can transmit indexes corresponding to ($\Delta F_1$, $\Delta F_2$, $\Delta F_3$, $\Delta F_4$) set thereby to the UE, that is, can signal offset information ($\Delta F_1$, $\Delta F_2$, $\Delta F_3$, $\Delta F_4$).

Specifically, FIG. 12 shows an example of 32-port CSI-RS RE mapping having component CSI-RS RE pattern (2,4) set in TFD-CDM8.

The aforementioned method with respect to 32 ports and N=4 can be extended for X-port CSI-RS, X being larger than 8, i.e., 16, 24, 32, 40, . . . , according to the same principle.

Here, X/4 (2,4) component CSI-RS RE patterns are mapped to a PRB, and a frequency offset set value for a j-th component CSI-RS RE pattern (j-th CDM group) is represented by the following mathematical expression 2.

$$\Delta F_j \in \left\{ 0, 1, \ldots, K - \frac{X}{4} - \sum_{n=1}^{j-1} \Delta F_n \right\},$$ [Mathematical expression 2]

$$j = 1, 2, \ldots, \frac{X}{4}$$

Here, a method of respectively transmitting $\Delta T$, $\Delta F_1$, $\Delta F_2$, $\Delta F_3$, $\Delta F_4$ or a method of generating a set in consideration of all possible combinations with respect to the five parameters, setting a parameter therefor and transmitting an index corresponding to the parameter can be considered.

In addition, a method of defining an available $\Delta T$ value as a set, defining an possible combination of ($\Delta F_1$, $\Delta F_2$, $\Delta F_3$, $\Delta F_4$) as a set and transmitting information about the two sets can be considered.

(24 Ports, N=4 (Four Contiguous or Non-Contiguous OFDM Symbols))

When a UE recognizes that the number of antenna ports is 24 and the number of used OFDM symbols is 4 through higher layer signaling in a BS or TRP to which the UE belongs in the case of the above-described 32 ports and N=4, the UE recognizes component CSI-RS RE pattern (2,4) and setting of TFD-CDM8 without additional signaling.

(16 Ports, N=4 (Four Contiguous or Non-Contiguous OFDM Symbols))

When the full power utilization gain can be obtained using TD-CDM4 but data is not transmitted using other REs (subcarriers) in the same OFDM symbol (or when data can be transmitted in the next OFDM symbol), a further power boosting gain can be obtained if TFD-CDM8 (2,4) pattern, two subcarriers in the frequency domain and four OFDM symbols in the time domain are used.

Based on this, when a UE recognizes that the number of antenna ports is 16 in a BS or TRP to which the UE belongs and additionally recognizes use of four OFDM symbols, the UE can recognize component CSI-RS RE pattern (2,4) and setting of TFD-CDM8 without additional signaling.

(16 Ports, N=4 (Four Contiguous or Non-Contiguous OFDM Symbols))

When only CDM lengths of 4 or less can be used (CDM length supported by the system is 4 or less for a 16-port case), TD-CDM4 by which the full power utilization gain can be obtained is used among TD-CDM4, FD-CDM4 and TFD-CDM4.

Next, signaling for indicating CSI-RS RE pattern location and CDM-4/8 configuration will be described.

With respect to CSI-RS patterns for CSI acquisition, at least the following CSI-RS RE patterns are supported for CSI acquisition for OCC based CDM.

TABLE 5

| X | Density [RE/RB/port] | N | (Y, Z) | CDM | Remark |
|---|---|---|---|---|---|
| 1 | >1, 1 | 1 | N. A. | No CDM | |
| 2 | 1 | 1 | (2, 1) | FD-CDM2 | |
| 4 | 1 | 2 | (2, 2) | FD-CDM2, CDM4(FD2, TD2) | |
| 4 | 1 | 1 | (4, 1) | FD-CDM2 | (before agreement, added by HS) |
| 8 | 1 | 2 | (2, 2) | FD-CDM2, CDM4(FD2, TD2) | |

TABLE 5-continued

| X | Density [RE/RB/port] | N | (Y, Z) | CDM | Remark |
|---|---|---|---|---|---|
| 16 | 1 | 2 | (2, 2) | FD-CDM2, CDM4(FD2, TD2) | |
| 32 | 1, 1/2 | 4 | (2, 2) | FD-CDM2, CDM4(FD2, TD2) | FFS, CDM8 details |

An RE pattern for X-port CSI-RS resources is located over N21 OFDM symbols and is composed of one or more component CSI-RS RE patterns.

Here, a component CSI-RS RE pattern is defined as Y contiguous REs in the frequency domain and Z contiguous REs in the time domain in a single PRB.

Density ½ is based on a PRB level comb having the same comb offset value for all ports.

REs of CDM2 and CDM4 (FD2, TD2) are contiguous REs.

With respect to CSI-RS for CSI acquisition, CDM-8 supports one of the following cases.

Distribution over a plurality of component CSI-RS RE patterns
  Complete inclusion in one component CSI-RS RE pattern For CSI acquisition, at least the following parameters associated with CSI-RS resources can be indicated to a UE on the basis of higher layer configuration.

The number of CSI-RS ports
  Density (RE/PRB/port): comb offset in the case of density=½
  CDM (length, type)
  Locations of component RE patterns for corresponding CSI-RS resources
  Scrambling ID Hereinafter, 24/32-port CSI-RS design for CSI acquisition will be described in more detail.

That is, signaling details necessary to effectively deliver location information on component CSI-RS RE patterns (four REs including two contiguous REs in the frequency domain and two contiguous REs in the time domain), which are basic units in CSI-RS RE pattern design, on a time-frequency resource grid and a method of grouping component CSI-RS RE patterns into one (or one or more) CDM group for effective CDM setting will be described.

Figure 13:
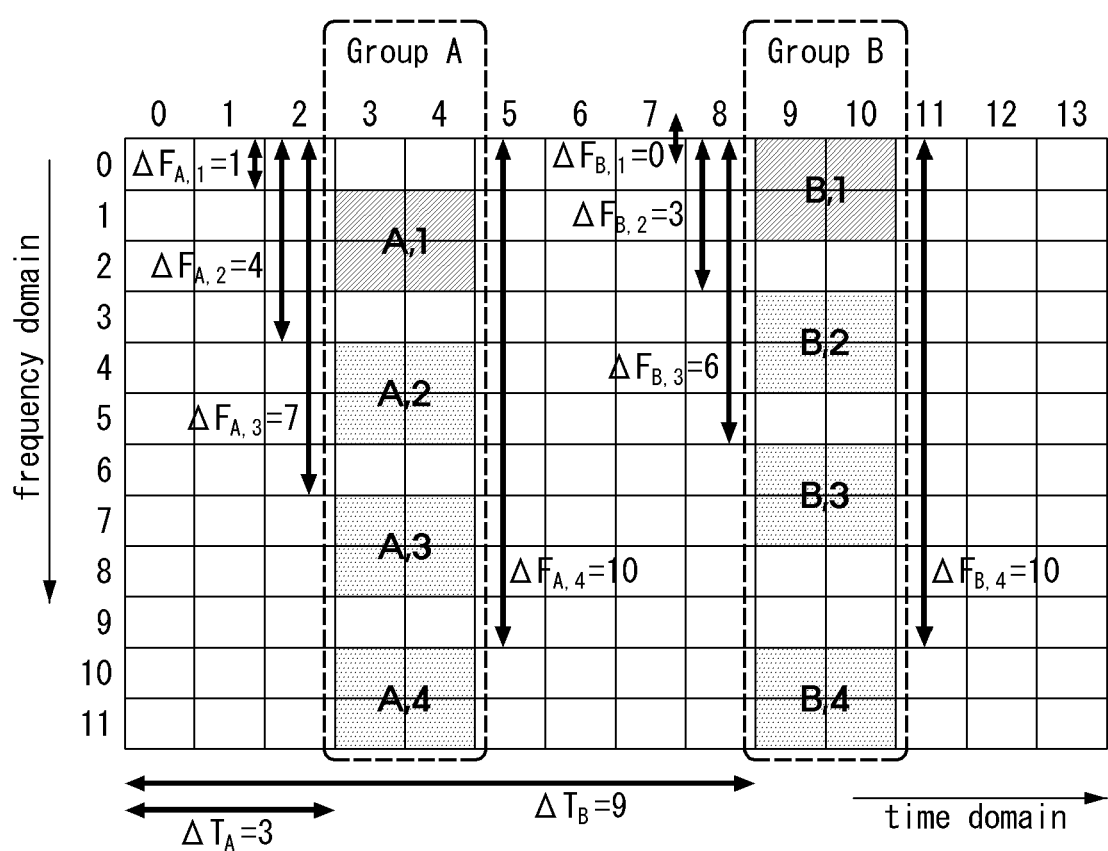
FIGS. 13 and 14 show other examples of CSI-RS mapping methods proposed in the present disclosure.

Considering a basic component CSI-RS RE pattern (2,2) (hereinafter, referred to as a component RE pattern) constituting a 32-port CSI-RS RE pattern, a total of 8 component RE patterns can be divided into two groups, group A and group B, each having four component RE patterns according to OFDM symbol indexes at which the component RE patterns are located. Refer to FIG. 13.

When 32-port CSI-RS is configured, the following information can be included in higher layer signaling in order to signal location information of 8 component RE patterns on a time-frequency resource grid to a UE.

$\Delta T_A$, $\Delta F_{A,1}$, $\Delta F_{A,2}$, $\Delta F_{A,3}$, $\Delta F_{A,4}$, $\Delta T_B$, $\Delta F_{B,1}$, $\Delta F_{B,2}$, $\Delta F_{B,3}$, $\Delta F_{B,4}$ in FIG. 13

$\Delta T_A$, $\Delta T_B \in \{3, \ldots, 12\}$ and $\Delta F_{A,1}$, $\Delta F_{B,1} \in \{0, 1, \ldots, 10\}$ for l=1, 2, 3, 4

Figure 14:
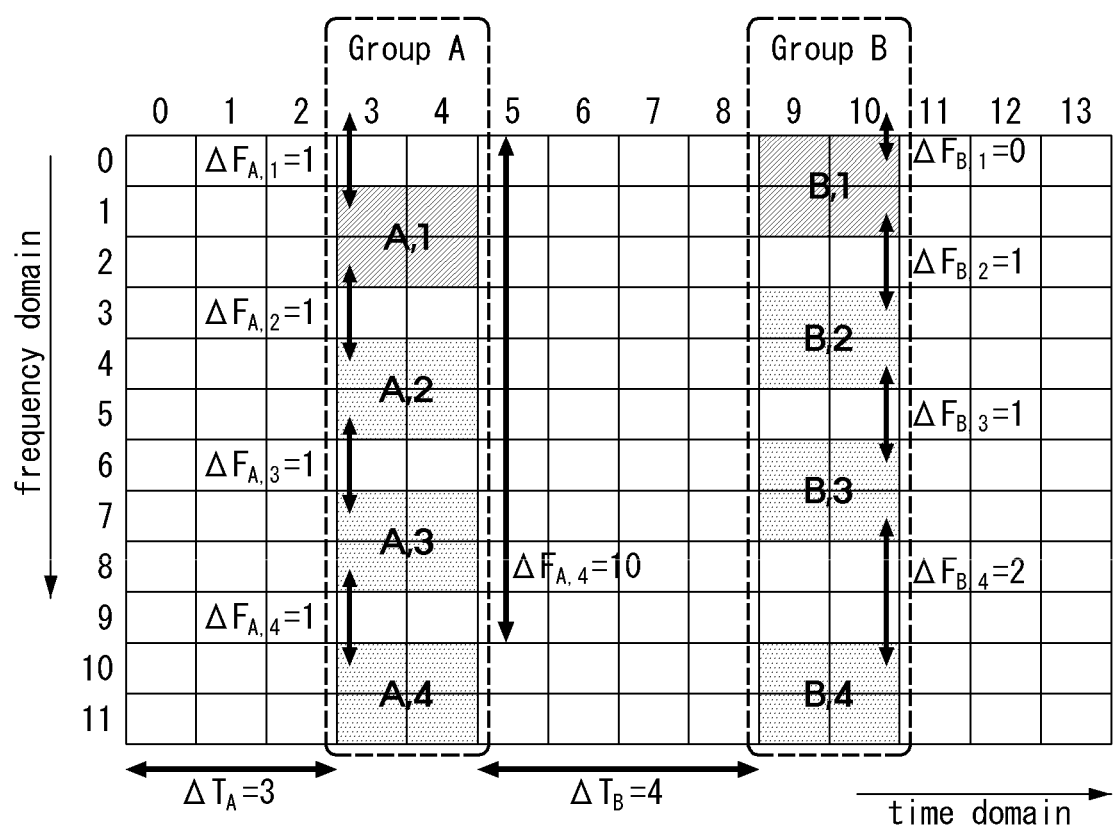

To reduce signaling overhead necessary to signal location information of component RE patterns, a method of signaling an offset value between component RE patterns instead of signaling coordinate points on the time/frequency resource grid can be considered. Refer to FIG. 14.

FIGS. 13 and 14 are diagrams showing examples of 32-port CSI-RS RE patterns.

In a method of signaling a relative time or a frequency offset value between component RE patterns instead of signaling starting position information of a component RE pattern through OFDM symbol index indication, the range of $\Delta T_A$, $\Delta T_B$, $\Delta F_{A,1}$, $\Delta F_{B,1}$ for all l=1, 2, 3, 4 is relatively narrow.

Accordingly, in this case, signaling overhead decreases. This is illustrated in FIG. 14 in detail.

Similarly, when 32-port CSI-RS is configured, the following information can be included in higher layer signaling in order to signal location information about 8 component RE patterns on a time-frequency resource grid to a UE.

$\Delta T_A$, $\Delta F_{A,1}$, $\Delta F_{A,2}$, $\Delta F_{A,3}$, $\Delta F_{A,4}$, $\Delta T_B$, $\Delta F_{B,1}$, $\Delta F_{B,2}$, $\Delta F_{B,3}$, $\Delta F_{B,4}$ in FIG. 14 where $\Delta T_A \in (3, 4, \ldots, 10$, $\Delta T_B \in \{0, 1, \ldots, 9\} \Delta F_{A,1}$, $\Delta F_{B,1} \in \{0, 1, 2, 3, 4, \ldots \}$ for l=1, 2, 3, 4

In addition, the range of the values of $\Delta F_{A,1}$ and $\Delta F_{B,1}$ can be set differently according to index l=1, 2, 3, 4.

Possible combinations of the values can be generated, and an index can be assigned per case and signaled to a UE.

For example, a table with respect to possible values of ($\Delta F_{A,1}$, $\Delta F_{A,2}$, $\Delta F_{A,3}$, $\Delta F_{A,4}$) in FIG. 14 is generated and indexes can be assigned to possible combinations. In addition, $\Delta T_A$ and $\Delta T_B$ may be added to generate a table and separate tables may be configured therefor.

Methods of respectively transmitting all of these values, that is, $\Delta T_A$, $\Delta F_{A,1}$, $\Delta F_{A,2}$, $\Delta F_{A,3}$, $\Delta F_{A,4}$, $\Delta T_B$, $\Delta F_{B,1}$, $\Delta F_{B,2}$, $\Delta F_{B,3}$, $\Delta F_{B,4}$, or grouping some of these values into a group and transmitting a single group or multiple groups may be considered.

Further, when there is no additional setting of the BS through higher layer signaling, a UE can recognize $\Delta F_{A,2} = \Delta F_{A,4} = 0$ and/or $\Delta F_{B,2} = \Delta F_{B,4} = 0$ in FIG. 14 as default values.

When the BS signals only two frequency offset values with respect to group A and group B, the UE recognizes $\Delta F_{A,1}$, $\Delta F_{A,3}$ and $\Delta F_{B,1}$, $\Delta F_{B,3}$.

In addition, when there is no additional setting of the BS through higher layer signaling, the UE can recognize $\Delta T_B = 0$ in FIG. 14 as a default value.

Further, when there is no additional setting of the BS through higher layer signaling, the UE can recognize $\Delta T_B = 0$ and/or $\Delta F_{A,1} = \Delta F_{B,1}$, $\Delta F_{A,2} = \Delta F_{B,2}$, $\Delta F_{A,3}$ $\Delta F_{B,3}$, $\Delta F_{A,4} = \Delta F_{B,4}$ in FIG. 14 as default values.

Then, configuring two component RE patterns (2,2) to be contiguous all the time can be considered when time and/or frequency channel selectivity is high or in order to reduce signaling overhead.

To this end, the BS can set a time-adjacent mode and/or a frequency-adjacent mode through higher layer signaling. These are defined as follows.

Time-adjacent mode: Two i-th component RE patterns of two different groups (group A and group B) are contiguous without an OFDM symbol. $\Delta T_B = 0$ in FIG. 14.
  Frequency-adjacent mode: Two i-th and (i+1)-th component RE patterns of the same group (same alphabet) are contiguous without having an RE in the frequency domain. $\Delta F_{A,2} = \Delta F_{A,4} = 0$, $\Delta F_{B,2} = \Delta F_{B,4} = 0$ in FIG. 14.
  Here, i∈{1,3}, i+1∈{2,4}.

The BS can signal location information $\Delta T_A$, $\Delta F_{A,1}$, $\Delta F_{A,2}$, $\Delta F_{A,3}$, $\Delta F_{A,4}$ about four component RE patterns included in group A and signal only a time offset $\Delta T_B$ and a frequency offset $\Delta F_B$ of four component RE patterns included in group B through higher layer signaling to locate the component RE patterns included in group B at positions separated by $\Delta T_B$ and $\Delta F_B$.

On the other hand, a method of signaling information about group B and locating information about group A at a position separated by a specific offset in the time domain and the frequency domain may be considered.

Figure 15:
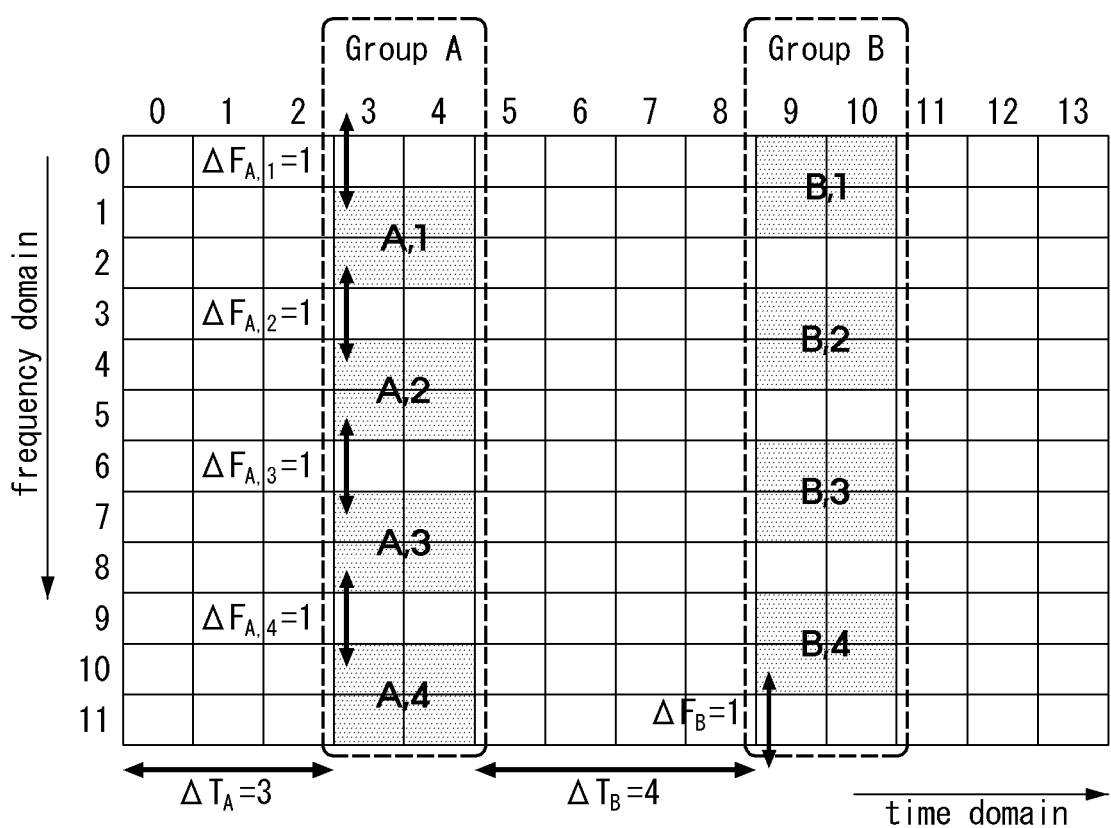
FIG. 15 is a diagram showing an example of CSI-RS RE pattern location having low signaling overhead proposed in the present disclosure.

This is illustrated in FIG. 15.

In this case, signaling overhead is lower than that when offset information about all component RE patterns is signaled.

FIG. 15 is a diagram showing an example of indicating location of a CSI-RS RE pattern having low signaling overhead.

A method of intuitively signaling location information about four component RE patterns included in group A and locating four component RE patterns included in group B at positions separated by a time offset $\Delta T_B$ may be considered.

In this case, frequency offset information of group B need not be transmitted and thus overhead is considerably reduced.

That is, the BS can signal $\Delta F_{A,1}$, $\Delta F_{A,2}$, $\Delta F_{A,3}$, $\Delta F_{A,4}$ and $\Delta T_A$, $\Delta T_B$ information to a UE through higher layer signaling and the UE can recognize a 32-port CSI-RS RE mapping pattern only using this information.

Figure 16:
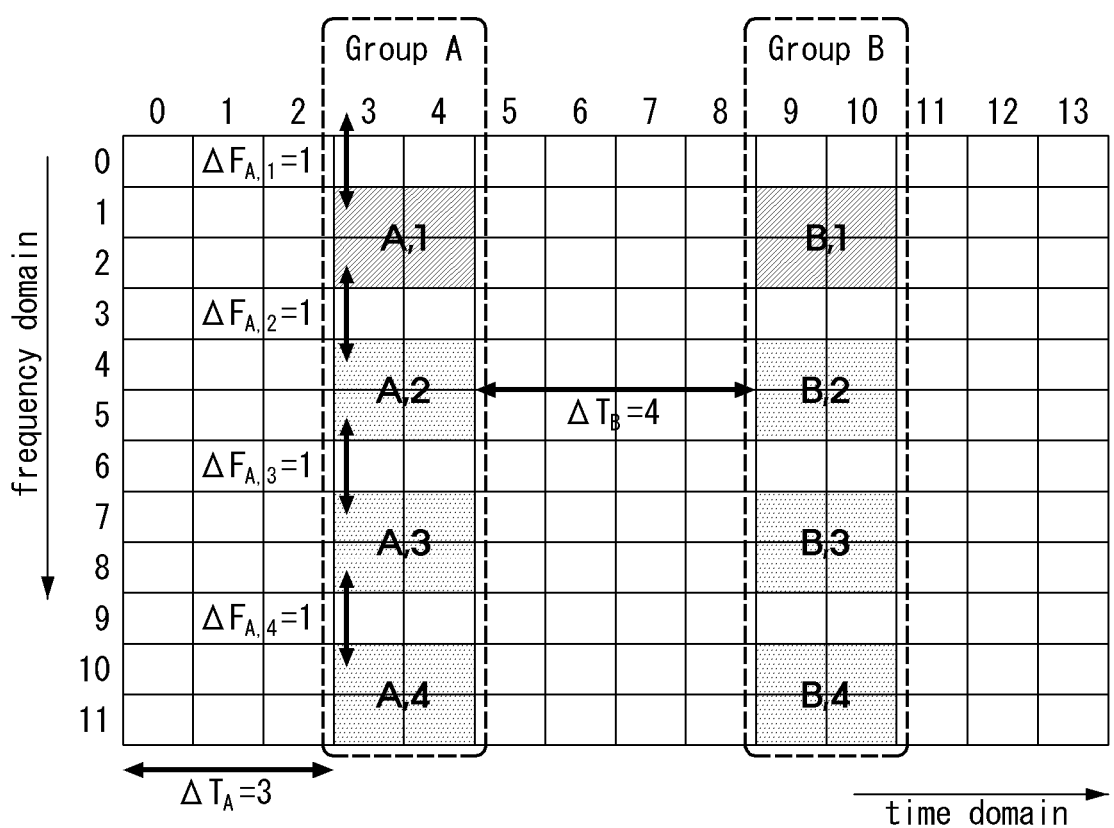
FIG. 16 is a diagram showing another example of a CSI-RS mapping method proposed in the present disclosure.

If the BS and the UE agree that the frequency offset of the component RE patterns of group A is the same as the frequency offset of the component RE patterns of group B in advance (component RE patterns having the same index have the same frequency axis as shown in FIG. 16), the BS can signal only information about one of two sets {$\Delta T_A$, $\Delta T_B$, $\Delta F_{A,1}$, $\Delta F_{A,2}$, $\Delta F_{A,3}$, $\Delta F_{A,4}$} and {$\Delta T_A$, $\Delta T_B$, $\Delta F_{B,1}$, $\Delta F_{B,2}$, $\Delta F_{B,3}$, $\Delta F_{B,4}$)} through higher layer signaling. That is, $\Delta F_{A,i} = \Delta F_B$, for all i∈{1, 2, 3, 4}.

FIG. 16 is a diagram showing an example of CSI-RS RE pattern location proposed in the present disclosure.

Referring to FIG. 16, 8 component CSI-RS RE patterns can be located in a first resource region and a second resource region.

In FIG. 16, the first resource region is denoted by Group A and the second resource region is denoted by Group B.

The resource regions may have a specific time offset therebetween and component CSI-RS RE patterns in each group may have a specific frequency offset therebetween.

Each of the first resource region and the second resource region can include at least one symbol and at least one subcarrier.

For example, each of the first resource region and the second resource region can include two symbols and include at least 12 subcarriers in the frequency domain.

Here, each of the first resource region and the second resource region can include four component CSI-RS RE patterns.

Further, the four component CSI-RS RE patterns included in each resource region (the first resource region, the second resource region) may have different start subcarrier positions and the same start symbol position.

In addition, the start subcarrier position of the first component CSI-RS RE pattern included in the first resource region may be the same as that of the second component CSI-RS RE pattern included in the second resource region.

Further, when only $\Delta T_A$ and $\Delta F_{A,1}$ in FIG. 14 are signaled through higher layer signaling, the UE can recognize that all the remaining values are 0 as a default value.

To reduce signaling overhead, the UE can recognize that $\Delta F_A, +_l = \Delta F_{A,1} + 2 \times l$, for l=1, 2, 3, $\Delta F_{A,l} = \Delta F_{B,l}$ for l=1, 2, 3, 4 and $\Delta T_B = \Delta T_A + 2$ in FIG. 13 as default values when higher layer signaling includes only $\Delta T_A$ and $\Delta F_{A,1}$.

To reduce signaling overhead, a CSI-RS RE pattern in the case of X=16 and D=1 (RE/PRB/Port) can be reused when X=32 and D=½ (RE/PRB/Port).

For example, exclusion of (A,3), (A,4), (B,3) and (B,4) in FIG. 14 can be considered.

If higher layer signaling includes CDM length and CDM type information and does not include $\Delta T_A$, $\Delta T_B$ ($\Delta F_{A,1}$, $\Delta F_{A,2}$, $\Delta F_{A,3}$, $\Delta F_{A,4}$) and ($\Delta F_B$, $\Delta F_{B,2}$, $\Delta F_{B,2}$, $\Delta F_{B,3}$, $\Delta F_{B,4}$) information, the UE recognizes the aforementioned offset values as predetermined default values.

For example, offset values other than $\Delta T_A$=3 can be regarded as 0.

Through this process, component RE patterns are divided into Group A and Group B, and indexes of the first to fourth component RE patterns in each group are determined in ascending order (or descending order) of subcarrier indexes occupied by each component RE pattern according to a rule appointed between the UE and the BS.

Additionally, in the case of 24 ports or less, the following signaling can be considered.

For 24-port CSI-RS configuration having CSI-RS RE density 1 [RE/PRB/Port], the following parameters can be included in higher layer signaling in order to signal location information about 6 component RE patterns on the time-frequency resource grid to a UE.

$\Delta T_A$, $\Delta F_{A,1}$, $\Delta F_{A,2}$, $\Delta F_{A,3}$, $\Delta T_B$, $\Delta F_{B,1}$, $\Delta F_{B,2}$, $\Delta F_{B,3}$ in FIG. 13 or 14

For 24-port CSI-RS configuration having CSI-RS RE density 1 [RE/PRB/Port], the following parameters can be included in higher layer signaling in order to signal location information about 6 component RE patterns on the time-frequency resource grid to a UE.

$\Delta T_A$, $\Delta F_{A,1}$, $\Delta F_{A,2}$, $\Delta F_{A,3}$, $\Delta F_{A,4}$, $\Delta T_B$, $\Delta F_{B,1}$, $\Delta F_{B,2}$ in FIG. 13 or 14

For 16-port CSI-RS configuration having CSI-RS RE density 1 [RE/PRB/Port], the following parameters can be included in higher layer signaling in order to signal location information about 4 component RE patterns on the time-frequency resource grid to a UE.

$\Delta T_A$, $\Delta F_A$, $\Delta F_{A,2}$, $\Delta T_B$, $\Delta F_{B,1}$, $\Delta F_{B,2}$ in FIG. 13 or 14

For 16-port CSI-RS configuration having CSI-RS RE density 1 [RE/PRB/Port], the following parameters can be included in higher layer signaling in order to signal location information about 4 component RE patterns on the time-frequency resource grid to a UE.

$\Delta T_A$, $\Delta F_{A,1}$, $\Delta F_{A,2}$, $\Delta F_{A,3}$, $\Delta F_{A,4}$ in FIG. 13 or 14

For 12-port CSI-RS configuration having CSI-RS RE density 1 [RE/PRB/Port], the following parameters can be included in higher layer signaling in order to signal location information about 3 component RE patterns on the time-frequency resource grid to a UE.

$\Delta T_A$, $\Delta F_{A,1}$, $\Delta F_{A,2}$, $\Delta F_{A,3}$ in FIG. 13 or 14

For 8-port CSI-RS configuration having CSI-RS RE density 1 [RE/PRB/Port], the following parameters can be included in higher layer signaling in order to signal location information about 2 component RE patterns on the time-frequency resource grid to a UE.

$\Delta T_A$, $\Delta F_{A,1}$, $\Delta T_B$, $\Delta F_{B,1}$ or $\Delta T_A$, $\Delta F_{A,1}$, $\Delta F_{A,2}$ in FIG. 13 or 14

For 4-port CSI-RS configuration having CSI-RS RE density 1 [RE/PRB/Port], the following parameters can be included in higher layer signaling in order to signal location information about one component RE pattern on the time-frequency resource grid to a UE.

$\Delta T_A$ and $\Delta F_{A,1}$ in FIG. 13 or 14

Next, dynamic setting of component RE pattern location can be considered in order to avoid collision between CSI-RSs or between a CSI-RS and other RSs during aperiodic CSI-RS and semi-persistent CSI-RS triggering/activation.

Specifically, offset values necessary to dynamically indicate locations of all component RE patterns designated by RRC (for example, in the case of 32-port CSI-RS, all or some of the following offset values can be dynamically signaled: $\Delta T_A$, $\Delta F_{A,1}$, $\Delta F_{A,2}$, $\Delta F_{A,3}$, $\Delta F_{A,4}$, $\Delta T_B$, $\Delta F_{B,1}$, $\Delta F_{B,2}$, $\Delta F_{B,3}$ and $\Delta F_{B,4}$) can be dynamically signaled through MAC CE and/or DCI.

Basically, locations of default component RE patterns are assumed to be signaled through higher layer signaling indication (RRC signaling), and locations of some or all component RE patterns can be dynamically set (or shifted) through MAC CE and/or DCI signaling.

For example, in the 32-port CSI-RS shown in FIG. 13 or 14, $\Delta T_A$, $\Delta T_B$ may be set only through RRC signaling and $\Delta F_{A,1}$, $\Delta F_{A,2}$, $\Delta F_{A,3}$, $\Delta F_{A,4}$ and $\Delta F_{B,1}$, $\Delta F_{B,2}$, $\Delta F_{B,3}$, $\Delta F_{B,4}$ may be dynamically set through MAC-CE/DCI signaling.

For example, shifting by N symbols and/or M subcarriers from an X-port CSI-RS RE location set by RRC on the time axis and/or the frequency axis can be indicated through MAC CE or DCI.

For example, shifting of only some component RE patterns (e.g., component RE patterns corresponding to group B in FIG. 13 or 14) at X-port CSI-RS RE location set by RRC by N symbols and/or M subcarriers on the time axis and/or the frequency axis can be indicated through MAC CE or DCI.

Here, a component RE pattern to be shifted can be set according to a predetermined rule (e.g., only symbols transmitted later are shifted) or set/designated by a BS.

In the case of 32-port CSI-RS, one or more elements among elements in the following set which is configured through higher layer signaling (RRC signaling) in FIG. 13 or 14 can be set through MAC-CE and/or DCI signaling. {$\Delta T_A$, $\Delta T_B$, $\Delta F_{A,1}$, $\Delta F_{A,2}$, $\Delta F_{A,3}$, $\Delta F_{A,4}$, $\Delta F_{B,1}$, $\Delta F_{B,2}$, $\Delta F_{B,3}$, $\Delta F_{B,4}$}

Furthermore, when all locations of component RE patterns set by RRC need to be dynamically reset (or designated), a method of designating offset parameters shown in FIG. 13 or 14 (32-port case) through MAC-CE signaling and permitting DCI signaling when only locations of some component RE patterns are reset/designated can be considered.

In the case of 24/16/12/8/4-port, parameters necessary to designate locations of component RE patterns have been defined. Some of the parameters can be indicated through MAC-CE and/or DCI signaling.

When a self-contained uplink region is included in a slot (e.g. DL/UL mixed slot), $\Delta T_A$ and $\Delta T_B$ may be dynamically signaled through MAC-CE or DCI such that component RE patterns are present in a PDSCH start/end symbol in consideration of PDSCH symbol duration, or symbol positions may be adjusted according to a predetermined rule.

In the latter case, when $\Delta T_A$ or $\Delta T_B$ value set through RRC in a specific slot is set such that CSI-RS is transmitted out of PDSCH end symbol position, for example, the entire CSI-RS position may be advanced by a predefined number of symbols or only $\Delta T_B$ may be reduced (i.e., locations of specific component REs are adjusted) in the corresponding slot.

The aforementioned proposed method is commonly applicable to resources for interference measurement (e.g., ZP CSI-RS based IMR (interference measurement resource)) and resources for rate matching (e.g. ZP CSI-RS in LTE) as well as NZP CSI-RS.

When X=32 and CDM8 (TD-2, FD-4) are indicated to a UE through higher layer signaling, the number of configured OFDM symbols is 4 and the UE can automatically recognize that two groups each of which includes 2 OFDM symbols (FIG. 13) or group A and group B in FIG. 14 are configured.

The range of $\Delta F_{A,1}$ (or $\Delta F_{B,1}$) in FIG. 13 or 14 can be changed/determined according to $\Delta F_{A,n}$ (Or $\Delta F_{B,n}$) value (n≤l−1) (here, I=2, 3, 4).

When one PRB is composed of K subcarriers and a CSI-RS resource uses 4 OFDM symbols, the ranges represented by the following mathematical expressions 3 and 4 are provided to X=8/16/24.

$$\Delta F_{A,l} \in \left\{0, 1, \ldots, K - \frac{X}{4} - \sum_{n=1}^{l-1} \Delta F_{A,n}\right\}, \quad \text{[Mathematical expression 3]}$$

$$\text{where } l = 2, \ldots, \frac{X}{8}$$

$$\Delta F_{B,l} \in \left\{0, 1, \ldots, K - \frac{X}{4} - \sum_{n=1}^{l-1} \Delta F_{B,n}\right\}, \quad \text{[Mathematical expression 4]}$$

$$\text{where } l = 2, \ldots, \frac{X}{8}$$

Here, X denotes the number of CSI-RS antenna ports.

When one PRB is composed of K subcarriers and a CSI-RS resource uses two OFDM symbols, the range represented by the following mathematical expression 5 is provided for X=4/8/12/16.

$$\Delta F_{A,l} \in \left\{0, 1, \ldots, K - \frac{X}{2} - \sum_{n=1}^{l-1} \Delta F_{A,n}\right\}, \quad \text{[Equation 5]}$$

$$l = 2, \ldots, \frac{X}{4}$$

Here, X represents the number of CSI-RS antenna ports. ($\Delta F_{A,1}$, $\Delta F_{A,2}$, $\Delta F_{A,3}$, $\Delta F_{A,4}$) and ($\Delta F_{B,1}$, $\Delta F_{B,2}$, $\Delta F_{B,3}$, $\Delta F_{B,4}$) values can be defined as a joint encoded table in consideration of a relationship between parameters used in the aforementioned mathematical expressions.

For example, if X=32 and $\Delta F_{A,1}=4$, the parameters cannot have values other than $\Delta F_{A,2}=\Delta F_{A,3}=\Delta F_{A,4}=0$.

The range of $\Delta F_{A,1}$ can be defined as $\Delta F_{A,1} \in \{0, 1, 2, 3, 4\}$ and $\Delta F_{A,2}$, $\Delta F_{A,3}$ and $\Delta F_{A,4}$ can be defined as values smaller than $\Delta F_{A,1}$ (e.g., $\Delta F_{A,2}$, $\Delta F_{A,3}$, $\Delta F_{A,4} \in \{(0,1\}$) such that arrangement of component RE patterns (A,2), (A,3), (A,4) on a PRB largely depends on component RE pattern (A,1) to reduce signaling overhead.

The same principle can be applied to Group B.

The ranges of $\Delta F_{A,1}$ and $\Delta F_{B,1}$ where l=1, 2, . . . , $$\frac{X}{4}$$

can be defined differently according to the number of CSI-RS antenna ports in consideration of signaling overhead for indicating component RE pattern locations and a degree of freedom of configuration.

When the number of CSI-RS antenna ports is small (when the number of component RE patterns is 1 or 2), particularly, component RE pattern location needs to be determined in units of 1 RE in order to avoid collision with other RSs set to 1 port and/or other types of CSI-RS (e.g., CSI-RS for beam management).

When CSI-RS is configured, the number of component RE patterns constituting group A may not be the same as the number of component RE patterns constituting group B as shown in FIG. 13 or 14. A proposition in consideration of this is as follows.

A BS can indicate/define the number (represented by $N_A$, for example) of component RE patterns in group A and the number (represented by $N_B$, for example) of component RE patterns in group B to a UE through higher layer signaling (e.g., RRC signaling). For example, $N_A$, $N_B \in \{3, 4, 5, 6\}$.

When there is no additional signaling for $N_A$, $N_B \in \{3, 4, 5, 6\}$ although a 32-port CSI-RS has been configured through RRC signaling, the UE can recognize $N_A=N_B=4$ as a default value.

When there is no additional signaling for $N_A$ and $N_B$ although a 24-port CSI-RS has been configured through RRC signaling, the UE can recognize $N_A=N_B=3$ as a default value.

When a 32-port CSI-RS and TD-FD-CDM8 (TD-2, FD-4) are configured through RRC signaling, the UE can automatically recognize that $N_A=N_B=4$.

When a 24-port CSI-RS and TD-FD-CDM8 (TD-2, FD-4) are configured through RRC signaling, the UE can automatically recognize that $N_A=N_B=3$.

To reduce signaling overhead for component RE pattern location, values of frequency offsets (relative RE distances between component Re patterns in the frequency domain) between all component RE patterns in a specific one of group A and group B can be designated/defined and locations of component RE patterns belonging to the other group can be shifted on the time axis and the frequency axis (on the basis of group A) as described above.

Here, the following is proposed in consideration of cases in which $N_A$ is different from $N_B$.

When a 32-port CSI-RS is configured, if $N_A > N_B$, a BS can signal component RE pattern locations in group A and group B to a UE by designating/transmitting/defining parameters $T_A$, $\Delta F_{A,1}$, ..., $\Delta F_{A,N_A}$, $\Delta T_B$, $\Delta F_B$ proposed in FIG. 13 or 14 for the UE through higher layer signaling.

First, locations of $N_A$ component RE patterns in group A can be determined on the basis of $T_A$, $\Delta F_{A,1}$, $\Delta F_{A,2}$, ... $\Delta F_A$, $N_A$ (FIG. 13 or 14).

Then, locations of $N_B$ component RE patterns in group B are set in such a manner that the $N_A$ component RE patterns in group A are simultaneously shifted by $\Delta T_B$ REs on the time axis (in a direction in which the OFDM symbol index increases or decreases, that is, $\Delta T_B$ can be set to a positive integer or a negative integer) and by $\Delta F_B$ REs on the frequency axis (a direction in which the subcarrier index increases or decreases, that is, $\Delta F_B$ can be set to a positive integer or a negative integer) and then $N_B$ component RE patterns are selected from a component RE pattern having a small index (integer number) or from a component RE pattern having a large index.

Modified methods for shifting component RE patterns in a direction in which the subcarrier index decreases and then eliminating $(N_A-N_B)$ component RE patterns from a component RE pattern having a large index are intuitively derived from the spirit of the present invention and thus can be considered to be included in the present invention.

When a 32-port CSI-RS is configured, if $N_A < N_B$, the BS can signal component RE pattern locations in group A and group B to the UE by designating/transmitting/defining parameters $T_A$, $\Delta F_{B,1}$, ..., $\Delta F_{B,N_B}$, $\Delta T_B$, $\Delta F_B$ proposed in FIG. 13 or 14 for the UE through higher layer signaling.

First, locations of $N_B$ component RE patterns in group B can be determined on the basis of $T_A$, $\Delta T_B$, $\Delta F_{B,1}$, ..., $\Delta F_{B,N_B}$ (FIG. 13 or 14).

Then, locations of $N_A$ component RE patterns in group A are set in such a manner that the $N_B$ component RE patterns in group B are simultaneously shifted by $\Delta T_B$ REs on the time axis (in a direction in which the OFDM symbol index increases or decreases, that is, $\Delta T_B$ can be set to a positive integer or a negative integer) and by $\Delta F_B$ REs on the frequency axis (a direction in which the subcarrier index increases or decreases, that is, $\Delta F_B$ can be set to a positive integer or a negative integer) and then $N_A$ component RE patterns are selected from a component RE pattern having a small index (integer number) or from a component RE pattern having a large index.

Extension/application/modification of the above-described method into configuration of CSI-RSs of 32 ports or less can be considered to be included in the present invention.

When CDM-8 is set with respect to a 32-port CSI-RS, the following is proposed according to $N_A$ and $N_B$ values.

When $N_A=5$, $N_B=3$ and CDM-8 are set through higher layer signaling with respect to a 32-port CSI-RS (or (CDM type, CDM length) are set to (Heterogeneous TD-FD-CDM, 8) or CDM length is set to 8 but CDM type indicating different CDM types are set), the UE can recognize that CDM groups are set as follows.

Figure 17:
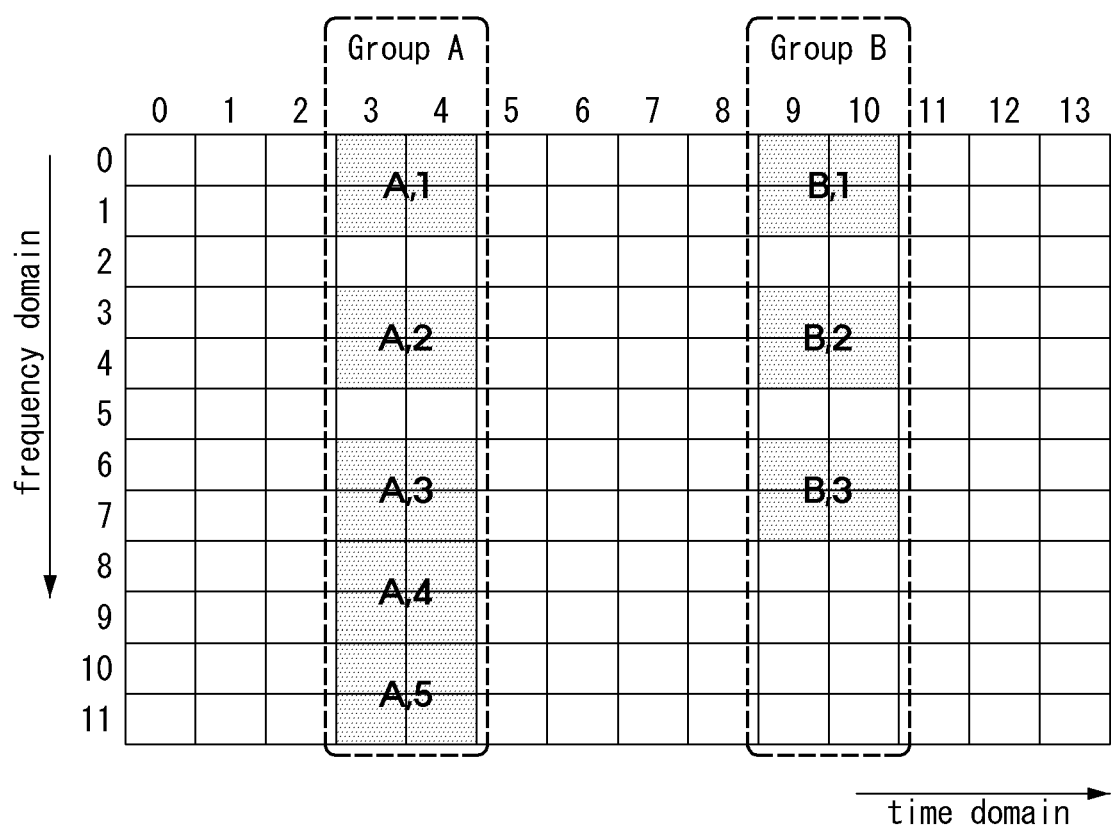
FIGS. 17 and 18 show other examples of CSI-RS mapping methods proposed in the present disclosure.

CDM8 group 1: component RE patterns (A,1) and (B,1) in FIG. 17
CDM8 group 2: component RE patterns (A,2) and (B,2) in FIG. 17
CDM8 group 3: component RE patterns (A,3) and (B,3) in FIG. 17
CDM8 group 4: component RE patterns (A,4) and (A,5) in FIG. 17

When $N_A=3$ and $N_B=5$, CDM 8 is set in the similar manner.

Figure 18:
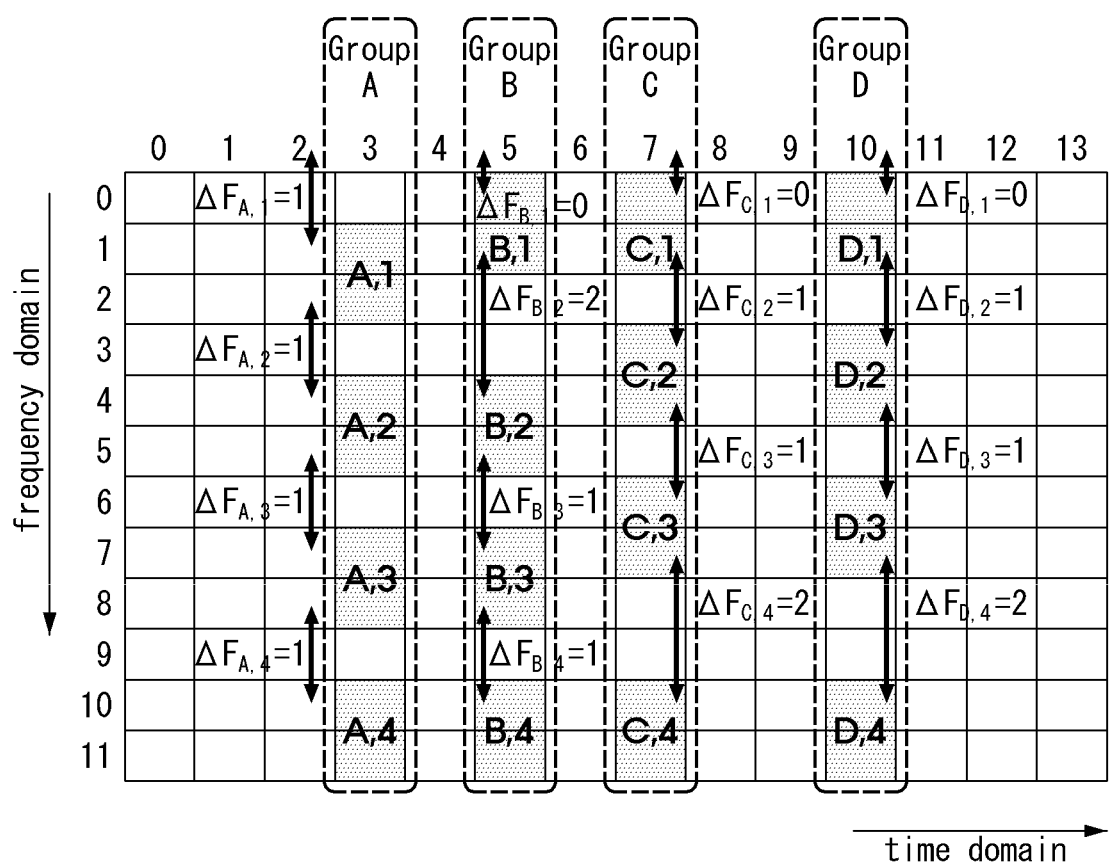

FIGS. 17 and 18 show examples of the CSI-RS mapping method proposed in the present disclosure.

When $N_A=6$ and $N_B=2$ with respect to an 32-port CSI-RS (group A includes 6 component RE patterns that are represented by (A,1), (A,2), (A,3), (A,4), (A,5) and (A,6) and group B includes 2 component RE patterns that are represented by (B,1) and (B,2)), if CDM-8 or (CDM type, CDM length) is set to (FD-TD-CDM,8), the UE can recognize that CDM groups are set as follows.

CDM8 group 1: component RE patterns (A,1) and (A,2)
CDM8 group 2: component RE patterns (A,3) and (B,4)
CDM8 group 3: component RE patterns (A,5) and (A,6)
CDM8 group 4: component RE patterns (B,1) and (B,2)

When $N_A=6$ and $N_B=2$ with respect to an 32-port CSI-RS, if CDM-8 or (CDM type, CDM length) is set to (Heterogeneous TD-FD-CDM, 8) or CDM length is 8 but CDM type representing different CDM types are set, the UE can recognize that CDM groups are set as follows.

CDM8 group 1: component RE patterns (A,1) and (B,1)
CDM8 group 2: component RE patterns (A,2) and (B,2)
CDM8 group 3: component RE patterns (A,3) and (A,4)
CDM8 group 4: component RE patterns (A,5) and (A,6)

When CDM-8 is set with respect to a 24-port CSI-RS, the following is proposed according to $N_A$ and $N_B$ values.

When $N_A=4$, $N_B=2$ (group A includes 4 component RE patterns that are represented by (A,1), (A,2), (A,3) and (A,4) and group B includes 2 component RE patterns that are represented by (B,1) and (B,2)), and CDM-8 are set through higher layer signaling with respect to a 24-port CSI-RS (or (CDM type, CDM length) are set to (Heterogeneous TD-FD-CDM, 8) or CDM length is set to 8 but CDM type indicating different CDM types are set), the UE can recognize that CDM groups are set as follows.

CDM8 group 1: component RE patterns (A,1) and (B,1)
CDM8 group 2: component RE patterns (A,2) and (B,2)
CDM8 group 3: component RE patterns (A,3) and (A,4)

When $N_A=4$, $N_B=2$ and CDM-8 are set through higher layer signaling with respect to a 24-port CSI-RS or (CDM type, CDM length) are set to (FD-TD-CDM, 8), the UE can recognize that CDM groups are set as follows.

CDM8 group 1: component RE patterns (A,1) and (A,2)
CDM8 group 2: component RE patterns (A,3) and (B,4)
CDM8 group 3: component RE patterns (B,1) and (B,2)

When $N_A=5$, $N_B=1$ and CDM-8 are set through higher layer signaling with respect to a 24-port CSI-RS (or (CDM type, CDM length) are set to (Heterogeneous TD-FD-CDM, 8) or CDM length is set to 8 but CDM type indicating different CDM types are set), the UE can recognize that CDM groups are set as follows.

CDM8 group 1: component RE patterns (A,1) and (B,1)
CDM8 group 2: component RE patterns (A,2) and (A,3)
CDM8 group 3: component RE patterns (A,4) and (A,5)

Additionally, when a 24-port or 32-port CSI-RS is configured to use 4 OFDM symbols, if the number of component RE patterns belonging to group A is different from the number of component RE patterns belonging to group B shown in FIG. 13 or 14 (in the case of $N_A=N_B=3$ in a 24-port case and in cases other than $N_A=N_B=4$ in a 32-port case), the UE may not expect CDM-8 configuration.

TD-FD-CDM8 (TD-2, FD-4) needs to be configured for full power utilization. However, when the numbers of component RE patterns belonging to respective groups are different, TD-FD-CDM8 can be set for only some thereof and thus full power utilization is impossible.

Accordingly, it may be reasonable that a UE does not expect CDM8 configuration when $N_A$ $N_B$.

Next, CDM configuration in consideration of component RE pattern will be described in more detail.

Signaling of component RE pattern location information has been described above.

In addition thereto, a component RE pattern aggregation rule is proposed for CDM8 (including some CDM4) configuration.

First, the following higher layer parameters with respect to CDM type and CDM length are defined for CDM group configuration.

Here, M and N refer to CDM length (M: the number of REs on the frequency axis, N: the number of REs on the time axis).

CDM type 1: TD-CDM
CDM type 2: FD-CDM
CDM type 3: TD-FD-CDM

CDM length in the time domain≥CDM length in the frequency domain (N≥M)

CDM type 4: FD-TD-CDM

Here, CDM length in the frequency domain ≥CDM length in the time domain (M≥N).

Possible combinations of CDM type and CDM length based on the above-defied CDM types can be considered as shown in Table 6.

TABLE 6

| Index | (CDM type, CDM length) |
|---|---|
| 0 | (any type, 1): No CDM |
| 1 | (TD-CDM, 2) |
| 2 | (FD-CDM, 2) |
| 3 | (FD-CDM, 4) |
| 4 | (TD-CDM, 4) |
| 5 | (TD-FD-CDM, 4) |
| 6 | (TD-FD-CDM, 8) |
| 7 | (FD-TD-CDM, 8) |

Although contiguous REs on the time axis and contiguous REs on the frequency axis are used for CDM configuration in both of CDM type 3 and CDM type 4, the two CDM types are defined as independent CDM types because a method of grouping component RE patterns into the same CDM group, which will be described later, is different according to type3 and type4.

When $\Delta T_B$ shown in FIG. 14 is considerably large or time selectivity of a radio channel is high, it may be advantageous to configure FD-TD-CDM rather than configuring TD-FD-CDM (CDM type in Table 2) when a BS configures CDM8.

On the contrary, if channels are almost constant on the time axis, it may be advantageous to configure TD-FD-CDM to obtain a power boosting gain rather than configuring FD-TD-CDM.

The basic concept is as follows.

When (TD-FD-CDM, 8) or (TD-CDM, 4) is configured through higher layer signaling, component RE patterns denoted by different alphabets and the same integer index among the component RE patterns shown in FIG. 14 are set to one CDM 8 group.

On the other hand, when (FD-TD-CDM, 8) or (FD-CDM, 4) is configured through higher layer signaling, component RE patterns denoted by the same alphabet and neighboring integer indexes among the component RE patterns shown in FIG. 14 are set to one CDM 8 group. Details are as follows.

CDM-8 Configuration for 32-Port CSI-RS Having Component RE Pattern (2,2)

When (CDM type, CDM length) is set to (TD-FD-CDM, 8) (refer to Table 6), component RE pattern (A,i) and component RE pattern (B,i) constitute one CDM8 group (A CDM group is composed of two different component RE patterns corresponding to different alphabets and the same integer). Here, i∈{1, 2, 3, 4}.

When (CDM type, CDM length) is set to (FD-FD-CDM, 8) (refer to Table 6), component RE pattern (A,i) and component RE pattern (A,i+1) constitute one CDM8 group and component RE pattern (B,i) and component RE pattern (B,i+1) constitute one CDM8 group. Here, i∈{1,3}, i+1∈{2, 4}.

Example 1) When (FD-TD-CDM, 8) is configured, 8 component RE patterns shown in the figure (FIG. 7) are set to 4 CDM groups as follows.

CDM group 1: (A,1), (A,2)
CDM group 2: (A,3), (A,4)
CDM group 3: (B,1), (B,2)
CDM group 4: (B,3), (B,4)

Example 2) When (TD-FD-CDM, 8) is configured, 8 component RE patterns shown in FIG. 14 are set to 4 CDM groups as follows.

CDM group 1: (A,1), (B,1)

To configure CDM8 group using component RE patterns (A,1) and (B,1), $\Delta T_A$, $\Delta F_{A,1}$, $\Delta T_B$ and $\Delta F_{B,1}$ that represent location information on the two component RE patterns need to be signaled.

The same signaling is required for other CDM group configurations described below. However, $\Delta T_A$ and $\Delta T_B$ are common information and thus they can be signaled only once.

CDM group 2: (A,2), (B,2)
CDM group 3: (A,3), (B,3)
CDM group 4: (A,4), (B,4)

CDM-4 Configuration for 32-Port CSI RS Having Component RE Pattern (2,2)

When (CDM type, CDM length) is set to (FD-CDM, 4) (refer to Table 6), component RE pattern (A,i) and component RE pattern (A,i+1) constitute two CDM4 groups. Here, i∈{1,3}, i+1∈{2,4}.

When (CDM type, CDM length) is set to (TD-CDM, 4) (refer to Table 6), component RE pattern (A,i) and component RE pattern (B,i) constitute two CDM4 groups. Here, i∈{1, 2, 3, 4}.

CDM-8 Configuration for 24-Port CSI-RS Having Component RE Pattern (2,2)

When each of group A and group B includes 3 component RE patterns, (CDM type, CDM length) can be set to (TD-FD-CDM, 8) (refer to Table 6).

Here, component RE pattern (A,i) and component RE pattern (B,i) constitute one CDM8 group. Here, i∈{1, 2, 3}.

When group A includes 4 component RE patters (A,1), (A,2), (A,3) and (A,4) and group B includes 2 component RE patterns (B,1) and (B,2), (CDM type, CDM length) can be set to (FD-TD-CDM, 8) (refer to Table 6).

Here, component RE pattern (A,i) and component RE pattern (A,i+1) constitute one CDM8 group and component RE pattern (B,j) and component RE pattern (B, j+1) constitute one CDM 8 group. Here, i∈{1,3},i+1∈{2,4},j∈{1}.

When group A includes 2 component RE patterns (A,1) and (A,2) and group B includes 4 component RE patterns (B,1), (B,2), (B,3) and (B,4), (CDM type, CDM length) can be set to (FD-TD-CDM, 8) (refer to Table 6).

Here, component RE pattern (B,i) and component RE pattern (B,i+1) constitute one CDM8 group and component RE pattern (A,j) and component RE pattern (A,j+1) constitute one CDM8 group. Here, i∈{1,3},i+1∈{2,4},j∈{1}.

When group A includes 6 component RE patterns (A,1), (A,2), (A,3), (A,4), (A,5) and (A,6) and group B includes no component RE pattern, (CDM type, CDM length) can be set to (FD-TD-CDM, 8) (refer to Table 6).

Here, component RE pattern (A,j) and component RE pattern (A,j+1) constitute one CDM8 group. Here, j∈{1, 3, 5}.

The same applies when group A includes no component RE pattern and group B includes 6 component RE patterns.

CDM-4 Configuration for 24-Port CSI-RS Having Component RE Pattern (2,2)

When (CDM type, CDM length) is set to (FD-CDM, 4) (refer to Table 6, (FD-CDM, 4) configuration is permitted only when group A or group B includes all 6 component RE patterns 6), component RE pattern (A,i) and component RE pattern (A, i+1) constitute two CDM groups. Here, i∈{1, 3, 5}, i+1∈{2, 4, 6}.

When (CDM type, CDM length) is set to (TD-CDM, 4) (refer to Table 6, this is limited to a case in which 3 component RE patterns are arranged in each of group A and group B), component RE pattern (A,i) and component RE pattern (B,i) constitute two CDM groups. Here, i∈{1, 2, 3}.

CDM-8 Configuration for 16-Port CSI-RS Having Component RE Pattern (2,2)

When each of group A and group B includes 2 component RE patterns, (CDM type, CDM length) can be set to (TD-FD-CDM, 8) (refer to Table 6).

Here, component RE pattern (A,i) and component RE pattern (B,i) constitute one CDM8 group. Further, (CDM type, CDM length) can be set to (FD-TD-CDM, 8) (refer to Table 6). Here, component RE pattern (A,i) and component RE pattern (A, i+1) constitute one CDM group and component RE pattern (B,i) and component RE pattern (B,i+1) constitute one CDM group. Here, i∈{1,2}.

When group A includes 4 component RE patterns (A,1), (A,2), (A,3) and (A,4) and group B includes no component RE pattern, (CDM type, CDM length) can be set to (FD-TD-CDM, 8) (refer to Table 6).

Here, component RE pattern (A,j) and component RE pattern (A,j+1) constitute one CDM8 group. Here, j∈{1,3}.

The same applies when group A includes no component RE pattern and group B includes 4 component RE patterns.

CDM-4 Configuration for 16-Port CSI-RS Having Component RE Pattern (2,2)

(CDM type, CDM length) can be set to (FD-CDM, 4) (refer to Table 6). Here, the following two cases will be described.

When each of group A and group B includes 2 component RE patterns, component RE pattern (A,i) and component RE pattern (A,i+1) constitute two CDM4 groups and component RE pattern (B,i) and component RE pattern (B,i+1) constitute two CDM4 groups. Here, i,j∈{1}.

When group A includes 4 component RE patterns and group B includes no component pattern, component RE pattern (A,i) and component RE pattern (A,i+1) constitute two CDM4 groups. Here, i∈{1,3}.

The same applies when group B includes 4 component RE patterns and group A includes no component RE pattern.

(CDM type, CDM length) can be set to (TD-CDM, 4) (refer to Table 6, this corresponds to only a case in which each of group A and group B includes 2 component RE patterns). Component RE pattern (A,i) and component RE pattern (B,i) constitute two CDM4 groups. The same CDM groups are positioned on the same subcarriers. Here, i∈{1, 2}.

Using component RE pattern (2,1) rather than component RE pattern (2,2) can be considered for more flexible CSI-RS RE pattern configuration and CDM configuration.

Configurations for a 32-port CSI RS are described first and then applied to CSI-RSs for a smaller number of ports than 32 ports or modified and applied thereto.

32-port CSI-RS RE patterns can be determined by being divided into four groups, as shown in FIG. 18.

As described above, when CDM type and CDM length are set to (TD-FD-CDM, 8), component RE patterns corresponding to different alphabets and the same natural number, among a total of 16 component RE patterns, constitute one CDM8 group. Details are as follows.

FIG. 18 shows an example of a 32-port CSI-RS having component RE pattern (2,1).

CDM-4 Configuration for 32-Port CSI-RS Having Component RE Pattern (2,1)

When (CDM type, CDM length) is set to (FD-CDM, 4) (refer to Table 6), component RE pattern (A,i) and component RE pattern (A,i+1) constitute two CDM groups.

Similarly, component RE patterns (B,i) and (B,i+1) constitute one CDM4 group, component RE patterns (C,i) and (C,i+1) constitute one CDM4 group and component RE pattern (D,i) and (D,i+1) constitute one CDM4 group. Here, i∈{1,3}, i+1∈{2,4}.

When (CDM type, CDM length) is set to (TD-CDM, 4) (refer to Table 6), component RE patterns (A,i), (B,i), (C,i) and (D,i) constitute two CDM4 groups. Here, i∈{1, 2, 3, 4}.

When (CDM type, CDM length) is set to (TD-FD-CDM, 4) (refer to Table 2), component RE patterns (A,i) and (B,i) constitute one CDM4 group and component RE patterns (C,i) and (D,i) constitute one CDM4 group. Here, i∈{1, 2, 3, 4}.

When (CDM type, CDM length) is set to (TD-FD-CDM, 4) (refer to Table 2), component RE patterns (A,i) and (B,i) constitute one CDM4 group and component RE patterns (C,i) and (D,i) constitute one CDM4 group. Here, i∈{1, 2, 3, 4}.

CDM-8 Configuration for 32-Port CSI-RS Having Component RE Pattern (2,1)

When (CDM type, CDM length) is set to (TD-FD-CDM, 8) (refer to Table 2), component RE patterns (A,i), (B,i), (C,i) and (D,i) constitute one CDM8 group. That is, a CDM group is composed of two different component RE patterns corresponding to different alphabets and the same integer. Here, i∈{1, 2, 3, 4}.

When (CDM type, CDM length) is set to (FD-FD-CDM, 8) (refer to Table 2), two component RE patterns that are contiguous on the frequency axis in two groups that are contiguous on the time axis form one CDM8 group. Considering time/frequency channel selectivity, it is desirable to configure contiguous component RE patterns as the same CDM group. In FIG. 18, 4 component RE patterns (A,i), (A,i+1), (B,i) and (B,i+1) constitute one CDM8 group. Here, i∈{1,3}, i+1∈{2,4}.

In the case of 24 ports, the 32-port CSI-RS RE pattern shown in FIG. 18 may be modified into the following RE pattern.

Component RE patterns denoted by (A,4), (B,4), (C,4) and (D,4) are eliminated, and when (TD-CDM,4), (TD-FD-CDM,4) and (TD-FD-CDM, 8) are configured, CDM groups can be configured as mentioned in the above-described CDM-4 configuration for 32-port CSI-RS having component RE pattern (2,1)/CDM-8 configuration for 32-port CSI-RS having component RE pattern (2,1).

Component RE patterns denoted by (C,3), (C,4), (D,3) and (D,4) are eliminated, and when (TD-FD-CDM,4) is configured, CDM groups can be configured through a method as proposed in the above-described CDM-4 configuration for 32-port CSI-RS having component RE pattern (2,1).

In addition, the principle proposed in the present invention can be intuitively extended/applied/modified for component RE patterns other than component RE patterns (2,2) and (2,1).

Next, indication of frequency RE positions of component CSI-RS RE patterns will be described in more detail.

A joint encoded table in consideration of a frequency RE offset of component CSI-RS RE patterns will be described.

For a 8-port CSI-RS composed of 4 component RE patterns (2,1), a 16-port CSI-RS composed of 4 component RE patterns (2,2), and a 32-port CSI-RS composed of 8 component RE patterns (2,2), a joint encoded table presented as Table 7 is proposed in order to set/define/indicate a frequency position (subcarrier index or subcarrier location) of a component CSI-RS RE pattern.

Figure 19:
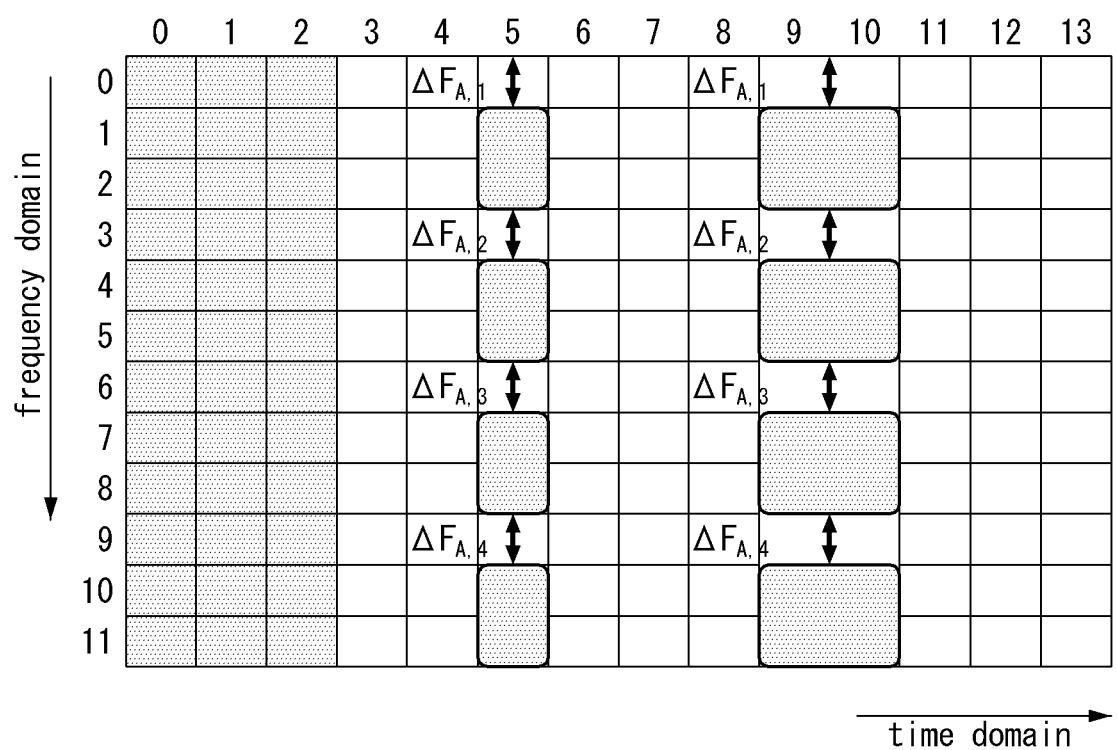
FIG. 19 shows another example of a CSI-RS mapping method proposed in the present disclosure.

Table 7 shows possible RE offset values between component RE patterns shown in FIG. 19, that is, $\Delta F_{A,1}$, $\Delta F_{A,2}$, $\Delta F_{A,3}$ and $\Delta F_{A,4}$.

To set/indicate/define 8/16/32-port CSI-RS RE patterns, a UE and a BS can share a part of or the entire table 7 as information previously appointed/defined therebetween, and the index proposed in Table 7 can be used as a CSI-RS configuration index.

The BS can set/indicate/define frequency RE positions (subcarrier indexes) of 8/16/32-port CSI-RS RE patterns for the UE through higher layer signaling such as RRC and/or lower layer signaling such as DCI/MAC-CE.

In the case of a 32-port CSI-RS, component RE patterns belonging to group A and group B in FIG. 14 may be independently configured or only one group may be configured/defined and the other group may be configured in the same manner except for OFDM symbol index (uniform pattern).

RE patterns corresponding to each configuration index in Table 7 can be included/shared to define (8/16/32-port) CSI-RS resources and can be defined as one or more (8/16/32-port) CSI-RS resource sets.

Indication of frequency RE positions of 8/16/32-port CSI-RS RE patterns using a 12-bit bitmap can be considered. A subcarrier in which a component RE pattern is disposed can be represented by "1" and a subcarrier in which a component RE pattern is not disposed can be represented by "0." In this case, overlapping between component RE patterns may be permitted to indicate component RE pattern locations more flexibly and freely than the proposed method. However, it is not effective to use cases in which component pattern overlapping is permitted.

Accordingly, in a method of indicating/configuring a component RE pattern on the basis of a bitmap in consideration of implementation complexity, the bitmap presented in Table 7 is used as a (configurable) subset of a 12-bit bitmap to indicate/set frequency locations of bitmap based component RE patterns.

In addition, when a starting RE position of a component RE pattern (or a reference RE position of a component CSI-RS RE pattern) is represented by "1", the frequency position of the component RE pattern can be set/indicated using an 11-bit bitmap.

When a component RE pattern location is indicated on the basis of such an 11-bit bitmap, all or some RE patterns corresponding to Table 7 can also be used as a subset of the 11-bit bitmap which is used to determine/indicate/set the frequency position of a component RE pattern (2,2).

For example, (4, 0, 0, 0) corresponding to configuration index 0 (or 12-bit bitmap: [00 00 11 11 11 11]) can be represented as "00001010101" using a 11-bit bitmap that indicates the starting position of a component RE pattern as "1". This can be intuitively extended for all cases presented in Table 7.

All or some information of Table 7 may be defined as pools/sets/dedicated resources of CSI-RS RE patterns previously appointed/defined between a BS and a UE, and the BS can indicate a configuration index corresponding to each RE pattern pool to the UE through higher layer signaling such as RRC or dynamic signaling such as DCI/MAC-CE.

Further, the BS can set/define/indicate all or some information of Table 7 as pools/sets/dedicated resources of CSI-RS RE patterns for the UE through higher layer signaling such as RRC.

When the number of component RE patterns disposed on the same OFDM symbols is not 4 as in a 24-port CSI-RS, a table similar to Table 7 can also be configured, as described above.

Accordingly, the above description can be extended or applied to cases in which the number of subcarriers constituting one PRB is not 12 and cases other than 8/16/32-port cases and thus can be considered to be included in the scope of the present invention.

TABLE 7

| Index | |
|---|---|
| | $(\Delta F_{A,1}, \Delta F_{A,2}, \Delta F_{A,3}, \Delta F_{A,4})$ where $\Delta F_{A,1} + \Delta F_{A,2} + \Delta F_{A,3} + \Delta F_{A,4} = 4$ |
| 0 | (4,0,0,0) [00 00 11 11 11 11] |
| 1 | (0,4,0,0) [11 00 00 11 11 11] |
| 2 | (0,0,4,0) [11 11 00 00 11 11] |
| 3 | (0,0,0,4) [11 11 11 11 00 00] |
| 4 | (3,1,0,0) [000 11 0 11 11 11] |
| 5 | (3,0,1,0) [000 11 11 0 11 11] |
| 6 | (3,0,0,1) [000 11 11 11 0 11] |
| 7 | (1,3,0,0) [0 11 000 11 11 11] |
| 8 | (1,0,3,0) [0 11 11 000 11 11] |
| 9 | (1,0,0,3) [0 11 11 11 000 11] |
| 10 | (0,0,3,1) [11 11 000 11 0 11] |
| 11 | (0,0,1,3) [11 11 0 11 000 11] |
| 12 | (0,3,1,0) [11 000 11 0 11 11] |
| 13 | (0,1,3,0) [11 0 11 000 11 11] |
| 14 | (0,3,0,1) [11 000 11 11 0 11] |
| 15 | (0,1,0,3) [11 0 11 11 000 11] |
| 16 | (2,2,0,0) [00 11 00 11 11 11] |
| 17 | (2,0,2,0) [00 11 11 00 11 11] |
| 18 | (2,0,0,2) [00 11 11 11 00 11] |
| 19 | (0,0,2,2) [11 11 00 11 00 11] |
| 20 | (0,2,0,2) [11 00 11 11 00 11] |
| 21 | (0,2,2,0) [11 00 11 00 11 11] |
| 22 | (1,1,1,1) [0 11 0 11 0 11 0 11] |
| | $(\Delta F_{A,1}, \Delta F_{A,2}, \Delta F_{A,3}, \Delta F_{A,4})$ where $\Delta F_{A,1} + \Delta F_{A,2} + \Delta F_{A,3} + \Delta F_{A,4} = 3$ |
| 23 | (3,0,0,0) [000 11 11 11 11 0] |
| 24 | (0,3,0,0) [11 000 11 11 11 0] |
| 25 | (0,0,3,0) [11 11 000 11 11 0] |
| 26 | (0,0,0,3) [11 11 11 000 11 0] |
| 27 | (2,1,0,0) [00 11 0 11 11 11 0] |
| 28 | (2,0,1,0) [00 11 11 0 11 11 0] |
| 29 | (2,0,0,1) [00 11 11 11 0 11 0] |
| 30 | (1,2,0,0) [0 11 00 11 11 11 0] |
| 31 | (1,0,2,0) [0 11 11 00 11 11 0] |
| 32 | (1,0,0,2) [0 11 11 11 00 11 0] |
| 33 | (0,0,2,1) [11 11 00 11 0 11 0] |
| 34 | (0,0,1,2) [11 11 0 11 00 11 0] |
| 35 | (0,2,1,0) [11 00 11 0 11 11 0] |
| 36 | (0,1,2,0) [11 0 11 00 11 11 0] |
| 37 | (0,2,0,1) [11 00 11 11 0 11 0] |
| 38 | (0,1,0,2) [11 0 11 11 00 11 0] |
| 39 | (1,1,1,0) [0 11 0 11 0 11 000] |
| 40 | (1,1,0,1) [0 11 0 11 11 0 11 0] |
| 41 | (1,0,1,1) [0 11 11 0 11 0 11 0] |
| 42 | (0,1,1,1) [11 0 11 0 11 0 11 0] |
| | $(\Delta F_{A,1}, \Delta F_{A,2}, \Delta F_{A,3}, \Delta F_{A,4})$ where $\Delta F_{A,1} + \Delta F_{A,2} + \Delta F_{A,3} + \Delta F_{A,4} \leq 2$ |
| 43 | (2,0,0,0) [00 11 11 11 11 00] |
| 44 | (0,2,0,0) [11 00 11 11 11 00] |
| 45 | (0,0,2,0) [11 11 00 11 00 00] |
| 46 | (0,0,0,2) [11 11 11 00 11 00] |
| 47 | (1,1,0,0) [0 11 0 11 11 11 00] |
| 48 | (1,0,1,0) [0 11 11 0 11 11 00] |
| 49 | (1,0,0,1) [0 11 11 11 0 11 00] |
| 50 | (0,1,0,1) [11 0 11 11 0 11 00] |
| 51 | (0,1,1,0) [11 0 11 0 11 11 00] |
| 52 | (0,0,1,1) [11 11 0 11 0 11 00] |
| 53 | (1,0,0,0) [0 11 11 11 11 0 00] |
| 54 | (0,1,0,0) [11 0 11 11 11 0 00] |
| 55 | (0,0,1,0) [11 11 0 11 11 0 00] |
| 56 | (0,0,0,1) [11 11 11 0 11 0 00] |
| 57 | (0,0,0,0) [11 11 11 11 00 00] |

FIG. 19 shows another example of the CSI-RS RE mapping method proposed in the present disclosure.

Next, hybrid type, that is, fixed and flexible candidate locations of component CSI-RS RE patterns will be described.

A BS and a UE may appoint possible component CSI-RS RE pattern frequency/time positions and the BS may indicate/set the same for UE.

In the case of LTE, possible locations of component CSI-RS RE patterns are fixed to PRBs and some or all thereof are selected and used.

This may restrict CSI-RS RE pattern configuration performed by the BS.

Meanwhile, excessively high flexibility may increase implementation complexity. Accordingly, the following is proposed.

The BS can set/indicate one OFDM symbol index and x/4 configuration indexes for a UE in order to determine RE patterns for X-port CSI-RSs (X=8, 12, 16, 24, 32) through higher layer signaling such as RRC.

Figure 21:
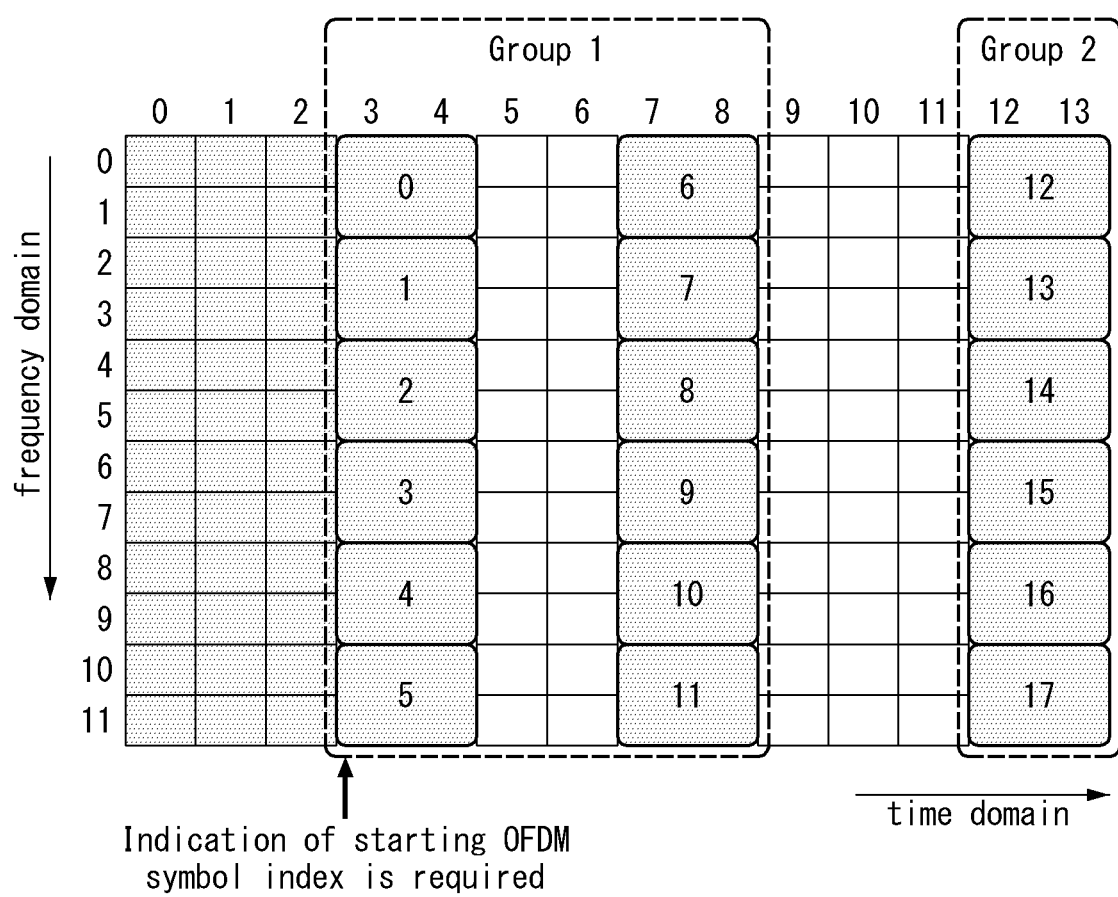
FIG. 21 is a diagram showing another example of possible component CSI-RS pattern (2, 2) location proposed in the present disclosure.

The indicated OFDM symbol index is a starting OFDM symbol index of group 1 in FIG. 21 and symbol positions of group 1 may be changed according to setting/indication/definition of the BS.

Group 2 is fixed to a predefined/appointed position (e.g., OFDM symbol indexes 9 and 10 or 12 and 13).

The X/4 configuration indexes are used to indicate/set/define locations of X/4 component CSI-RS RE patterns (2,2) for the UE.

Figure 20:
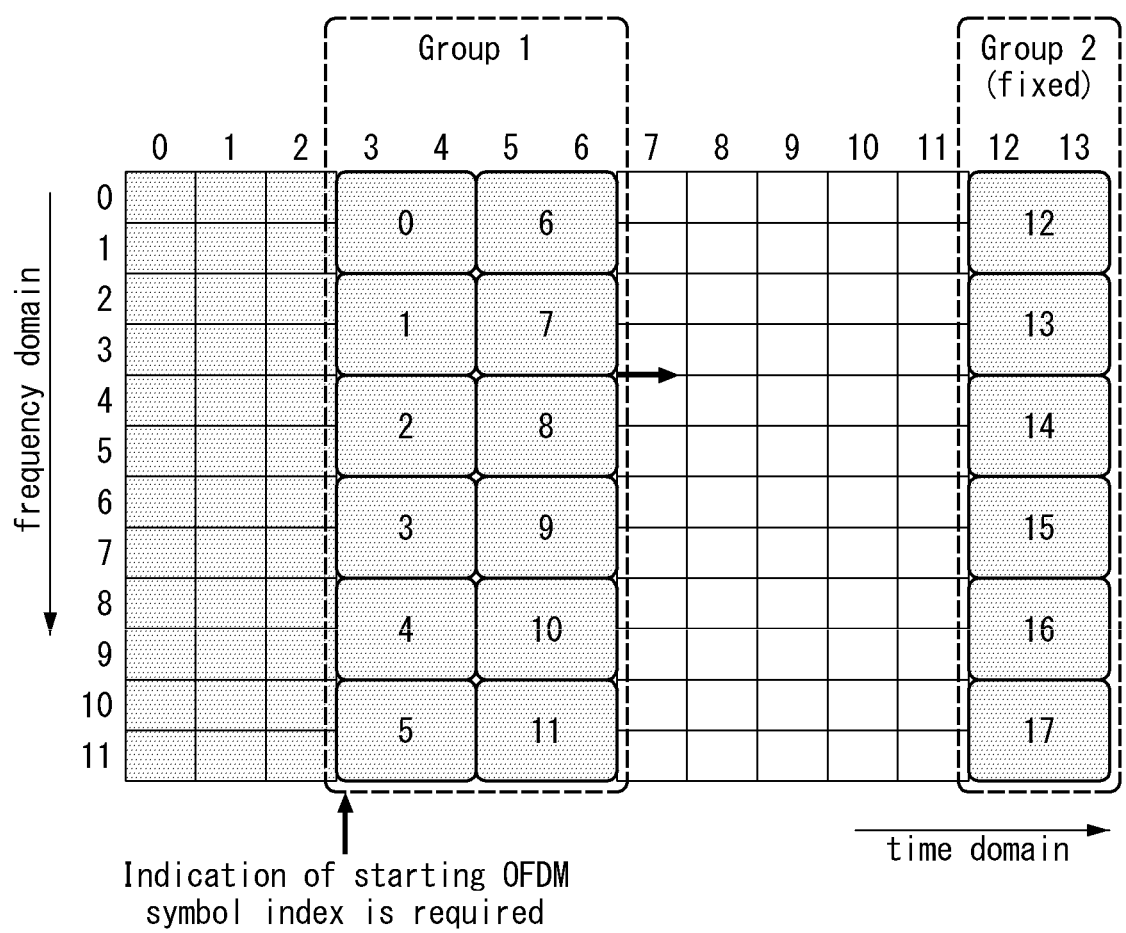
FIG. 20 is a diagram showing possible component CSI-RS pattern (2, 2) location proposed in the present disclosure.

Alternatively, the indicated OFDM symbol index may be a starting OFDM symbol index of group 2 in FIG. 20 or 21, symbol positions of group 2 may be changed according to setting/indication/definition of the BS (e.g., the position of group 2 may be indicated as one of symbols 2 to 13), and frequency/symbol positions of group 1 may be fixed to positions previously appointed/defined between the BS and the UE.

For example, a position to which group 1 is fixed may be symbol indexes 3, 4, 5 and 6 or 10, 11, 12 and 13.

The X/4 configuration indexes are used to indicate/set/define locations of X/4 component CSI-RS RE patterns (2,2) for the UE.

Additionally, configuration indexes for possible location patterns having different possible locations are set/indicated, as shown in FIG. 20 or 21, and a component RE pattern location along with a starting OFDM symbol index in the set possible location patterns can be defined/set/indicated (e.g., one of the possible location patterns shown in FIG. 20 or 21 is set/indicated/defined) for the UE.

FIG. 20 shows an example of possible locations of the component CSI-RS RE pattern (2,2).

FIG. 21 shows another example of possible locations of the component CSI-RS RE pattern (2,2).

The BS may set/indicate one OFDM symbol index and X/2 configuration indexes for a UE in order to determine an X-port CSI-RS RE patter (X=2, 8, 12) through higher layer signaling such as RRC.

Figure 22:
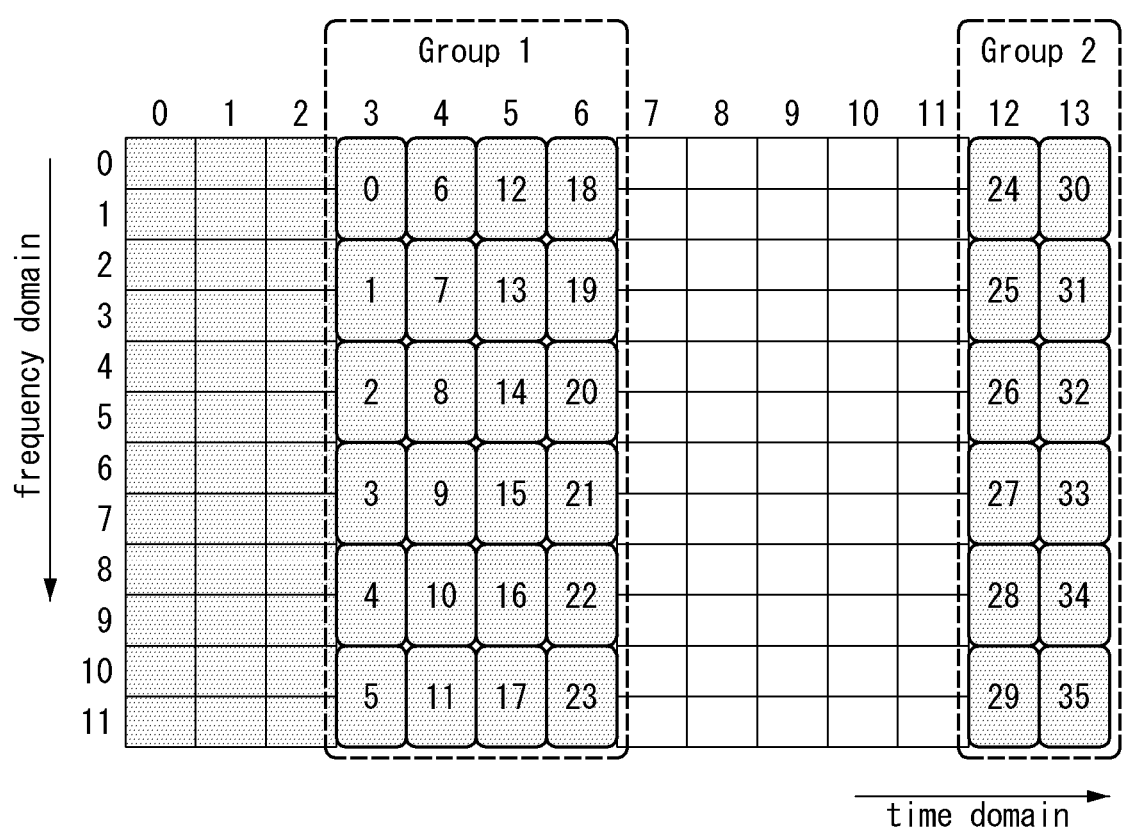
FIG. 22 is a diagram showing an example of possible component CSI-RS pattern (2, 1) location proposed in the present disclosure.
Figure 23:
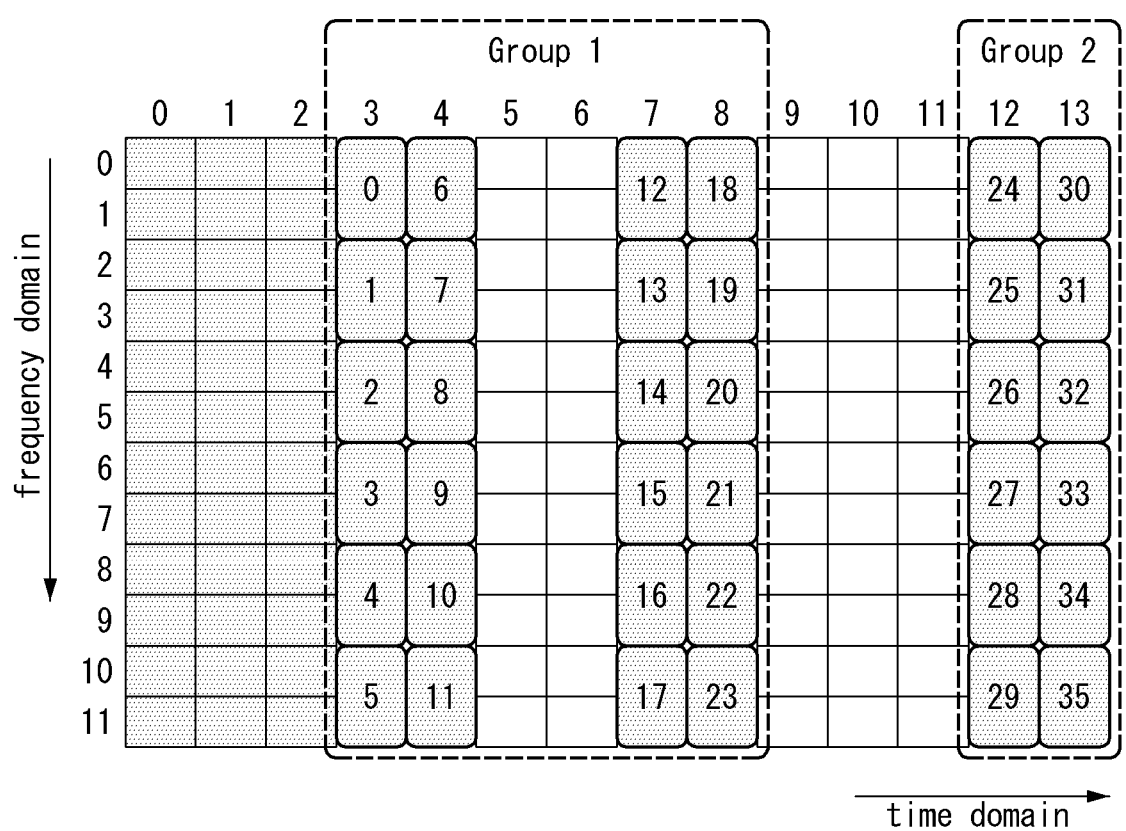
FIG. 23 is a diagram showing another example of possible component CSI-RS pattern (2, 1) location proposed in the present disclosure.

The indicated OFDM symbol index is a starting OFDM symbol index of group 1 shown in FIG. 22 or 23 and symbol positions of group 1 may be changed according to setting/indication/definition of the BS.

Group 2 is a positions at which a previously defined/appointed fixed component CSI-RS RE pattern (2,1) can be indicated/set/defined (e.g., symbol indexes 9 and 10 or 12 and 13).

The X/2 configuration indexes are used to indicate/set/define the locations of X/2 component CSI-RS RE patterns (2,1) for the UE.

Alternatively, the indicated OFDM symbol index is a starting OFDM symbol index of group 2 shown in FIG. 22 or 23, symbol positions of group 2 may be changed according to setting/indication/definition of the BS (e.g., the position of group 2 may be indicated by one of symbols 2 to 13), and frequency/symbol positions of group 1 may be fixed to positions previously appointed/defined between the BS and the UE (e.g., a fixed position of group 1 is symbol indexes 3, 4, 5 and 6 or 10, 11, 12 and 13).

The X/2 configuration indexes are used to indicate/set/define the locations of X/2 component CSI-RS RE patterns (2,1) for the UE.

FIG. 22 is a diagram showing an example of configurable locations of component CSI-RS RE pattern (2,1).

FIG. 23 is a diagram showing another example of configurable locations of component CSI-RS RE pattern (2,1).

Next, details with respect to co-existence of NR and LTE will be described.

When an NR UE operates in an LTE network, the NR UE receives a CSI-RS only using one or more of fifth, sixth, ninth, tenth, twelfth and thirteenth symbols among 14 OFDM symbols #0 to #13.

When an LTE UE operates in an NR network, the LTE UE receives a CSI-RS only using one or more of fifth, sixth, ninth, tenth, twelfth and thirteenth symbols among 14 OFDM symbols #0 to #13.

In addition, when an NR UE operates in an LTE network, the NR UE receives a beam management CSI-RS only using symbols #9 and/or #10 among OFDM symbols #0 to #13.

That is, the UE does not expect reception of a beam management CSI-RS in symbols other than symbols #9 and #10.

When the NR UE operates in an LTE network, the UE does not expect CDM-8 configuration.

When an NR BS implicitly or explicitly recognizes UE capability of a UE served thereby, the NR BS does not configure/indicate a 4-port CSI-RS for the UE. An LTE UE also does not expect 4-port CSI-RS configuration in an NR network.

The NR BS does not configure/indicate CDM-8 for an LTE UE.

An NR UE can identify whether the network to which the NR UE belongs is an LTE network or an NR network through configuration/indication for a 4-port CSI-RS and report the identification result to the BS.

When a 12-port DMRS is configured, a UE does not expect configurations other than CDM-8 for a 24-port or 32-port CSI-RS. Since a throughput (capacity) gain according to a high multiplexing gain may be lower than that in small layer (a low rank or a small number of data streams) data transmission unless accurate channel information is guaranteed when high layer (high rank) data transmission, it is important to acquire a CDM gain in order to obtain accurate channel information when a high port-DMRS is configured.

Next, CSI-RS patterns considering DMRS RE patterns will be described.

When an additional DMRS is indicated/configured, a UE does not expect CDM-8 configuration.

When the additional DMRS is indicate/configured, the UE does not expect configuration/indication of CSI-RS REs in configured additional DMRS symbols.

When an additional DMRS for 8 or more ports is indicated/configured, the UE does not expect configuration/indication of CSI-RS REs at additional DMRS symbol positions.

Considering LTE UEs, NR needs to support CSI-RS (sequence) transmission in at least one of fifth, sixth, ninth, tenth, twelfth and thirteenth OFDM symbols in a (normal) slot/PRB composed of 14 symbols.

Next, a method of determining a CSI-RS RE position dependent on a DMRS RE position will be described.

A 32-port CSI-RS will be described as an example.

Figure 24:
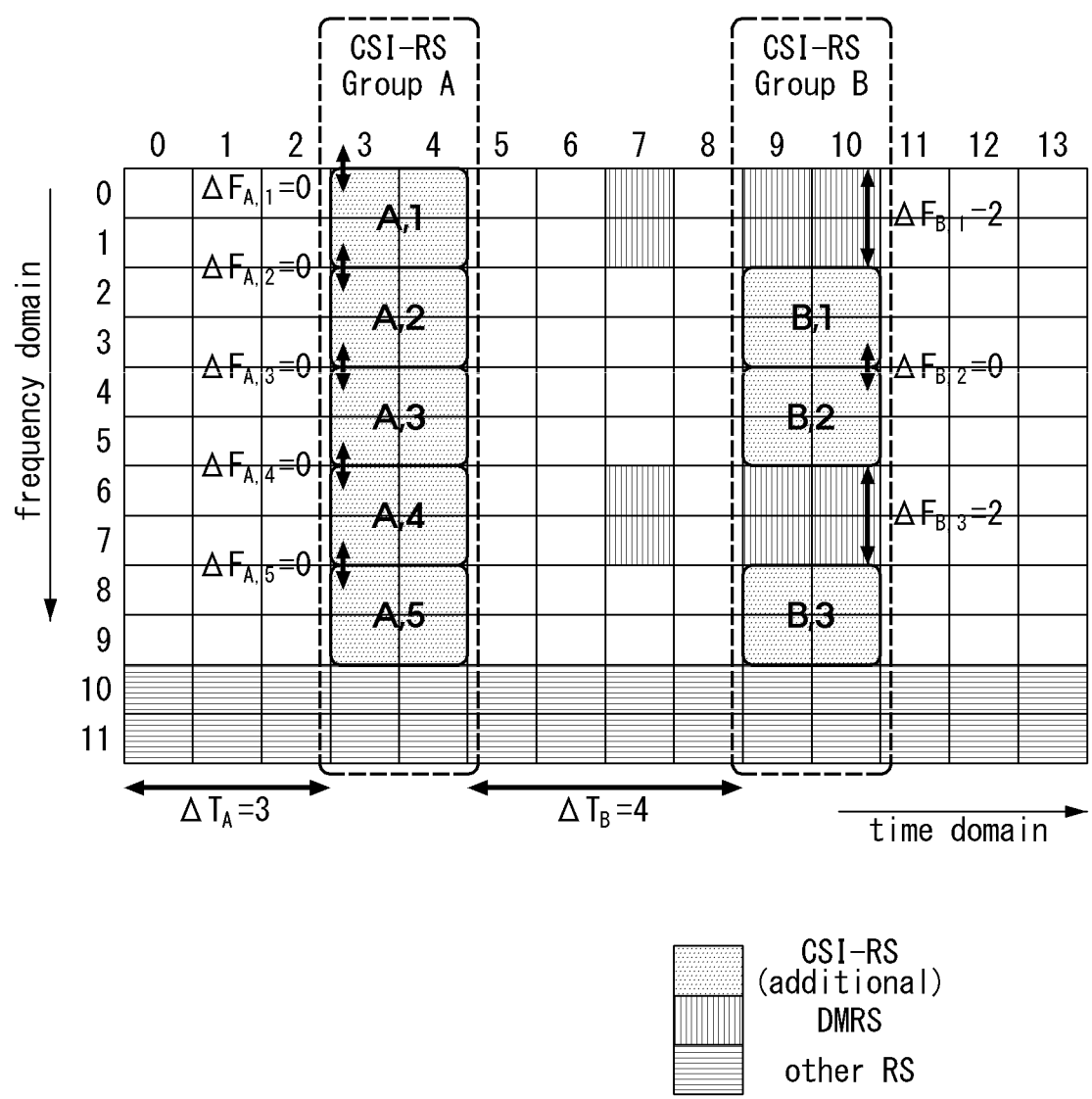
FIG. 24 is a diagram showing an example of CSI-RS RE location proposed in the present disclosure.

When a 2-port additional DMRS with N=1 or a 4-port additional DMRS with N=2 is configured, 5 component CSI-RS RE patterns are disposed in group A and 3 component CSI-RS RE patterns are disposed in group B, as shown in FIG. 24, as RE patterns for 32-port CSI-RS resources. Here, frequency RE positions (subcarrier index) of the 3 component CSI-RS RE patterns disposed in group B are set to be adjacent to an additional DMRS RE (tied to a DMRS RE position), as shown in FIG. 24. A UE does not expect other configurations/indications.

Frequency RE positions (subcarrier index) of the 5 component CSI-RS RE patterns disposed in group A are fixed, as shown in FIG. 24, and time RE positions (symbol positions) of the 5 component RE patterns are set to be the next to the last symbol of a front-loaded DMRS. A UE does not expect other configurations/indications.

FIG. 24 is a diagram showing an example of CSI-RS RE positions proposed in the present disclosure.

Next, a 24-port CSI-RS will be described as an example.

When a 2-port additional DMRS with N=1 or a 4-port additional DMRS with N=2 is configured, 3 component CSI-RS RE patterns are disposed in group A and 3 component CSI-RS RE patterns are disposed in group B as RE patterns for 24-port CSI-RS resources. Here, symbols of the component RE patterns of group A are positioned at OFDM symbols following the last symbols of a front-loaded DMRS and frequency RE positions thereof are set to be the same frequency RE positions of the component RE patterns of group B. A UE does not expect other configurations.

Figure 26:
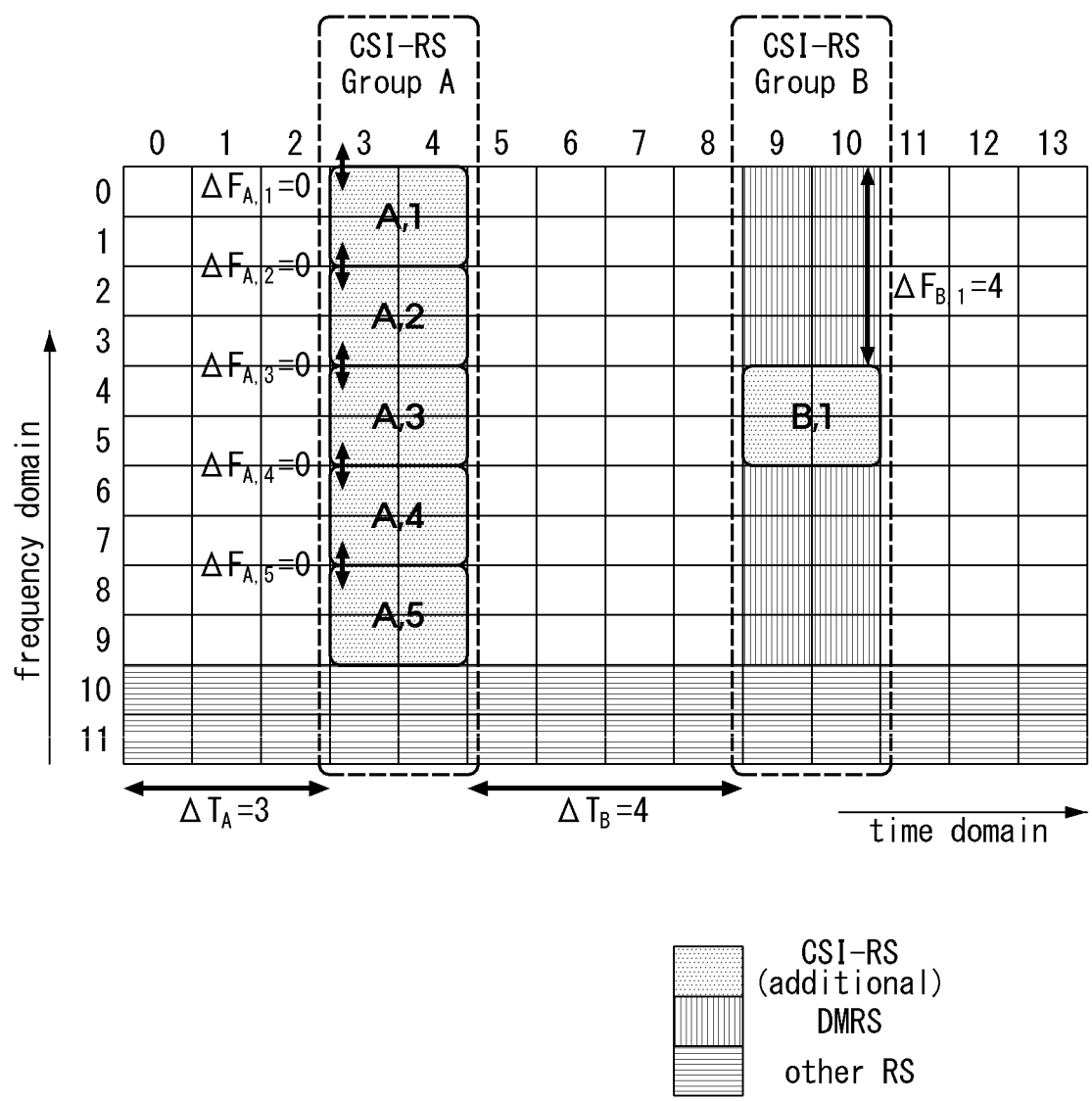
FIG. 26 is a diagram showing an example of 24-port (uniform) CSI-RS RE location having additional 8-port DMRS REs proposed in the present disclosure.

When a 8-port additional DMRS with N=2 or a 4-port additional DMRS with N=1 is configured, 6 component CSI-RS RE patterns are disposed in group A and one component CSI-RS RE pattern is disposed in group B as 24-port CSI-RS RE patterns, as shown in FIG. 26.

Frequency RE offsets of 5 component CSI-RS RE patterns of group A are 0 and symbol location is determined to be a symbol following the last symbol of a front-loaded DMRS. A frequency RF offset of the component RE pattern of group B is 4 and symbol location is determined as symbol location of the additional DMRS. A UE does not expect other configuration.

Figure 25:
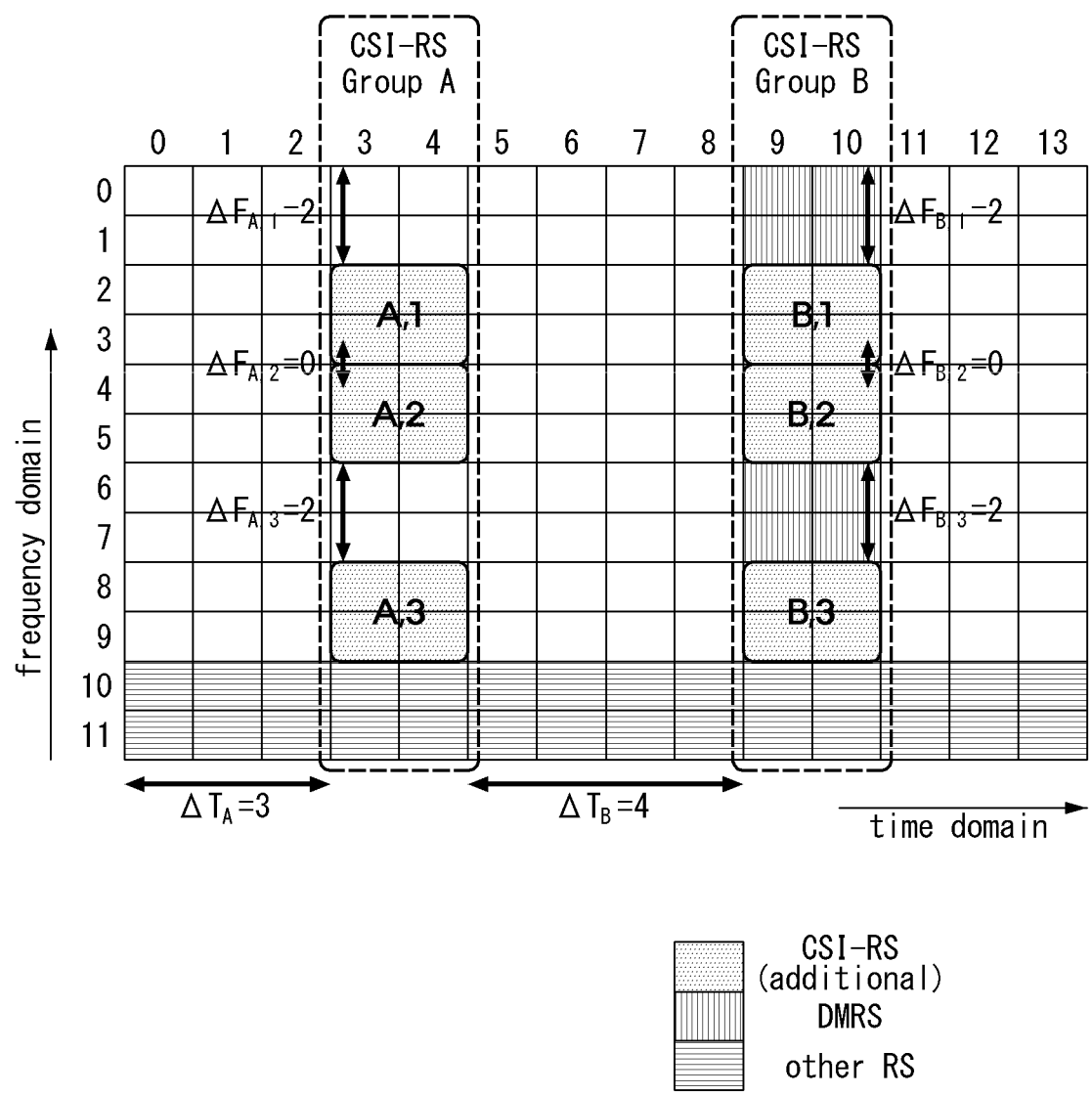
FIG. 25 is a diagram showing an example of 24-port (uniform) CSI-RS RE location having additional 4-port DMRS REs proposed in the present disclosure.

FIG. 25 is a diagram showing an example of 24-port (uniform) CSI-RS RE positions having additional 4-port DMRS REs.

FIG. 26 is a diagram showing an example of 24-port (uniform) CSI-RS RE positions having additional 8-port DMRS REs.

Next, a method for signaling component CSI-RS RE pattern location indication in consideration of other RSs will be described.

With respect to PTRS/TRS/DMRS configured through higher layer signaling such as RRC, presence or absence of PTRS/TRS/DMRS REs on PRBs (which means PTRS/TRS/DMRS RE on/off or activation/deactivation on PRBs) and/or RE patterns thereof can be implicitly/explicitly indicated to a UE through L1/L2 signaling and/or higher layer signaling.

A BS can set/reset CSI-RS/PTRS/TRS/DMRS RE positions (dependently) according to presence or absence of one or more indicated CSI-RS/PTRS/TRS/DMRS REs and RE patterns thereof and implicitly/explicitly configure/indicate CSI-RS/PTRS/TRS/DMRS REs for a UE through higher layer signaling such as RRC and/or lower layer signaling such as L1/L2.

This concept is applied to channels such as a PDCCH as well as RSs. That is, component CSI-RS RE pattern location indication in consideration of PDCCH can conform to the above description.

For example, in the case of CSI-RS, in a case in which RS REs other than CSI-RS REs and/or channel REs such as a PDCCH are not present in the same PRB and a case in which PTRS REs, TRS REs, front-loaded DMRS REs and/or additional DMRS REs are present along with CSI-RS REs, a plurality of CSI-RS resources including RE-mapping patterns can be defined/configured in consideration of such cases and RE patterns thereof, and one or more CSI-RS resource set having the CSI-RS resources as elements can be defined/configured.

The BS can select appropriate CSI-RS resources from CSI-RS resource sets in consideration of collision between RS REs according to presence/absence (on/off) of one or more other RS REs in CSI-RS REs and PTRS/TRS/front loaded DMRS/additional DMRS in the same PRB and indicate/define/configure the selected CSI-RS resources for a UE through L1 and/or L2 signaling.

Particularly, since TRS can be regarded as an RS having high cell-specific property (reference signals for time/frequency tracking), CSI-RS resources (defined in resource setting/CSI resource set) can be selected and used according to configuration/presence or absence of TRS REs and TRS RE pattern to effectively present collision between two RS REs.

Particularly, when 1-port CSI-RS resources are used for TRS, effective joint selection between CSI-RS resources is conceivable in consideration of overlapping/collision between 1-port CSI-RS resources used for TRS configuration and CSI-RS REs to be used for CSI acquisition.

For example, the BS can define locations of component CSI-RS RE patterns to be used (e.g., all component CSI-RS RE patterns may be configured to be always contiguous on the frequency axis) when there is no PTRS RE (which refers to a case in which PTRS is configured for a UE through higher layer signaling such as RRC but PTRS REs are not activated (on) through L1/L2 signaling according to MCS. The same applies to the following description about absence of PTRS RE) and separately define locations of component CSI-RS RE patterns to be used when a PTRS RE is present in consideration of PTRS RE positions (for example, component CSI-RS RE patterns may be configured to have a subcarrier RE offset therebetween).

The BS sets/indicates component CSI-RS RE pattern location information about the two cases to a UE through higher layer signal such as RRC, and the UE recognizes the set CSI-RS RE pattern according to PTRS RE configuration/indication/activation set/indicated according to MCS.

When an X-port CSI-RS is configured (X<24), the BS can configure RE patterns such that a plurality of component CSI-RS RE patterns are grouped into two RE groups that always have a frequency RE offset (frequency offset).

The UE does not expect configuration of RE patterns other than the aforementioned configuration.

Figure 27:
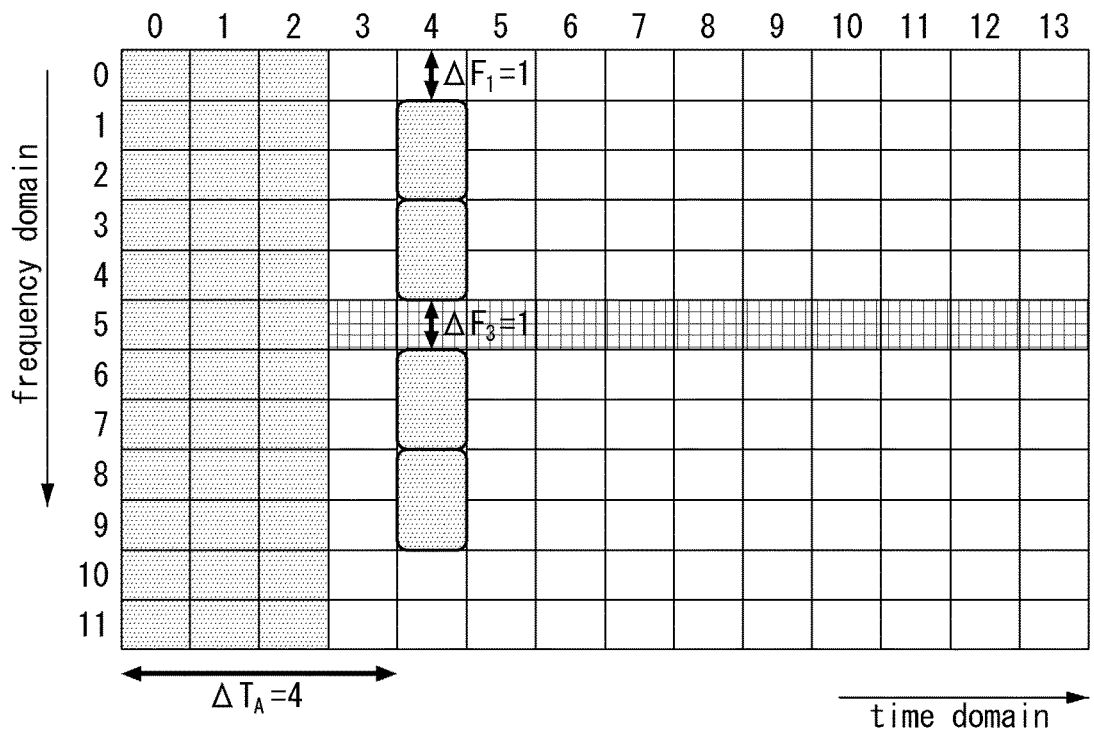
FIGS. 27 to 29 show examples of 8-port CSI-RS PE patterns proposed in the present disclosure.
Figure 28:
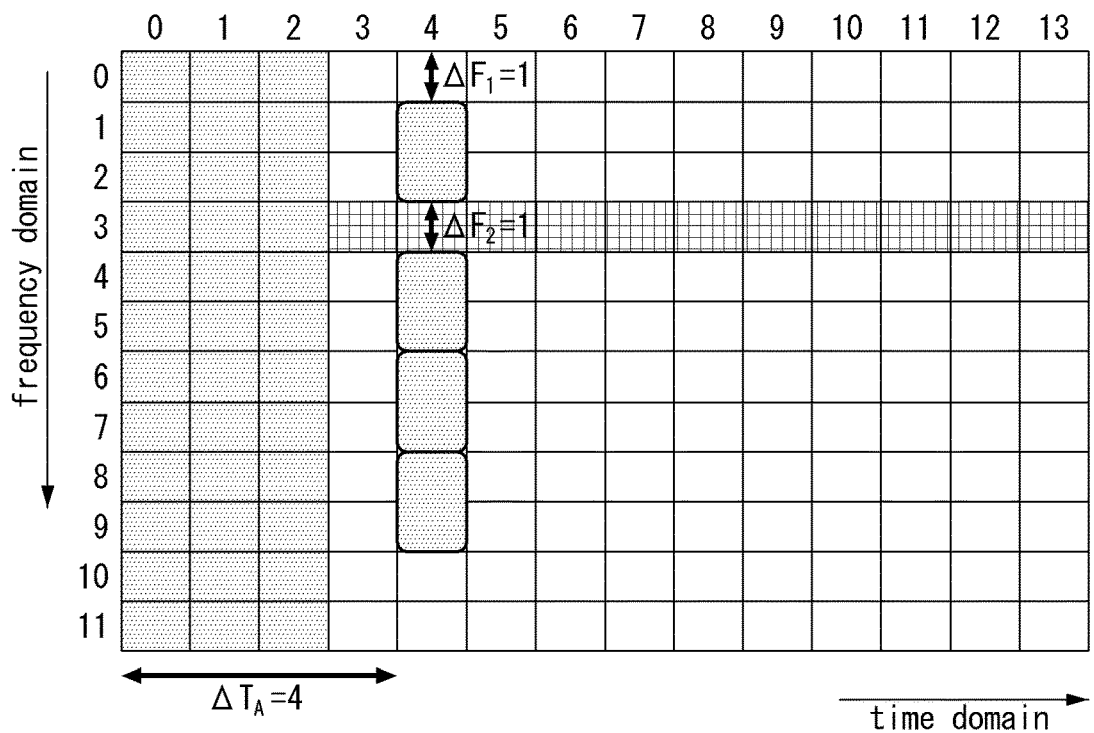
Figure 29:
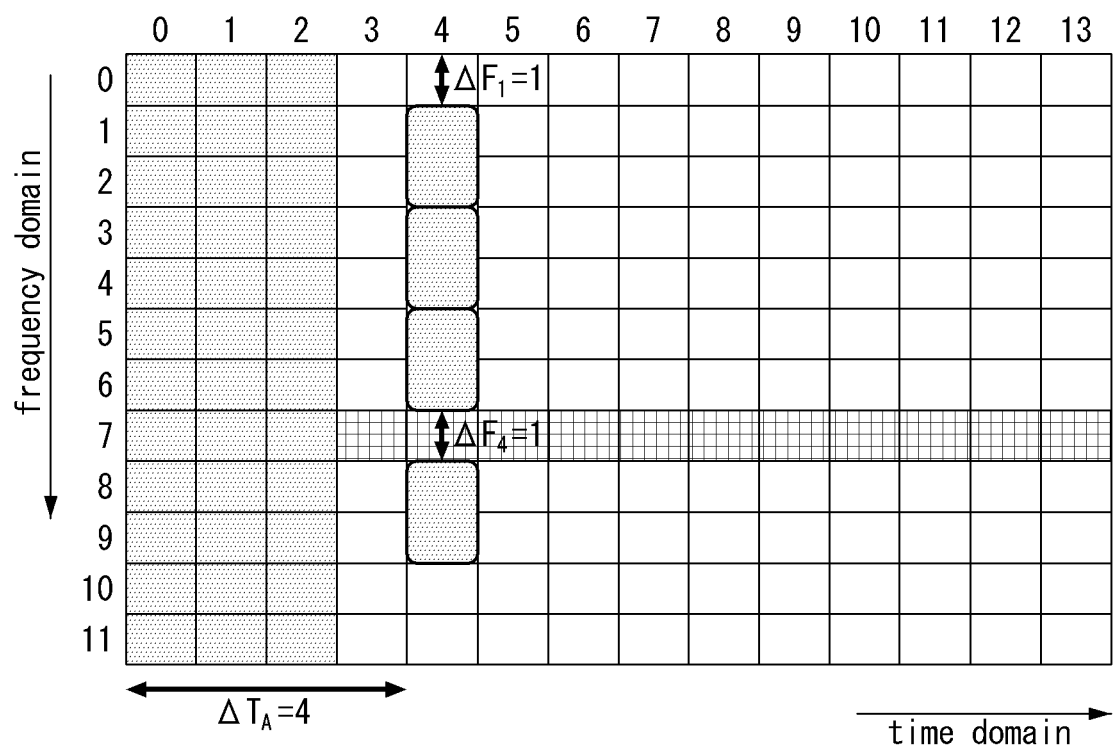

For example, a case of X=8 in which an RE pattern is generated using 4 component CSI-RS patterns (2,1) is illustrated in FIGS. 27 to 29.

For reference, the BS and the UE can appoint a method of indicating an RE pattern using a bitmap that represents subcarrier positions at which a component RE pattern is disposed by 1.

With respect to 8-port CSI-RS resources having a component CSI-RS RE pattern (2,1), different 8-port CSI-RS resources can be defined for three RE-mapping patterns shown in FIGS. 27 to 29.

In this manner, one CSI-RS resource set can be configured/defined and set to a UE through higher layer signaling for all cases in which a CSI-RS RE pattern is composed of two RE groups having one RE offset (frequency offset) (in consideration of all possible $\Delta F_1$, $\Delta F_2$, $\Delta F_3$ and $\Delta F_4$.

When PTRS REs are on (or activated) according to MCS, the BS can select a specific CSI-RS resource from the defined CSI-RS resource set in consideration of PTRS RE positions and indicate/define or set the specific CSI-RS resource for the UE through lower layer signaling such as L1/L2.

The above description can be intuitively extended/applied for cases other than the case of X=8 and thus cases other than the case of X=8 can be considered to be included in the scope of the present invention.

A frequency offset between component RE patterns (e.g., $\Delta F_1$, $\Delta F$, $\Delta F_3$, $\Delta F_4$ in an 8-port case) defines RE-mapping and can be included in a CSI-RS resource (definition).

Figure 30:
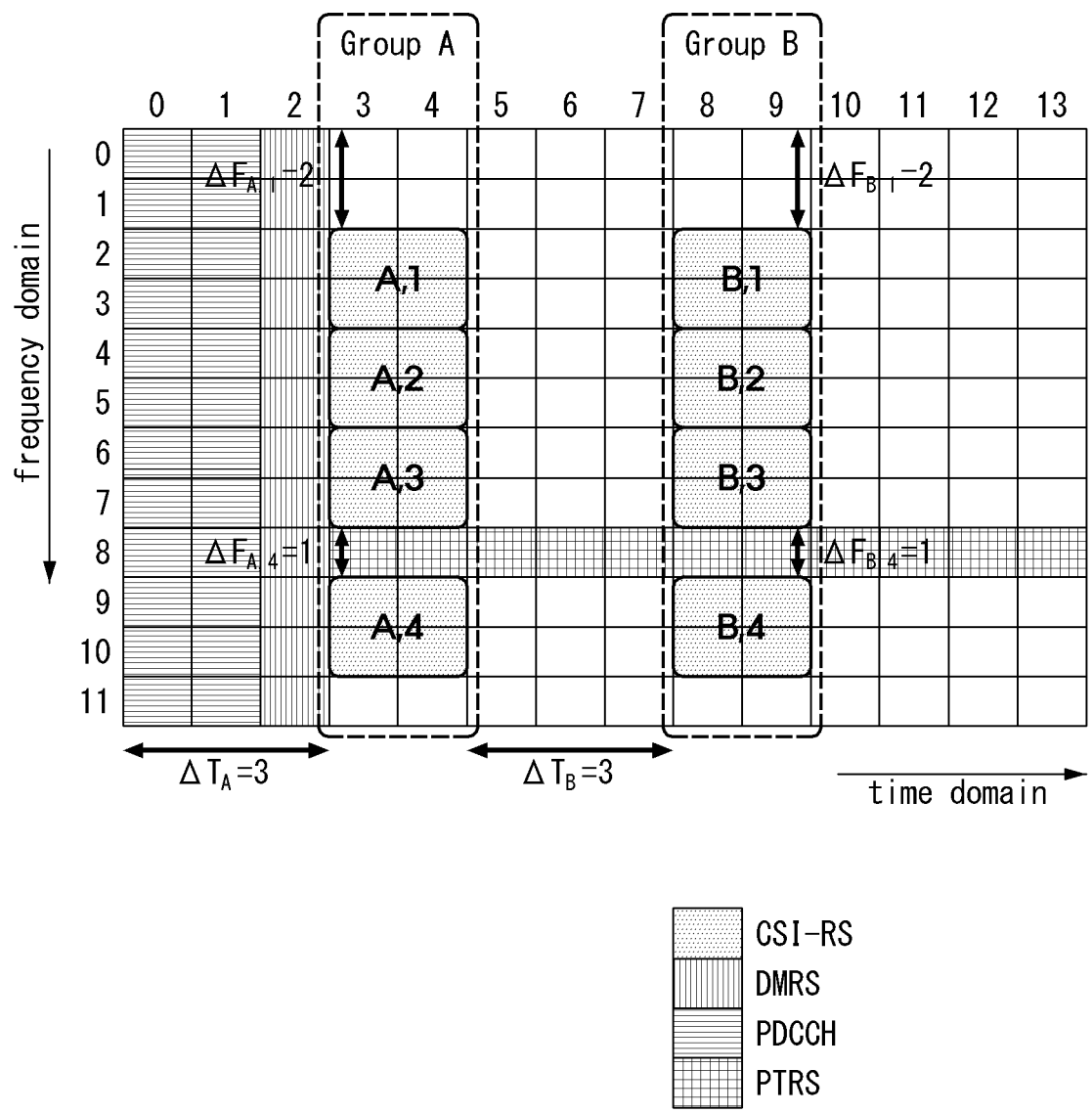
FIG. 30 shows an example of RE patterns of a PTRS and a 32-port CSI-RS proposed in the present disclosure.

When X≥24, the BS configures a total of 4 RE groups having a time offset (OFDM symbol RE offset) as well as a frequency offset between component CSI-RS REs, and the UE does not expect other configurations. For example, a 32-port CSI-RS RE pattern can be configured as shown in FIG. 30.

FIGS. 27 to 29 show examples of an 8-port CSI-RS RE pattern.

When an X-port CSI-RS defined by two or more component CSI-RS RE patterns is configured, the BS can set an RE offset between RE groups to 0 or 1, as shown in FIG. 7, in order to minimize signaling overhead. The UE does not expect configurations other than the aforementioned configuration.

Additionally, when X=32, the number of component CSI-RS RE patterns belonging to each of group A and group B can be set to 4 when PTRS is implicitly indicated according to a MCS level and the UE can recognize the same even if there is no additional indication/configuration of the BS.

At least the following configuration parameters are signaled through RRC for at least CSI acquisition.

N, M and L: implicitly or explicitly indicated.

At least the following information is signaled in each CSI report setting:

Reported CSI parameter(s);

CSI Type (I or II) when reported;

Codebook configuration including codebook subset restriction;

Time domain behavior;

Frequency granularity for CQI and PMI;

Measurement restriction configurations

In each resource setting:

Configuration of S≥1 CSI-RS resource set(s);

Configuration of Ks≥1 CSI-RS resources for each set including at least mapping to REs, the number of ports and time-domain behavior In each of L links in CSI measurement setting:

CSI reporting setting indication, resource setting indication, quantity (channel or interference) to be measured One CSI report setting can be linked to one or more resource settings.

A plurality of CSI reporting settings can be linked to the same resource setting.

At least the following information is dynamically selected according to L1 or L2 signaling (if necessary).

One or multiple CSI report settings in a CSI measurement setting

One or more CSI-RS resource sets selected from at least one resource setting

One or more CSI-RS resources selected from at least one CSI-RS resource set

Alternatively, a CSI-RS RE pattern to be configured/used for a aperiodic (AP)/semi-persistent CSI-RS and a CSI-RS RE pattern to be configured/used for a periodic CSI-RS may be separately defined and indicated to a UE.

The periodic CSI-RS can be configured such that component CSI-RS RE patterns are contiguous on the time axis and/or the frequency axis regardless of other RS REs and the aperiodic (AP)/semi-persistent (SP) CSI-RS can be configured such that component CSI-RS RE patterns have a subcarrier RE offset therebetween with regard to RE positions of other RSs such as PTRS/TRS/DMRS.

When the BS implicitly/explicitly indicates activation of RS REs other than CSI-RS RE to a UE, the BS can indicate/activate AP/SP CSI-RS such that the UE can recognize a CSI-RS RE pattern configured along with the RS REs.

As another method, there is a method of resetting/setting/indicating locations of all or some component CSI-RS RE patterns through L1/L2 signaling such as DCI/MAC-CE.

For example, only $\Delta F_{A,4}$ and $\Delta F_{B,4}$ values shown in FIG. 30 can be set/indicated to a UE.

In implicit reconfiguration/indication, a BS and a UE can operate according to an appointed rule for resetting locations of component CSI-RS RE patterns according to presence or absence of indicated PTRS REs.

For example, the following operation can be appointed for cases in which 4 32-port CSI-RS RE patterns are configured to be contiguous in each group and one or more configured PTRS REs overlap with component CSI-RS RE pattern (W,i) location.

Locations of i or larger component RE patterns (W,i) are shifted on the frequency axis by 1 RE or 2 REs (W∈{A, B}, i∈{1, 2, 3, 4}, refer to FIG. 30).

Here, when component RE pattern locations cross a PRB boundary, locations of i or smaller component RE patterns (W,i) are shifted on the frequency axis by 1 RE.

In the worst case (when collision with a PTRS RE cannot be avoided), the PTRS RE is punctured.

FIG. 30 shows an example of RE patterns of a PTRS and a 32-port CSI-RS.

(32-port) CSI-RS RE frequency-axis location with regard to TRS (Tracking RS) RE will be described.

A method of determining component CSI-RS RE pattern location in consideration of FDM of CSI-RS REs and TRS REs when 2 TRS (Tracking Reference Signal) symbols are disposed having one OFDM symbol offset therebetween (one time-axis RE offset) in the case of 32-port CSI-RS will be described.

When comb-4 TRS is configured/indicated through higher layer signaling, locations of 8 component CSI-RS RE patterns (2,2) on a PRB can be set as follows for 32-port CSI-RS configuration.

Figure 31:
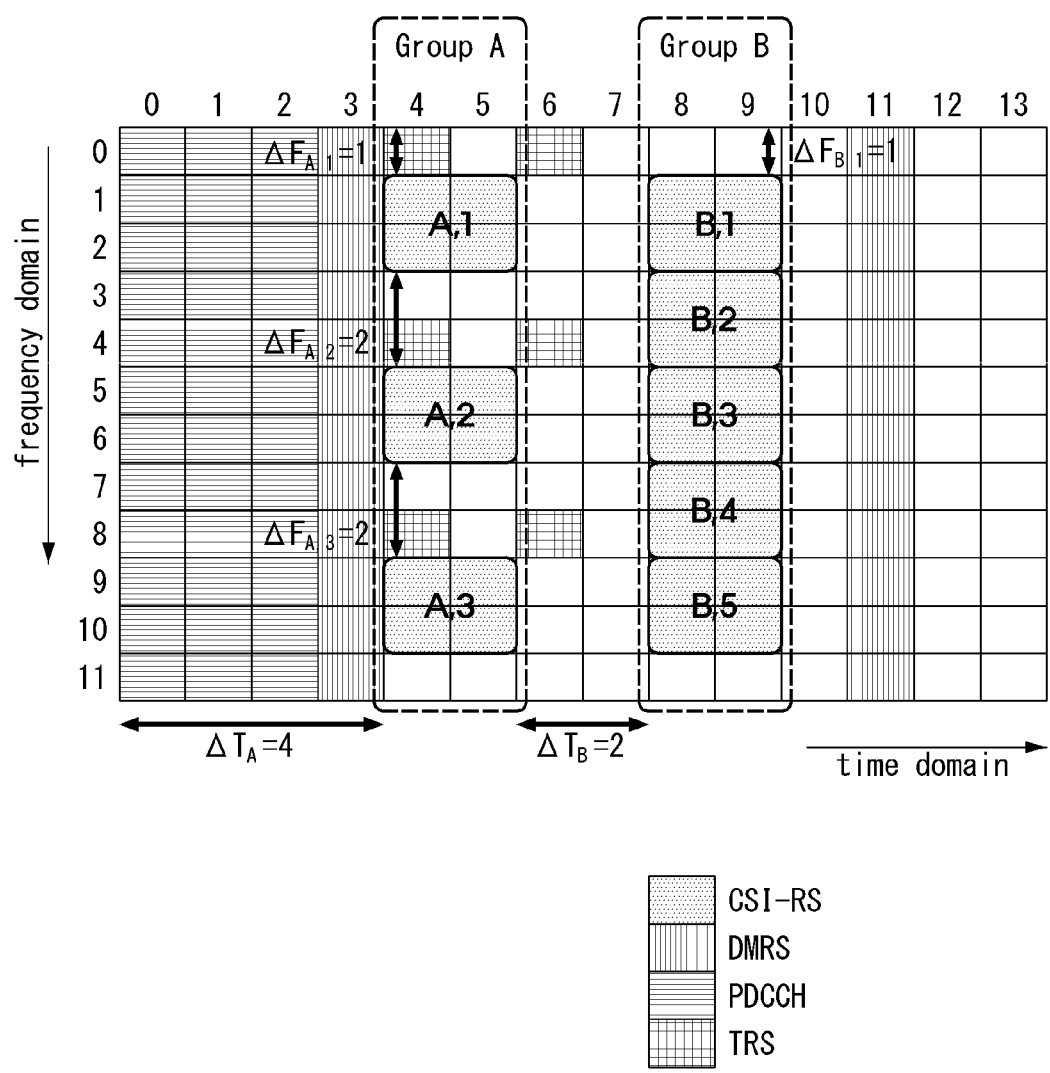
FIG. 31 shows an example of an RE pattern of a 32-port CSI-RS RE pattern having a TRS proposed in the present disclosure.
Figure 32:
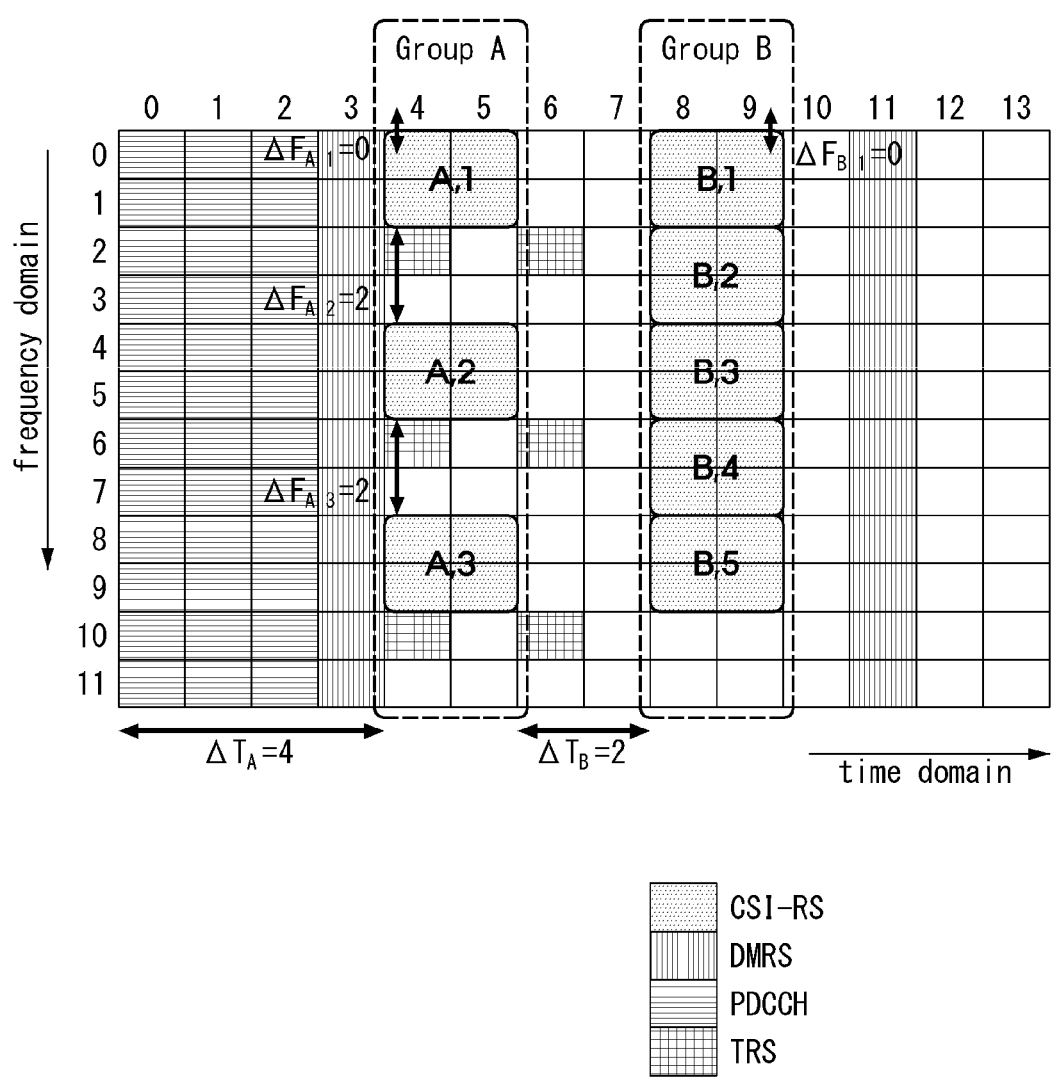
FIG. 32 shows another example of an RE pattern of the 32-port CSI-RS RE pattern having a TRS proposed in the present disclosure.

A UE automatically recognizes that group A in which TRS REs and CSI-RS REs are disposed in the same OFDM symbols includes 3 component RE patterns and group B includes 5 component RE patterns, as shown in FIGS. 31 and 32.

Alternatively, a gNB/TRP/BS indicates that the number of component CSI-RS RE patterns (2,2) belonging to group A is 3 and the number of component CSI-RS RE patterns (2,2) belonging to group B is 5 to the UE.

When only the number of component CSI-RS RE patterns belonging to group A (or group B) is indicated to the UE, the UE implicitly recognizes the number of component CSI-RS RE patterns belonging to group B (or group A) according to information on the total number of ports.

(When TRS Having Comb-4 and Comb (RE) Offset of 0 is Configured)

The BS disposes component CSI-RS RE patterns as shown in FIG. 31.

Parameters $\Delta F_{A,1}=\Delta F_{A,2}=2$ and $\Delta F_{A,3}=2$ shown in FIG. 31 are indicated/set to the UE through higher layer signaling such as RRC.

Further, frequency RE offset information $\Delta F_{B,1}=1$, $\Delta F_{B,2}=0$, $\Delta F_{B,3}=0$, $\Delta F_{B,4}=0$ and $\Delta F_{B,5}=0$ about the 5 component RE patterns belonging to group B is indicated/set to the UE.

To minimize signaling overhead, frequency RE offset information about the 8 component RE patterns may not be indicated to the UE.

That is, the UE can automatically recognize that $\Delta F_{A,1}=1$, $\Delta F_{A,2}=2$, $\Delta F_{A,3}=2$, $\Delta F_{B,1}=1$, $\Delta F_{B,2}=0$, $\Delta F_{B,3}=0$, $\Delta F_{B,4}=0$ and $\Delta F_{B,5}=0$ (appointed between the BS and the UE on CSI-RS RE patterns in consideration of TRS RE patterns) when TRS having comb-4 and comb offset of 0 is configured.

(When TRS Having Comb-4 and Comb (RE) Offset of 1 is Configured)

$\Delta F_{A,1}=2$, $\Delta F_{A,2}=2$, $\Delta F_{A,3}=2$, $\Delta F_{B,1}=2$, $\Delta F_{B,2}=0$, $\Delta F_{B,3}=0$, $\Delta F_{B,4}=0$ and $\Delta F_{B,5}=0$ are indicated/defined for the UE through higher layer signaling such as RRC.

The UE can automatically recognize parameter setting previously appointed with the BS, $\Delta F_{A,1}=2$, $\Delta F_{A,2}=2$, $\Delta F_{A,3}=2$, $\Delta F_{B,1}=2$, $\Delta F_{B,2}=0$, $\Delta F_{B,3}=0$, $\Delta F_{B,4}=0$ and $\Delta F_{B,5}=0$, without additional signaling.

(When TRS Having Comb-4 and Comb (RE) Offset of 2 is Configured)

$\Delta F_{A,1}=0$, $\Delta F_{A,2}=2$, $\Delta F_{A,3}=2$ or $\Delta F_{A,1}=0$, $\Delta F_{A,2}=1$, $\Delta F_{A,3}=2$ are indicated/defined for the UE through higher layer signaling such as RRC and $\Delta F_{B,1}=0$, $\Delta F_{B,2}=0$, $\Delta F_{B,3}=0$, $\Delta F_{B,4}=0$ and $\Delta F_{B,5}=0$ are indicated/defined for the UE through higher layer signaling, as shown in FIG. 31.

The UE can automatically recognize parameter setting appointed between the UE and the BS, $\Delta F_{A,1}=2$, $\Delta F_{A,2}=2$, $\Delta F_{A,3}=2$, $\Delta F_{B,1}=2$, $\Delta F_{B,2}=0$, $\Delta F_{B,3}=0$, $\Delta F_{B,4}=0$ and $\Delta F_{B,5}=0$, without additional signaling.

The UE can automatically recognize previously appointed parameter setting, $\Delta F_{A,1}=0$, $\Delta F_{A,2}=2$, $\Delta F_{A,3}=2$ or $\Delta F_{A,1}=0$, $\Delta F_{A,2}=1$, $\Delta F_{A,3}=2$, and $\Delta F_{B,1}=0$, $\Delta F_{B,2}=0$, $\Delta F_{B,3}=0$, $\Delta F_{B,4}=0$, $\Delta F_{B,5}=00$, without additional signaling.

FIG. 31 shows an example of a 32-port CSI-RS RE pattern having TRS.

FIG. 32 shows another example of a 32-port CSI-RS RE pattern having TRS.

CSI-RS RE location in consideration of overhead will be described.

Only locations of some (one or more) of component RE patterns necessary to define an X-port CSI-RS RE pattern for signaling overhead reduction can be set/indicated to a UE and locations of the remaining component RE patterns can be recognized by the UE through a pattern previously appointed (or default positions previously appointed) between a BS and the UE.

The appointed pattern between the UE and the BS can be defined according to other RSs, channels (e.g., PDCCH) and/or the number of CSI-RS ports.

The following rule/pattern may be present according to the number of CSI-RS ports.

X=8 with Component CSI-RS RE Pattern (2,1)

Only location information (subcarrier index or the like) of the first component RE pattern among 4 component RE patterns is indicated/defined/set to a UE through higher layer signaling.

In this case, the UE recognizes that the remaining 3 component RE patterns are contiguous on the frequency axis on the basis of the indicated component RE pattern location.

Only location information of two component RE patterns among 4 component RE patterns is indicated/defined/set to a UE through higher layer signaling.

Figure 33:
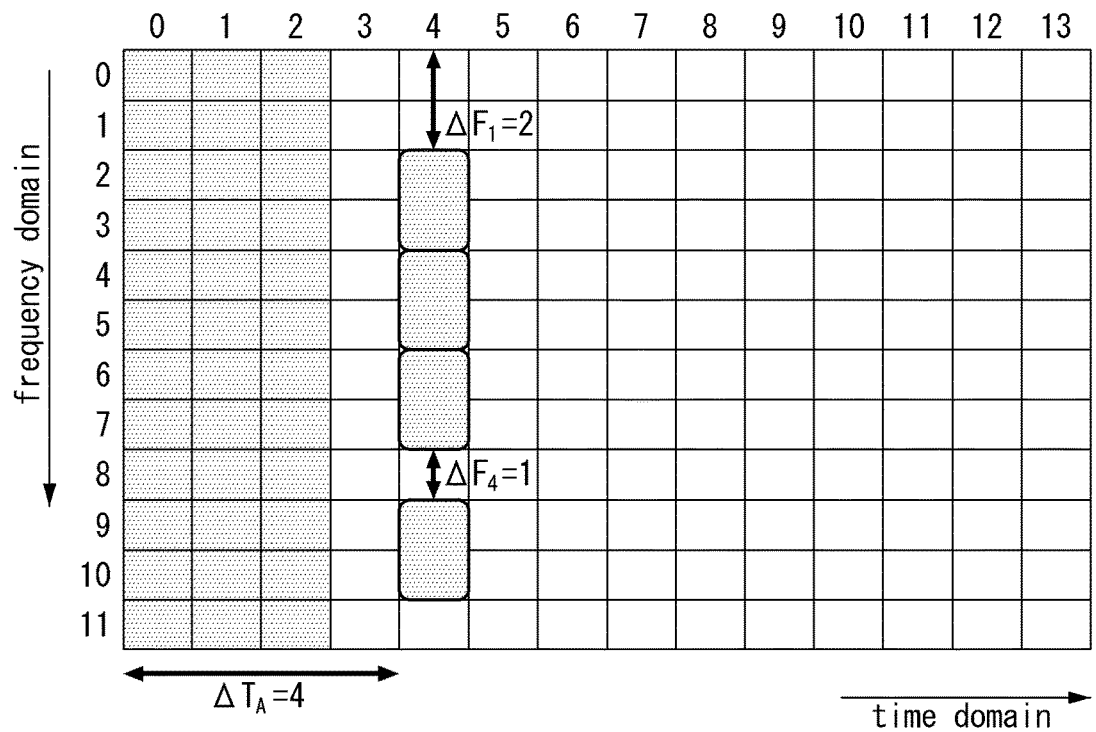
FIGS. 33 to 35 are diagrams showing other examples of CSI-RS mapping methods proposed in the present disclosure.

For example, 3 component RE patterns may be disposed to be always contiguous on the frequency axis (which may be regarded as (6,1) component RE patterns virtually) and one component RE pattern may be permitted to have an RE offset from the remaining 3 component RE patterns, as shown in FIG. 33.

Alternatively, among 4 component RE patterns, two component RE patterns each may be configured to always contiguous.

Only location information of 3 component RE patterns among 4 component RE patterns is indicated/defined/set to a UE through higher layer signaling.

Figure 34:
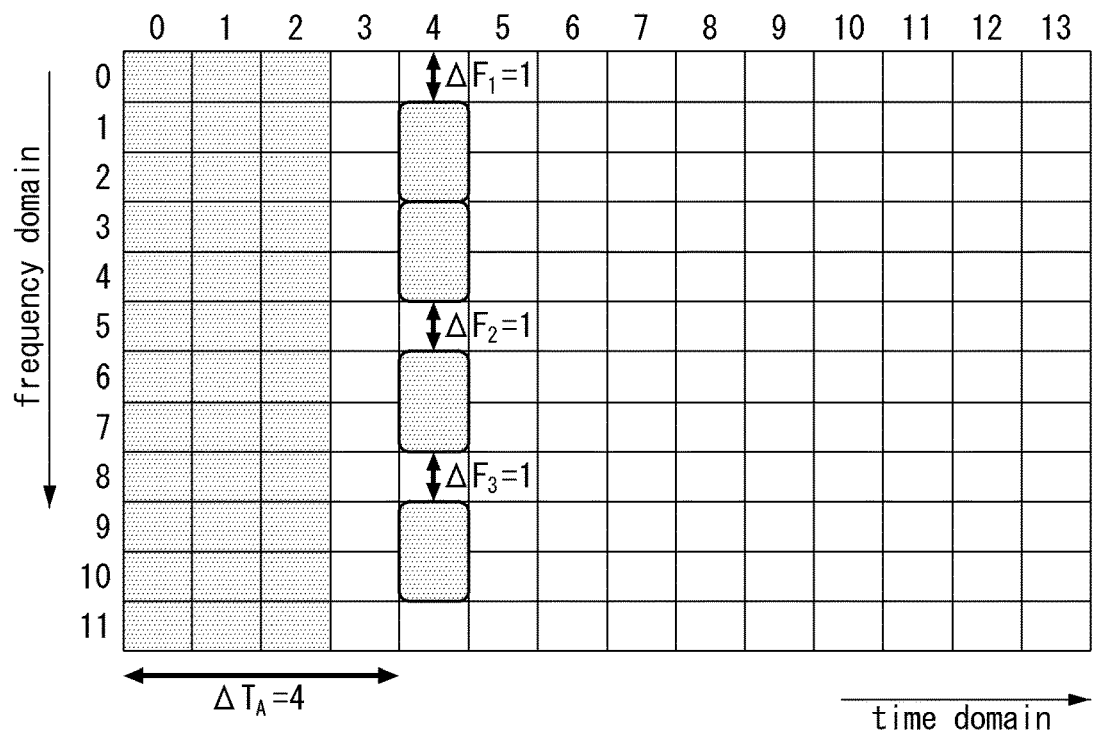

For example, a case in which 2 component RE patterns are always contiguous and the remaining 2 component RE patterns are freely disposed, as shown in FIG. 34, can be considered.

Figure 35:
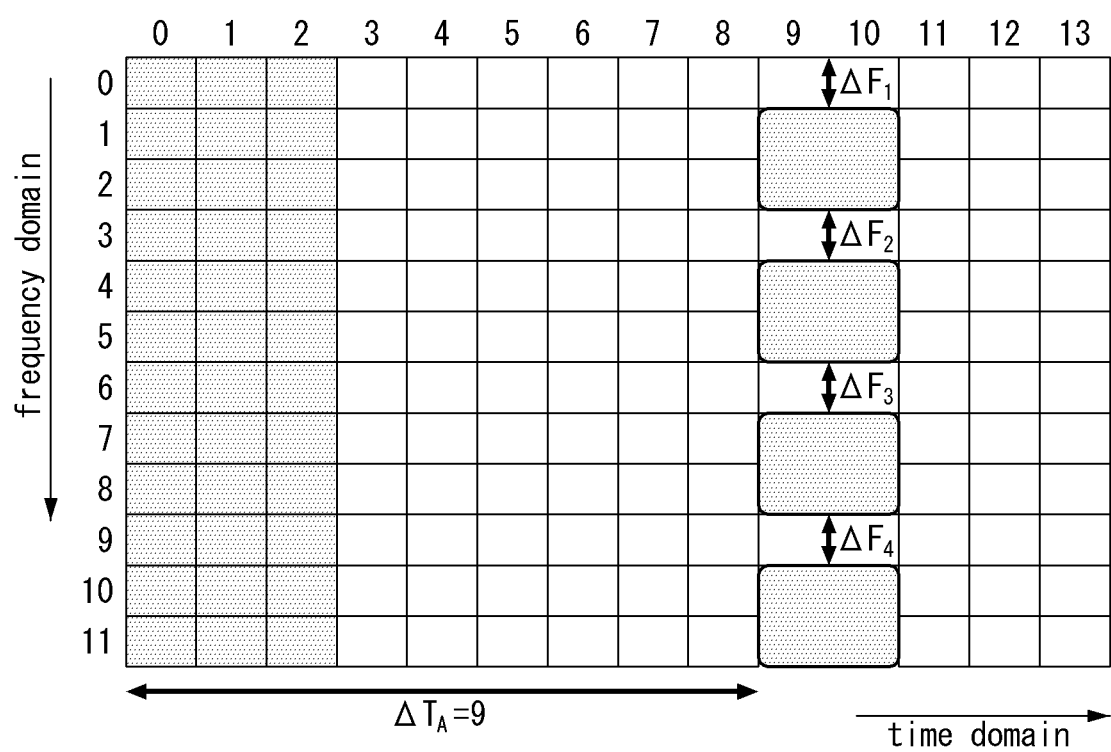

FIGS. 33 to 35 are diagrams showing examples of the CSI-RS RE mapping proposed in the present disclosure.

X=8, X=12 and X=16 with Component CSI-RS RE Pattern (2,2)

First, a case of X=8 will be described.

FIG. 35 shows a case in which $\Delta F_3$ and $\Delta F_4$ are not present.

$\Delta F_1$ or $\Delta F_2$ is a previously appointed value between a BS and a UE and one of the two parameters can be indicated/defined for the UE through higher layer signaling.

Next, a case of X=12 will be described.

One or more of RE offset values $\Delta F_1$, $\Delta F_2$ and $\Delta F_3$ shown in FIG. 35 can be set by the BS and indicated/defined for the UE through higher layer signaling.

Next, a case of X=16 will be described.

One or more of RE offset values $\Delta F_1$, $\Delta F_2$, $\Delta F_3$ and $\Delta F_4$ shown in FIG. 35 can be set by the BS and indicated/defined for the UE through higher layer signaling.

X=24 or X=32 with Component CSI-RS RE Pattern (2,2)

First, a case of X=24 will be described.

One or more values among "$\Delta T_A$, $\Delta F_{A,1}$, $\Delta F_{A,2}$, $\Delta F_{A,3}$, $\Delta T_B$, $\Delta F_{B,1}$, $\Delta F_{B,2}$, $\Delta F_{B,3}$" shown in FIGS. 13 and 14 can be set/defined/appointed as fixed parameters previously appointed between the BS and the UE (for example, component RE patterns are set by default such that all of them are contiguous) and only parameters other than the fixed values can be indicated/set/defined for the UE through higher layer signaling.

Next, a case of X=32 will be described.

To reduce signaling overhead, one or more values among "$\Delta F_{A,2}$ $\Delta F_{A,3}$ $\Delta F_{A,4}$, $\Delta T_B$, $\Delta F_B$, $\Delta F_{B,2}$, $\Delta F_{B,3}$, $\Delta F_{B,4}$" except $\Delta T_A$ and $\Delta F_{A,1}$ in FIGS. 13 and 14 can be defined as fixed parameters previously appointed between the BS and the UE, and values other than these values and $\Delta T_A$ and $\Delta F_{A,1}$ can be indicated/designated/defined for the UE through higher layer signaling.

Specifically, FIG. 35 shows an example of a possible CSI-RS RE pattern for 16 ports.

When configurations for RSs (e.g., PTRS, TRS, DMRS, etc.) other than X-port CSI-RSs are not indicated in the same PRB in consideration of signaling overhead, the UE may not expect a time offset and a frequency offset (RE offset) between component CSI-RS RE patterns.

Next, CSI-RS for time and frequency tracking will be described.

One or more 1-port CSI-RS resources and/or one or more single-symbol CSI-RS resources can be used for time and/or frequency tracking.

The present invention proposes inclusion/definition of an information element (IE) that sets a TRS mode to "ON/OFF" in set configuration for a set of single-symbol CSI-RS resources.

When the TRS mode is indicated/set/defined as "ON" for a UE, the UE automatically recognizes/assumes that the configured CSI-RS is for time and/or frequency tracking.

When the TRS mode is indicated/set/defined as "OFF" for the UE, the UE automatically recognizes/assumes that the configured CSI-RS is for channel acquisition or beam management.

The present invention proposes inclusion/definition of an information element (IE) that represents "MODE" indicating functionality of CSI-RS in CSI-RS resource set configuration.

The proposed "MODE" may have three different values. For example, when "MODE" is set as "TRS (Tracking RS)" for a UE, the UE recognizes that the configured CSI-RS is a CSI-RS for time and/or frequency tracking.

When "MODE" is indicated/set as "CSI acquisition" for the UE, the UE recognizes/assumes that the configured CSI-RS is a CSI-RS for CSI acquisition.

When "MODE" is indicated/set as "beam management" for the UE, the UE automatically recognizes/assumes that the configured CSI-RS is a CSI-RS for beam management.

To define each mode, the BS and the UE can appoint/define integers such as 0, 1 and 2 or alphabets as available "MODE" values.

The present invention proposes a method of defining a CSI-RS for CSI acquisition, a CSI-RS for beam management and a CSI-RS for time/frequency tracking as independent or different RS types for resource setting, connecting independent reporting settings to meet each purpose and using the same.

The purpose of a CSI-RS set/indicated according to set/indicated reporting setting is recognized and corresponding information (channel information, beam information, and time/frequency tracking information) is reported to a BS.

NR supports higher layer configuration of a single-symbol CSI-RS resource set. Configuration includes an information element (IE) representing whether repetition is "on/off."

Here, whether repetition is "on/off" refers to the following.

"ON": A UE can assume that a gNB maintain a fixed transmission beam.

"OFF": A UE cannot assume that a gNB maintain a fixed transmission beam.

Next, CSI-RS transmission symbols considering DMRS configuration will be described.

A BS can set/indicate/define different CSI-RS RE configurations for a UE or a UE group for which an additional DMRS is not set and a UE or a UE group for which the additional DMRS is set (through higher layer signaling such as RRC). Different CSI-RS RE configurations may be defined as follows.

Locations (pools) of component CSI-RS RE patterns that can be indicated/set are the same but locations of indicated/set component CSI-RS RE patterns are different.

Locations of component CSI-RS RE patterns that can be indicated/set are different or restrictive.

NZP CSI-RS positions that can be indicated/set are limited.

A UE for which an additional DMRS is set/indicated does not expect NZP CSI-RS transmission in symbols other than OFDM symbols #5, #6, #12 and #13 (sixth, seventh, thirteenth and fourteenth OFDM symbols) (in a normal CP case in which one clos includes 14 OFDM symbols).

That is, the UE automatically recognizes/assumes that NZP CSI-RS is set/indicated for symbols preset to be able to carry CSI-RS other than the symbols #5, #6, #12 and #13.

Further, when the additional DMRS is set, the UE assumes/recognizes that CSI-RS is no more transmitted in symbols set to be able to carry the CSI-RS other than the symbols #5, #6, #12 and #13.

A UE for which the additional DMRS is set does not expect CDM-8 configuration.

The UE can assume/expect that CSI-RS is received only through restricted/limited OFDM symbols (among preset symbols capable of carrying CSI-RS) according to an indicated slot format indicator (SFI) (in an uplink region included in a downlink slot or a region in which a PDSCH RE is not included).

Alternatively, the UE can recognize/expect/assume that symbols through which CSI-RS is transmitted automatically change to avoid collision/overlapping between symbols through which DMRS is transmitted and symbols through which CSI-RS is transmitted according to an indicated slot format indicator (SFI) (in an uplink region included in a downlink slot or a region in which a PDSCH RE is not included). Examples of a specific slot format and UE operation are as follows.

Figure 36:
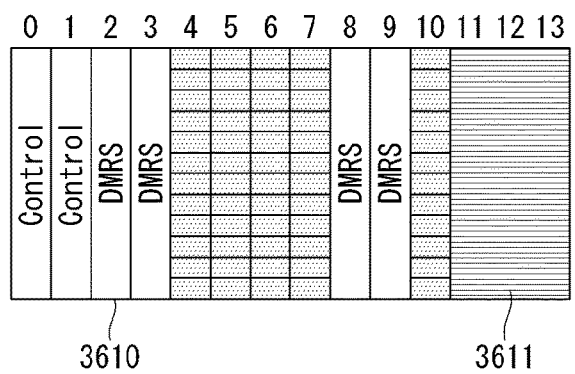
FIG. 36 shows an example of front-loaded and additional DMRSs for a control region for 2 symbols and the 2 symbols proposed in the present disclosure.
Figure 36:
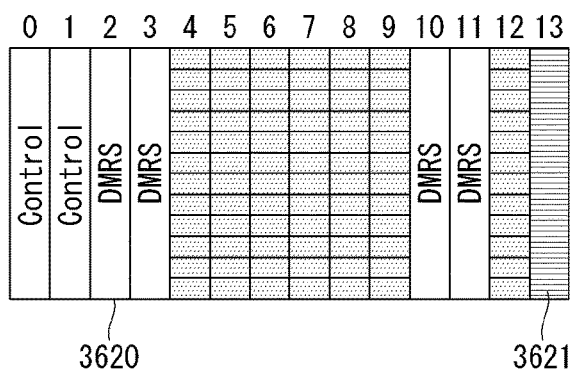
Figure 36:
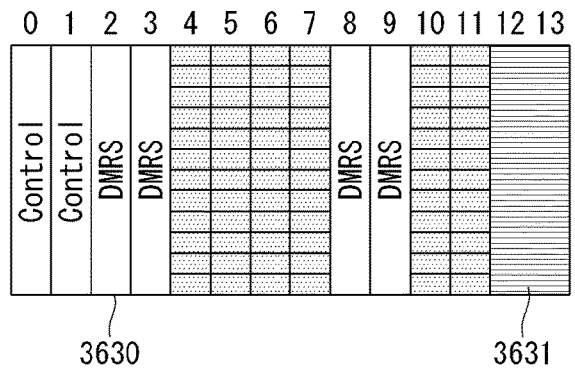
Figure 36:
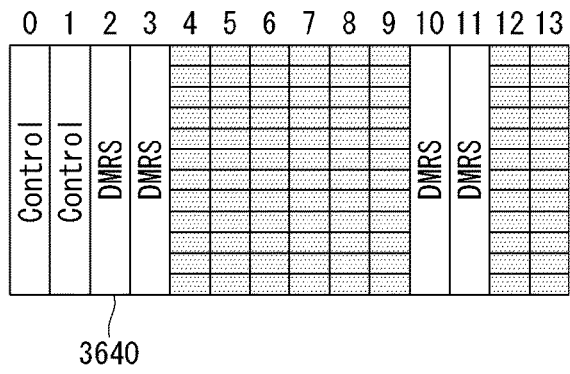

When a slot as shown in a top-left sub-FIG. 3610 in FIG. 36 is indicated/set to a UE through an SFI, the UE assumes that CSI-RS is not transmitted in symbols #2, #3, #8 and #9.

The UE assumes that CSI-RS is not transmitted in symbols #2 and #3.

The UE assumes that CSI-RS is not transmitted in symbols #8 and #9.

The UE assumes that CSI-RS is not transmitted in symbols #2, #3, #9, #11, #12 and #13.

The UE assumes that CSI-RS is not transmitted in symbols #2, #3, #8, #9, #12 and #13.

The UE assumes that CSI-RS is not transmitted in symbols #11, #12 and #13.

The UE assumes that CSI-RS is not transmitted in symbols #12 and #13.

The UE assumes that CSI-RS transmitted in OFDM symbols #12 and #13 is transmitted in symbols #10 and #11.

When a slot as shown in a top-right sub-FIG. 3620 in FIG. 36 is indicated/set to the UE through an SFI, the UE assumes that CSI-RS is not transmitted in symbols #2, #3, #10, #11 and #13.

The UE assumes that CSI-RS is not transmitted in symbols #2, #3, #10 and #11.

The UE assumes that CSI-RS is not transmitted in symbols #2, #3 and #13.

The UE assumes that CSI-RS is not transmitted in symbols #8, #9 and #13.

The UE assumes that CSI-RS is not transmitted in symbols #2 and #3.

The UE assumes that CSI-RS is not transmitted in symbols #8 and #9.

The UE assumes that CSI-RS is not transmitted in symbol #13.

When X=1, 2, 4, 8 or 12 which occupies only one OFDM symbol (X is the number of CSI-RS antenna ports), it is assumed that CSI-RS is transmitted only in symbol #12.

When a slot as shown in a bottom-left sub-FIG. 3630 in FIG. 36 is indicated/set to the UE through an SFI, the UE assumes that CSI-RS is not transmitted in symbols #2, #3, #8, #9, #12 and #13.

The UE assumes that CSI-RS is not transmitted in symbols #2, #3, #8 and #9.

The UE assumes that CSI-RS is not transmitted in symbols #2, #3, #12 and #13.

The UE assumes that CSI-RS is not transmitted in symbols #8, #9, #12 and #13.

The UE assumes that CSI-RS is not transmitted in symbols #2 and #3.

The UE assumes that CSI-RS is not transmitted in symbols #8 and #9.

The UE assumes that CSI-RS is not transmitted in symbols #12 and #13.

When a slot as shown in a bottom-right sub-FIG. 3640 in FIG. 36 is indicated/set to the UE through an SFI, the UE assumes that CSI-RS is not transmitted in symbols #2, #3, #10 and #11.

The UE assumes that CSI-RS is not transmitted in symbols #2 and #3.

The UE assumes that CSI-RS is not transmitted in symbols #10 and #11.

When X<24, that is, when the number of CSI-RS antenna ports is less than 24, it is assumed that CSI-RS is transmitted only in symbols #12 and #13 or #9 and #10.

FIG. 36 shows control regions for 2 symbols and front-loaded and additional DMRSs for the respective 2 symbols.

Here, horizontal striped regions 3611, 3621 and 3631 do not include PDSCH REs.

The top-left sub-FIG. 3610 has OFDM symbol indexes 11, 12 and 13, the horizontal striped region 3621 of the top-right sub-FIG. 3620 has OFDM symbol index 13, the horizontal striped region 3631 of the bottom-left sub-FIG. 3630 has OFDM symbol indexes 12 and 13, and the bottom-right sub-FIG. 3640 has no horizontal striped region.

Figure 37:
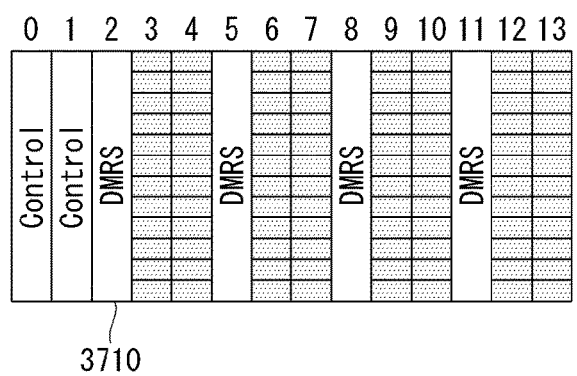
FIG. 37 shows an example of a 1-symbol front-loaded DMRS having a 2-symbol control region and three 1-symbol additional DMRS proposed in the present disclosure.
Figure 37:
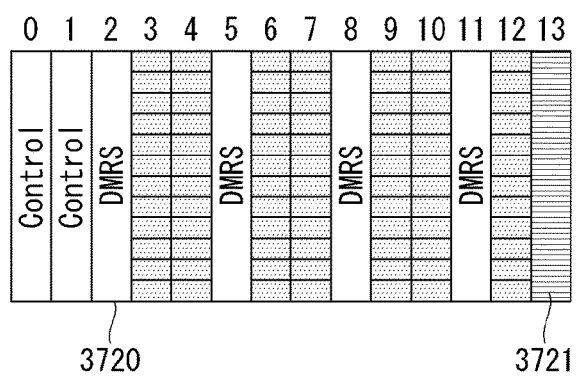
Figure 37:
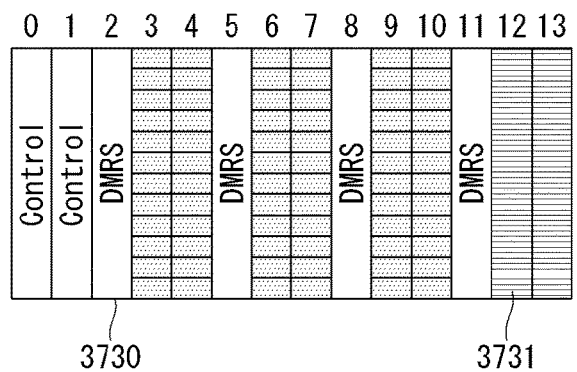

When a slot as shown in the leftmost sub-FIG. 3710 in FIG. 37 is indicated/set to a UE through an SFI, the UE assumes that CSI-RS is not transmitted in symbols #2, #5, #8, #11 or at least one thereof.

The UE assumes that CSI-RS is transmitted only in one or more of symbols #3, #4, #6, #7, #9, #10, #12 and #13.

When X<24, that is, when the number of CSI-RS antenna ports is less than 24, it is assumed that CSI-RS is transmitted only in symbols #12 and #13 or #9 and #10.

When a slot as shown in the center sub-FIG. 3720 in FIG. 37 is indicated/set to the UE through an SFI, the UE assumes that CSI-RS is not transmitted in symbols #2, #5, #8, #11, #13 or at least one thereof.

The UE assumes that CSI-RS is transmitted only in one or more of symbols #3, #4, #6, #7, #9, #10 and #12.

When X=1, 2, 4, 8 or 12 that occupies only one OFDM symbol is indicated/set to the UE, the UE assumes that CSI-RS is transmitted only in symbol #12.

When a slot as shown in the rightmost sub-FIG. 3730 in FIG. 37 is indicated/set to the UE through an SFI, the UE assumes that CSI-RS is not transmitted in symbols #2, #5, #8, #11, #12 and #13.

The UE assumes that CSI-RS is not transmitted in symbols #12 and #13.

The UE assumes that CSI-RS is transmitted only in symbols #3, #4, #6, #7, #9 and #10.

When one symbol front-loaded DMRS and three 1-symbol additional DMRSs are set/indicated, the UE assumes that CSI-RS is transmitted only in symbols #3, #4, #6, #7, #9 and #10 in FIG. 35, for example. Or the UE assumes that CSI-RS is transmitted only in symbols #6, #7, #9 and #10.

FIG. 37 shows an example of 1-symbol front-loaded DMRSs having control regions for 2 symbols and three 1-symbol additional DRMSs.

Horizontal striped regions 3721 and 3731 do not include PDSCH REs.

Here, the horizontal striped region of the center sub-FIG. 3720 has OFDM symbol index 13 and the horizontal striped region of the rightmost sub-FIG. 3730 has OFDM symbol indexes 12 and 13.

With respect to slot-based scheduling, when two additional DMRS symbols are set for a 1-symbol front-loaded DMRS having a front-loaded DMRS in the third or fourth symbol in the case of a PDSCH, two 1-symbol additional DMRS symbols can be set in $\{8^{th}, 12^{th}\}$ and $\{7^{th}, 10^{th}\}$ symbols.

Figure 38:
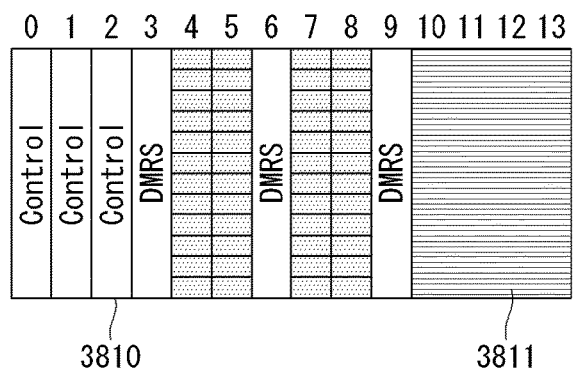
FIG. 38 shows an example of a 1-symbol front-loaded DMRS having 3-symbol and 2-symbol control regions and two 1-symbol additional DMRS proposed in the present disclosure.
Figure 38:
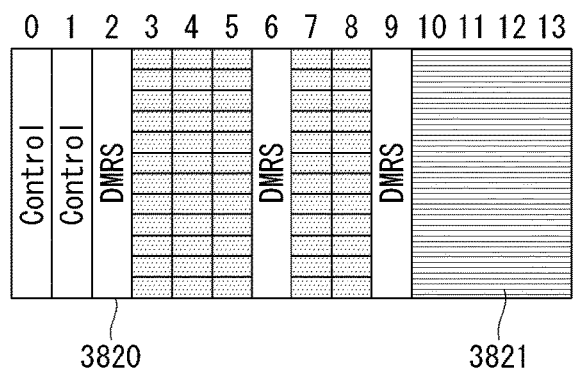
Figure 38:
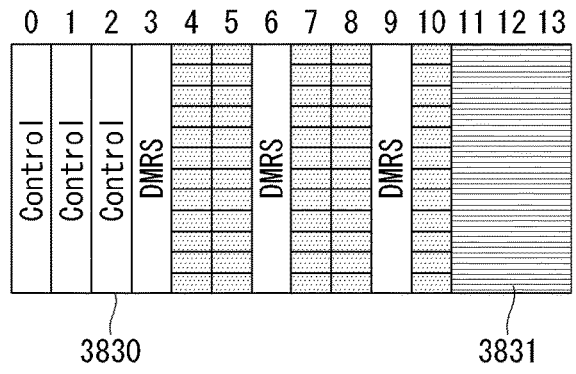
Figure 38:
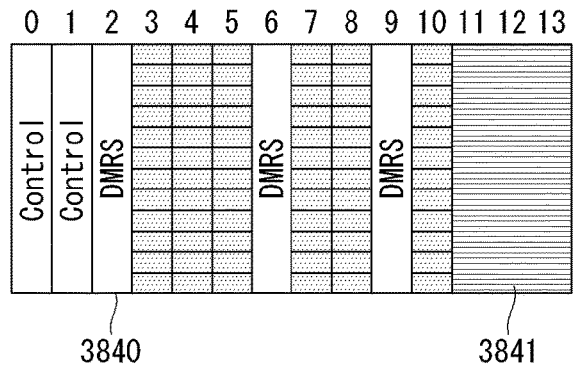
Figure 39:
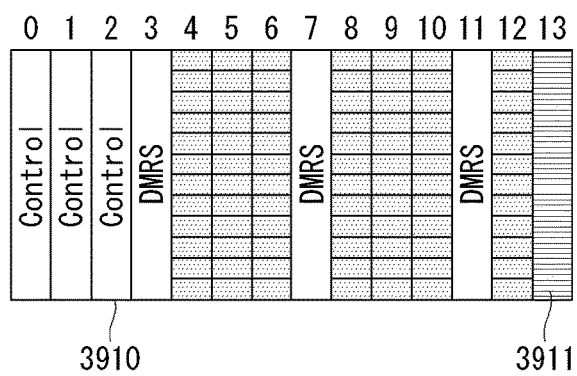
FIG. 39 shows an example of a 1-symbol front-loaded DMRS having 3-symbol and 2-symbol control regions and two 1-symbol additional DMRS proposed in the present disclosure.
Figure 39:
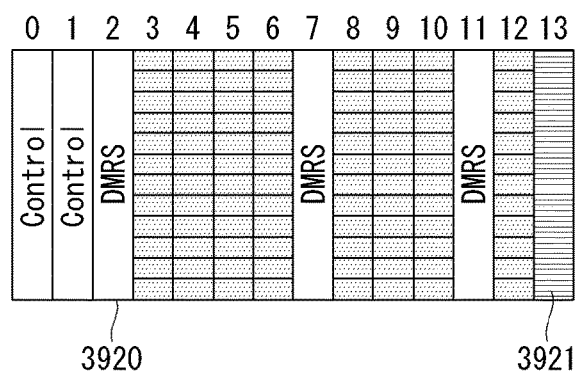
Figure 39:
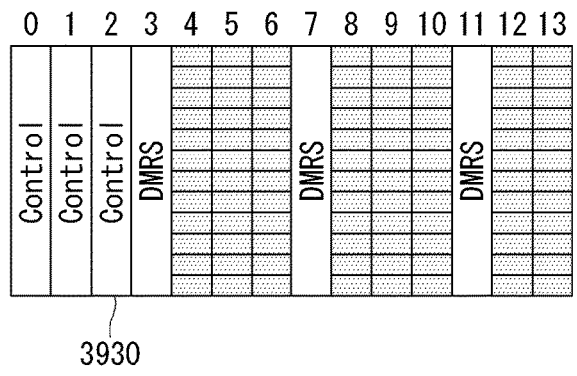
Figure 39:
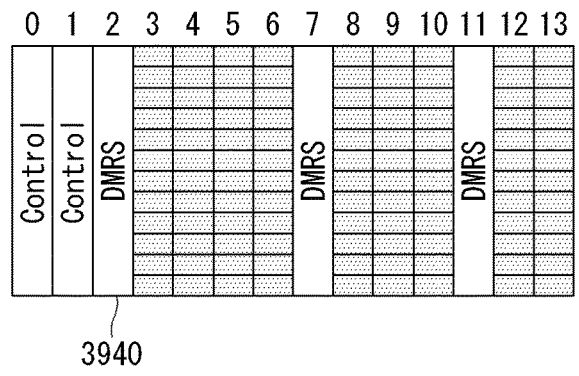

When one symbol front-loaded DMRS and two 1-symbol additional DMRSs are set/indicated, the UE assumes that CSI-RS is transmitted only in symbols #4, #5, #7 and #8 in FIGS. 38 and 39, for example.

FIG. 38 shows an example of a 1-symbol front-loaded DMRS having control regions for 3 symbols and 2 symbols and two 1-symbol additional DRMSs.

Horizontal striped regions 3811, 3821, 3831 and 3841 do not include PDSCH REs.

The horizontal striped region 3811 of the top-left sub-FIG. 3810 has OFDM symbol indexes 10, 11, 12 and 13, the horizontal striped region 3820 of the top-right sub-FIG. 3820 has OFDM symbol indexes 10, 11, 12 and 13, the horizontal striped region 3831 of the bottom-left sub-FIG. 3830 has OFDM symbol indexes 11, 12 and 13, and the horizontal striped region 3841 of the bottom-right sub-FIG. 3840 has OFDM symbol indexes 11, 12 and 13.

When a slot as shown in a top-left sub-FIG. 3910 in FIG. 39 is indicated/set to the UE through an SFI, the UE assumes that CSI-RS is transmitted only in symbols #3, #5, #6, #8, #9, #10 and #12.

The UE assumes that CSI-RS is not transmitted in symbols #3, #7, #11 and #13.

The UE assumes that CSI-RS is not transmitted in symbols #3, #7 and #11 or symbol #13.

When a slot as shown in a top-right sub-FIG. 3920 in FIG. 39 is indicated/set to the UE through an SFI, the UE assumes that CSI-RS is transmitted only in symbols #3, #4, #5 and #6.

The UE assumes that CSI-RS is not transmitted in symbols #2, #7, #11 and #13.

The UE assumes that CSI-RS is not transmitted in symbols #2, #7 and #11 or symbol #13.

When a slot as shown in a bottom-left sub-FIG. 3930 in FIG. 39 is indicated/set to the UE through an SFI, the UE assumes that CSI-RS is not transmitted in symbols #3, #7 and #11.

When X<24, that is, when number of CSI-RS antenna ports is less than 24, it is assumed that CSI-RS is transmitted only in symbols #12 and #13.

When a slot as shown in a bottom-right sub-FIG. 3940 in FIG. 39 is indicated/set to the UE through an SFI, the UE assumes that CSI-RS is not transmitted in symbols #2, #7 and #11 or symbol #13.

The UE assumes that CSI-RS is transmitted only in symbols #3, #4, #5 and #6.

When X<24, that is, when number of CSI-RS antenna ports is less than 24, it is assumed that CSI-RS is transmitted only in symbols #12 and #13.

FIG. 39 shows an example of a 1-symbol front-loaded DMRS having control regions for 3 symbols and 2 symbols and two 1-symbol additional DRMSs.

Frequency location (subcarrier index/location) can be indicated/set to a UT on the basis of a 6-bit bitmap (in units of 2 REs on the frequency axis) in PRBs/slots of component CSI-RS RE patterns (including component CSI-RS RE patterns (2,1), (2,2) and (4,1)).

When DMRS type I is indicated/set, CSI-RS REs can be disposed only at 8 REs having smallest subcarrier index or largest subcarrier index in order to avoid overlapping/collision between PTRS REs and CSI-RS REs.

Accordingly, when DMRS type I is indicated, frequency location of CSI-RS can be effectively set/indicated on the basis of a 4-bit bit-map.

Figure 40:
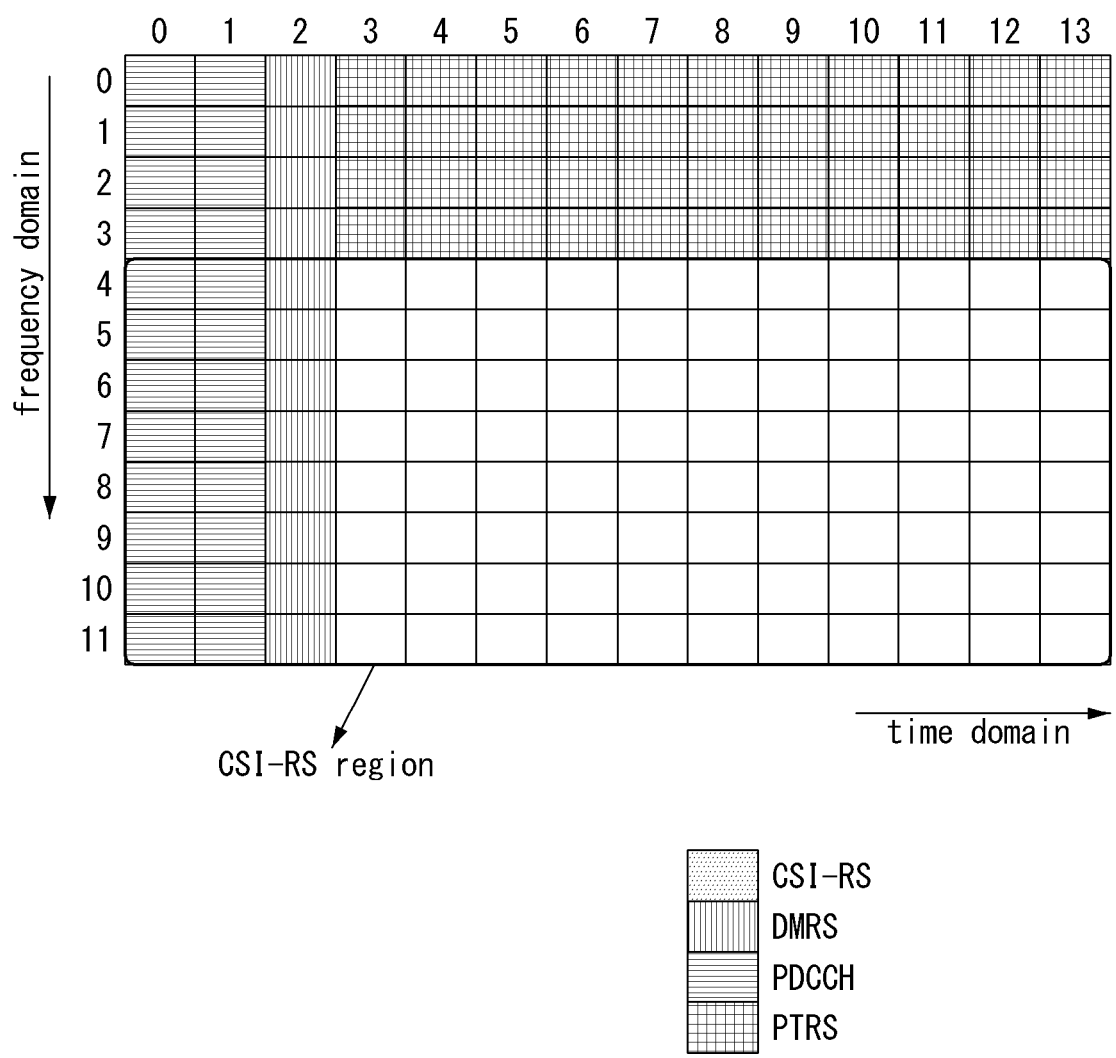
FIG. 40 is a diagram showing an example of possible CSI-RS RE location in the frequency domain proposed in the present disclosure.

For example, a PRB/slot form as shown in FIG. 40 can be considered. That is, the first or last 2-bit bitmap in the 6-bit bitmap is not used and only a 4-bit bitmap is (substantially) used. The UE does not expect other configurations/indications.

When DMRS type I is indicated/set, the UE expects/assumes that component CSI-RS RE pattern location (CSI-RS location on PRBs/slots) will be indicated/set to only 8 REs corresponding to the smallest or largest subcarrier index.

Further, when DMRS type I is indicated/set, the UE can expect/assume that component CSI-RS RE pattern location (CSI-RS location on PRBs/slots) will be indicated/set to only 10 REs corresponding to the smallest or largest subcarrier index. That is, the UE expects indication of an index corresponding to a 5-bit bitmap.

FIG. 40 shows an example of possible CSI-RS RE location in the frequency domain.

Next, a control resource set (CORESET) and CSI-RS will be described.

It may be desirable that RSs other than CSI-RS and/or other channels be not transmitted through symbols, in which CSI-RS is transmitted for CSI-RS transmission for beam management, for appropriate transmission/reception beam estimation/measurement and selection.

For example, in the case of interleaved FDMA (IFDMA) based reception beam sweeping, it may not be desirable that signals other than beam management CSI-RS are RB-level-multiplexed (in frequency domain) to the same symbols.

Accordingly, RB-level multiplexing (RB-level FDM) between CSI acquisition CSI-RS and CORESET may be permitted, whereas RB-level multiplexing between beam management CSI-RS and CORESET may not be permitted.

That is, when indicated/set CSI-RS is beam management CSI-RS, a UE assumes that CSI-RS Is not transmitted in a CORESET symbol.

On the other hand, RB-level multiplexing (in frequency domain) between beam management CSI-RS and CORE-SET may be permitted, whereas RB-level multiplexing between CSI acquisition CSI-RS and CORESET may not be permitted.

Since (P-1/P-2/P-3 operation) CSI-RS for beam management is transmitted over an entire band due to properties thereof and a UE conforms to a procedure of selecting a beam having a highest reception SNR on the basis of beam information transmitted over the entire band, RB-level multiplexing (FDM) in some frequency bands may not considerably affect beam measurement/selection.

P-1: This is used to allow UE measurement for different TRP Tx beams in order to support selection of TRP Tx beams/UE Rx beams.

Beamforming in TRP includes intra/inter-TRP Tx beam sweeping in different beam sets, in general. For beamforming at a UE, the beamforming generally includes UE Rx beam sweeping from different beam sets in general.

P-2: UE measurement for different TRP Tx beams is used to change inter/intra-TRP Tx beam(s).

P-3: UE measurement for the same TRP Tx beam is used to change UE Rx beams when a UE uses beamforming.

However, in the case of CSI-RS for CSI acquisition, channel information cannot be acquired due to RB-level multiplexing between CSI-RS for CSI acquisition and CORESET in a specific frequency band and thus channel information absence problem may be generated.

Accordingly, RB-level multiplexing (RB-level FDM) between CSI acquisition CSI-RS and CORESET may not be permitted and RB-level multiplexing between beam management CSI-RS and CORESET may be permitted.

That is, a UE can assume that CSI-RS is not transmitted in CORESET symbols when an indicated/set CSI-RS is CSIR acquisition CSI-RS.

RB-level FDM between (CSI acquisition or beam management) CORESET and CSI-RS can be determined/permitted according to CSI-RS type.

Alternatively, it can be determined whether RB-level FDM between (CSI acquisition or beam management) CORESET and CSI-RS is possible or is permitted according to CSI-RS type.

It can be determined whether RB-level FDM between CSI-RS and CORESET is permitted according to slot format (according to (depending on) slot format indicator (SFI)).

For example, in a downlink-centric slot having a relatively large number of symbols in which CSI-RS can be transmitted, only TDM instead of RB-level FDM between CSI-RS and CORESET can be permitted/used.

Accordingly, a UE can automatically recognize whether RB-level multiplexing (RB-level FDM) between CORESET and CSI-RS according to slot format indicator (SFI). The following specific examples can be considered.

When the number of symbols in which CSI-RS can be transmitted in a specific slot format is equal to or less than 2, CORESET and CSI-RS are RB-level-FDMed. In this case, the UE assumes that CORESET and CSI-RS are transmitted together in symbols in which set/indicated CORESET symbol positions and CSI-RS symbol positions overlap.

When the number of set/indicated symbols is equal to or greater than 6 and the number of set/indicated CORESET symbols is equal to or less than 2 in a specific slot format, CSI-RS and CORESET are not RB-level-FDMed. The UE automatically assumes (or assumes) that CSI-RS is not transmitted in symbols in which set/indicated CORESET symbol positions and CSI-RS symbol positions overlap.

When the number of CSI-RS antenna ports is equal to or greater than 24, that is, X≥24, RB-level multiplexing between CSI-RS and CORESET may be permitted. When X<24, RB-level multiplexing between CSI-RS and CORESET may not be permitted.

When X≥24, it may be difficult to avoid RB-level FDM between CSI-RS and CORESET compared to a case in which X<24 because CSI-RS is transmitted over 4 OFDM symbols.

RB-level FDM between CSI-RS and CORESET may be permitted only when the number of CORESET symbols is equal to or greater than 3.

In ECP (Extended Cyclic-Prefix) OFDM, OFDM symbols in which CSI-RS can be transmitted may be limited to symbols #4, #5, #10 and #11 (fifth, sixth, tenth and eleventh symbols) in order to avoid collision between a channel and CSI-RS.

That is, CSI-RS transmission can be permitted only in 4 OFDM symbols and the positions of the symbols can be appointed as positions other than #4, #5, #10 and #11 between the UE and the BS.

When the BS sets/indicates use of an ECP based slot to the UE, the UE does not expect CDM-8 configuration.

Next, bitmap configuration of a CSI-RS RE pattern will be described.

One 12-bit bitmap can be used in order to set/indicate frequency location (subcarrier index/position) of a component CSI-RS RE pattern corresponding to each X-port CSI-RS resource in one PRB/slot.

Here, the 12-bit bitmap may have different configurations according to the number X of CSI-RS ports (i.e., according to X∈{1, 2, 4, 8, 12, 24, 32}).

Alternatively, a part of the 12-bit bitmap may be selectively separated and used according to X. More specifically, the example described below can be considered.

When X=1, the whole 12-bit bitmap is used to set/indicate the position of one CSI-RS RE with respect to 12 subcarrier positions.

When X=2 and X=8, only a 6-bit bitmap from the 12-bit bitmap can be used to set/indicate subcarrier positions of a CSI-RS RE pattern (2,1).

For example, a case in which the first or last 6 bits from the 12-bit bitmap are used can be considered.

When X=4, only a 3-bit bitmap from the 12-bit bitmap can be used to set/indicate subcarrier positions of a CSI-RS RE pattern (4,1).

When X=4, 8, 12 and 16, only a 6-bit bitmap from the 12-bit bitmap can be used to set/indicate subcarrier positions of a CSI-RS RE pattern (2,2).

When X=24 and X=32, first 6 bits can be used to set/indicate frequency location of a component CSI-RS RE pattern (2,2) for one of two pairs and the remaining 6 bits can be used to set/indicate subcarrier indexes of a component CSI-RS RE pattern for the second pair.

Here, each pair is composed of two contiguous OFDM symbols and pairs may be contiguous or may not be contiguous.

Figure 41:
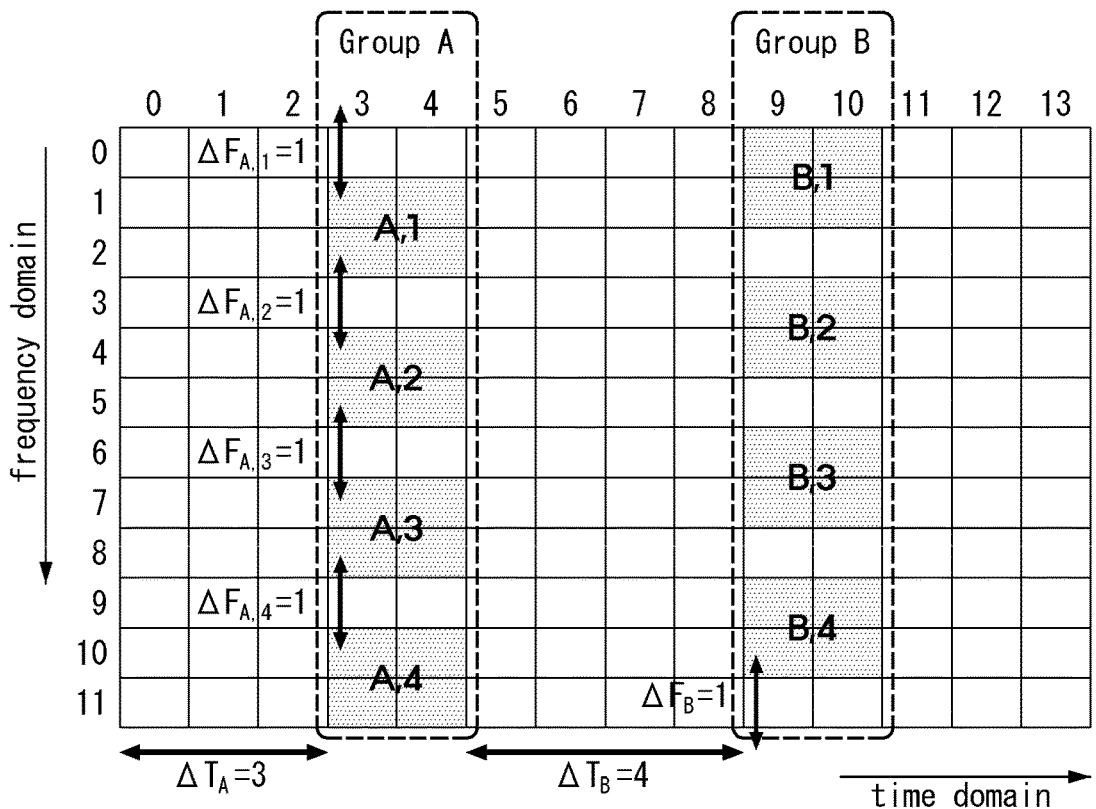
FIG. 41 is a diagram showing another example of a CSI-RS mapping method proposed in the present disclosure.

For example, $b_0b_1b_2b_3b_4b_5$ in a 12-bit bitmap $[b_0b_1b_2b_3b_4b_5b_6b_7b_8b_9b_{10}b_{11}]$ can be used to set/indicate subcarrier positions of 4 component CSI-RS RE patterns in group A in FIG. 41 and the remaining $b_6b_7b_8b_9b_{10}b_{11}$ can be used to set/indicate locations of 4 component CSI-RS RE patterns in group B.

Although each group has 4 component CSI-RS RE patterns in the case of FIG. 41, the groups may have different numbers of component CSI-RS RE patterns.

FIG. 41 is a diagram showing a CSI-RS mapping method proposed in the present disclosure.

Figure 42:
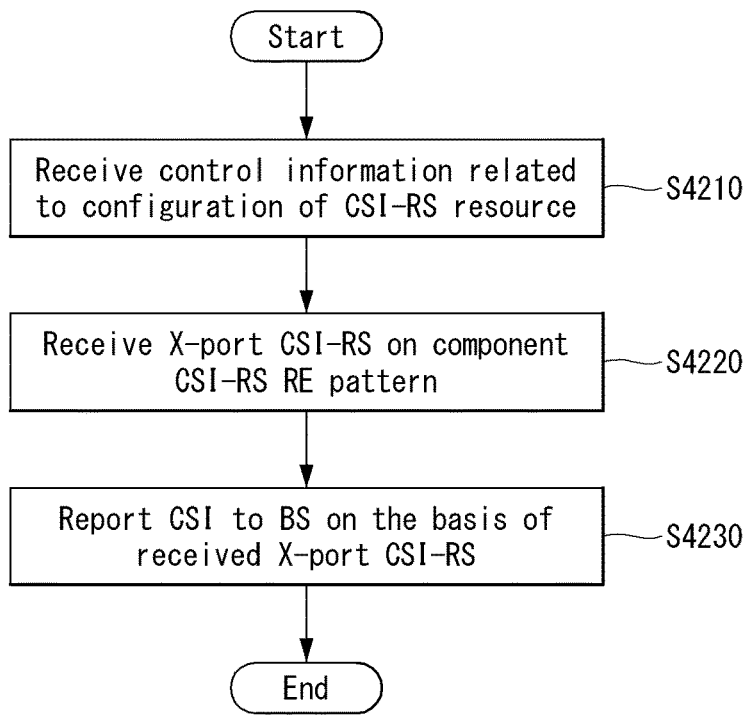
FIG. 42 is a flowchart showing an operation of a UE to report CSI proposed in the present disclosure.

FIG. 42 is a flowchart showing UE operation for reporting CSI proposed in the present disclosure.

Although a UE operation method is described on the basis of the above description in FIG. 42, a BS operation method to which the above description can be applied may be described with reference to FIG. 42 as another embodiment.

First, a UE receives control information related to a configuration of a CSI-RS resource configuration from a BS (S4210).

The control information may include CDM type information representing a type of code division multiplexing (CDM) applied to the CSI-RS resource.

Then, the UE receives an X-port CSI-RS on one or more component CSI-RS RE patterns from the BS (S4220).

Here, each of the one or more component CSI-RS RE patterns may include at least one RE to which the CDM type represented by the CDM type information is applied. In addition, a number of one or more component CSI-RS RE patterns may be determined by the X value and a length of the CDM.

Specifically, the number of one or more component CSI-RS RE patterns is X/L, L is the length of the CDM and X represents the number of CSI-RS antenna ports.

For example, the number of the one or more component CSI-RS RE patterns is 8 and the type of the CDM is CDM4 if the X is 32.

In this case, 8 component CSI-RS RE patterns may be present in a first resource region and a second resource region.

Each of the first resource region and the second resource region may include at least one symbol and at least one subcarrier.

For example, each of the first resource region and the second resource region may include 2 symbols in the time domain.

Here, each of the first resource region and the second resource region may include 4 component CSI-RS RE patterns.

Further, starting subcarrier locations of 4 component CSI-RS RE patterns included in each resource region (first resource region, second resource region) may be different from each other, and starting symbol locations thereof may be the same.

In addition, a starting subcarrier location of a first component CSI-RS RE pattern included in the first resource region may be the same as a starting subcarrier location of a second component CSI-RS RE pattern included in the second resource region.

Refer to FIG. 16 for details.

Furthermore, starting subcarrier locations of the one or more component CSI-RS RE patterns may be represented as a bitmap.

Thereafter, the UE reports CSI to the BS on the basis of the received X-port CSI-RS (S4230).

Additionally, the UE may receive tracking reference signal (TRS) information representing whether the CSI-RS is used for time and frequency tracking from the BS.

The step of receiving the TRS information may be performed before S4210 or after S4210 or may be included in step S4210.

In addition, steps S4210 and S4230 may be performed when the TRS information is set such that it is not used for time and frequency tracking.

Apparatus to which the Present Invention is Applicable

Figure 43:
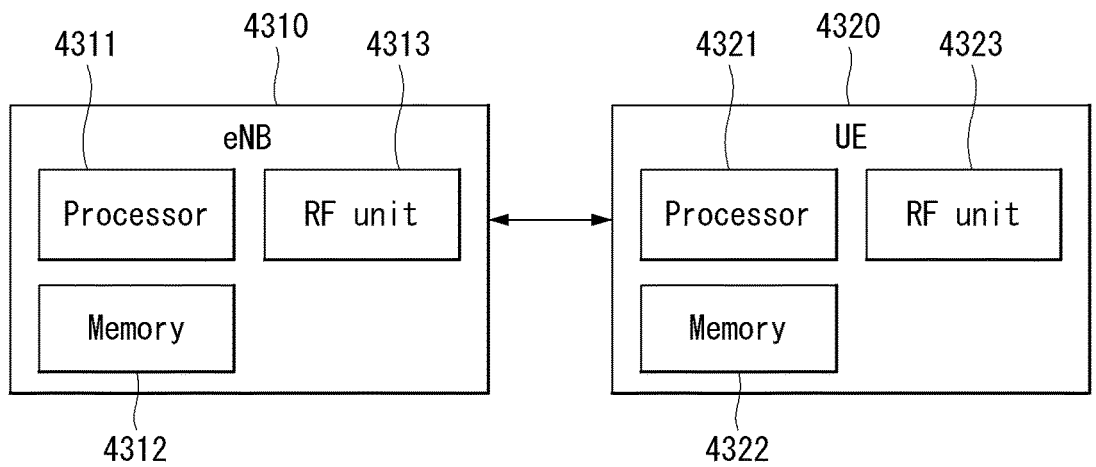
FIG. 43 is a block diagram of a wireless communication apparatus to which methods proposed in the present disclosure can be applied.

FIG. 43 is a block diagram of a wireless communication apparatus to which the methods proposed in the present disclosure are applicable.

Referring to FIG. 43, a wireless communication system includes an eNB 4310 and a plurality of UEs located in the coverage of the eNB.

The eNB and the UEs may be represented as wireless apparatuses.

The eNB 4310 includes a processor 4311, a memory 4312 and a radio frequency (RF) module 4313. The processor 4311 implements functions, processes and/or methods proposed in FIGS. 1 to 12. Wireless interface protocol layers may be realized by the processor. The memory 4312 is connected to the processor and stores various types of information for driving the processor. The RF module 4313 is connected to the processor, transmits and/or receives RF signals.

Each UE includes a processor 4321, a memory 4322 and an RF module 4323.

The processor 4321 implements functions, processes and/or methods proposed in FIGS. 1 to 12. Wireless interface protocol layers may be realized by the processor. The memory is connected to the processor and stores various types of information for driving the processor. The RF module 4323 is connected to the processor, transmits and/or receives RF signals.

The memories 4312 and 4322 may be located inside or outside the processors 4311 and 4321 and connected to the processors through various known means.

Further, the eNB and/or the UE may have a single antenna or multiple antennas.

Figure 44:
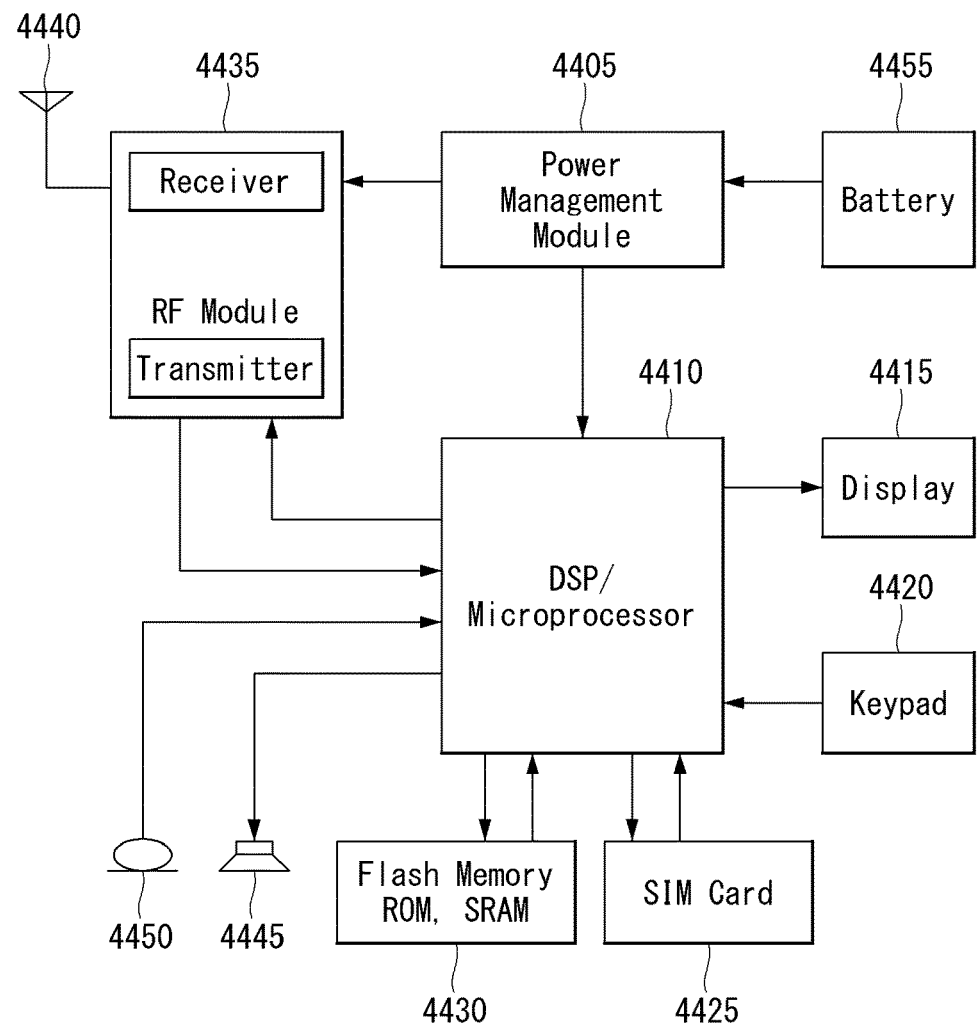
FIG. 44 is a block diagram of a communication apparatus according to an embodiment of the present invention.

FIG. 44 is a block diagram of a communication apparatus according to an embodiment of the present invention.

Particularly, FIG. 44 illustrates the UE shown in FIG. 43 in more detail.

Referring to FIG. 44, the UE may include a processor (or digital signal processor (DSP) 4410, an RF module (or RF unit) 4435, a power management module 4405, an antenna 4440, a battery 4455, a display 4415, a keypad 4420, a memory 4430, a subscriber identification module (SIM) card 4425 (which is optional), a speaker 4445 and a microphone 4450. Further, the UE may include a single antenna or multiple antennas.

The processor 4410 implements functions, processes and/or methods proposed in FIGS. 1 to 12. Wireless interface protocol layers may be realized by the processor.

The memory 4430 is connected to the processor and stores information related to operation of the processor. The memory 4430 may be located inside or outside the processor and connected to the processor through various known means.

A user presses (or touches) a button of the keypad 4420 or inputs command information such as a telephone number according to voice activation using the microphone 4450. The processor receives such command information and executes an appropriate function such as calling using the telephone number. Operational data may be extracted from the SIM card 4425 or the memory 4430. In addition, the processor may display command information or operational information on the display 4415 such that the user recognizes the information for convenience.

The RF module 4435 is connected to the processor, transmits and/or receives RF signals. The processor sends command information to the RF module such that the RF module transmits RF signals constituting voice communication data, for example, in order to start communication. The RF module includes a receiver and a transmitter for receiving and transmitting RF signals. The antenna 4440 transmits and receives RF signals. When an RF signal is received, the RF module may deliver a signal such that the processor processes the signal and convert the signal into a baseband signal. The processed signal may be converted into audible or readable information output through the speaker 4445.

Figure 45:
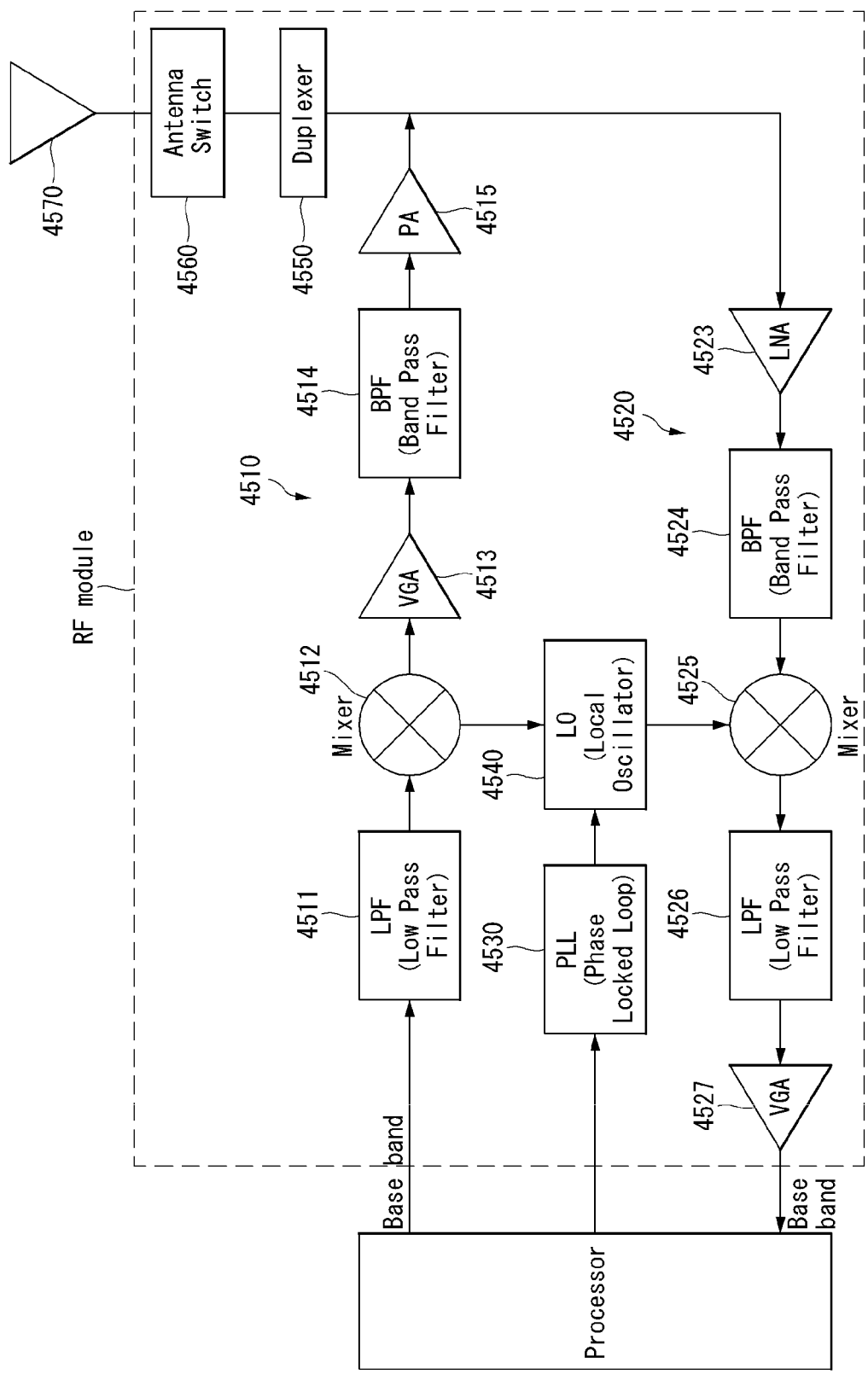
FIG. 45 is a diagram showing an example of an RF module of a wireless communication apparatus to which methods proposed in the present disclosure can be applied.

FIG. 45 is a diagram showing an example of an RF module of a wireless communication apparatus to which the methods proposed in the present disclosure are applicable.

Specifically, FIG. 45 shows an example of an RF module that can be implemented in a frequency division duplex (FDD) system.

First, on a transmission path, the processor described in FIGS. 43 and 44 processes data to be transmitted and provides an analog output signal to a transmitter 4510.

In the transmitter 4510, the analog output signal is filtered through a low pass filter (LPF) 4511 to eliminate images caused by digital-to-analog conversion (ADC), upward converted from baseband to RF through a mixer 4512 and amplified by a variable gain amplifier (VGA) 4513. The amplified signal is filtered by a filter 4514, additionally amplified by a power amplifier (PA) 4515, routed through a duplexers 4550/antenna switches 4560 and transmitted through an antenna 4570.

In addition, on a reception path, the antenna 4570 receives external signals and provides the received signals. These signals are routed through the antenna switches 4560/duplexers 4550 and provided to a receiver 4520.

In the receiver 4520, the received signals are amplified by a low noise amplifier (LNA) 4523, filtered by a bandpass filter 4524 and down converted from RF to baseband through a mixer 4525.

The down converted signals are filtered by an LPF 4526 and amplified by a VGA 4527 to acquire an analog input signal, and the analog input signal is provided to the processor described in FIGS. 43 and 44.

In addition, a local oscillator (LO) generator 4540 generates transmission and reception LO signals and provides them to the mixer 4512 and the mixer 4525.

Further, a phase locked loop (PLL) 4530 receives control information from the processor in order to generate transmission and reception LO signals from appropriate frequencies and provides control signals to the LO generator 4540.

In addition, the circuits shown in FIG. 45 may be arranged differently from the configuration shown in FIG. 45.

Figure 46:
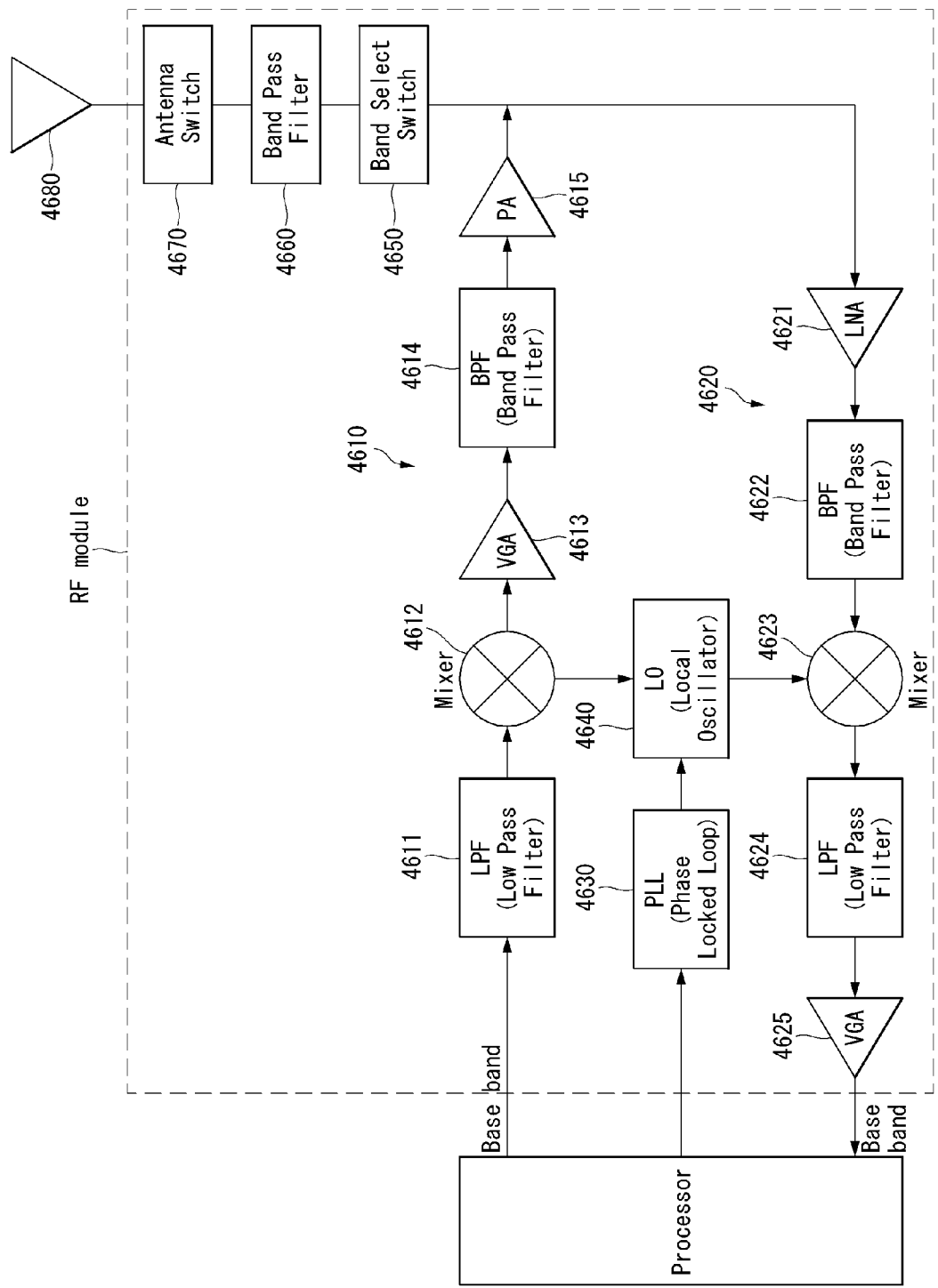
FIG. 46 is a diagram showing another example of an RF module of a wireless communication apparatus to which methods proposed in the present disclosure can be applied.

FIG. 46 is a diagram showing another example of an RF module of a wireless communication apparatus to which the methods proposed in the present disclosure are applicable.

Specifically, FIG. 46 shows an example of an RF module that can be implemented in a time division duplex (TDD) system.

A transmitter 4610 and a receiver 4620 of an RF module in a TDD system have the same configurations as those of the transmitter and the receiver of the RF module in the FDD system.

Hereinafter, only a difference between the RF module of the TDD system and the RF module of the FDD system will be described and description with reference to FIG. 45 will be referred to for the same configuration.

A signal amplified by a power amplifier (PA) 4615 of the transmitter is routed through a band select switch 4550, a bandpass filter 4660 and antenna switches 4670 and transmitted through an antenna 4680.

In addition, on a reception path, the antenna 4680 receives external signals and provides the received signals. These signals are routed through the antenna switches 4670, the bandpass filter 4660 and the band select switch 4650 and provided to the receiver 4620.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the present invention has been described on the basis of examples applied to 3GPP LTE/LTE-A system and 5G system (New RAT system), the present invention can also be applied to various wireless communication systems.

The invention claimed is:

1. A method of reporting, by a user equipment (UE), channel state information (CSI) in a wireless communication system, the method comprising:
   receiving, from a base station (BS), configuration information related to a channel state information reference signal (CSI-RS) resource;
   receiving, from the BS, a 32-port CSI-RS on the CSI-RS resource including 8 CSI-RS resource element (RE) patterns; and
   reporting, to the BS, the CSI based on the 32-port CSI-RS,
   wherein the configuration information comprises (i) information for a code division multiplexing (CDM) type that is set to CDM4, (ii) information for a number of antenna ports that is set to 32, (iii) time location information related to the 8 CSI-RS RE patterns, and (iv) frequency location information related to the 8 CSI-RS RE patterns, and
   wherein locations of the 8 CSI-RS RE patterns are determined based on 4 frequency location values and 2 time location values.

2. The method of claim 1, wherein four CSI-RS RE patterns exist in a first resource region and a second resource region, respectively.

3. The method of claim 2, wherein starting subcarrier locations of four CSI-RS RE patterns included in each resource region are different from each other, and starting symbol locations of the four CSI-RS RE patterns are the same.

4. The method of claim 2, wherein a starting subcarrier location of a first CSI-RS RE pattern included in the first resource region and a starting subcarrier location of a second CSI-RS RE pattern included in the second resource region are the same.

5. The method of claim 1, wherein starting subcarrier locations of the one or more CSI-RS RE patterns are represented as a bitmap.

6. The method of claim 1, further comprising:
   receiving, from the BS, tracking reference signal (TRS) information representing whether the CSI-RS is used for a time and frequency tracking.

7. The method of claim 6, wherein the TRS information is configured such that the CSI-RS is not used for the time and frequency tracking.

8. A user equipment (UE) configured to report channel state information (CSI) in a wireless communication system, the UE comprising:
   a transceiver configured to transmit and receive a wireless signal;
   at least one processor; and
   at least one computer memory operably connectable to the at least one processor and storing instructions that, when executed by the at least one processor, perform operations comprising:
   receiving, from a base station (BS) through the transceiver, configuration information related to a channel state information reference signal (CSI-RS) resource including 8 CSI-RS resource element (RE) patterns;
   receiving, from the BS through the transceiver, a 32-port CSI-RS on the CSI-RS resource; and
   reporting, to the BS through the transceiver, the CSI based on the 32-port CSI-RS,
   wherein the configuration information comprises (i) information for a code division multiplexing (CDM) type that is set to CDM4, (ii) information for a number of antenna ports that is set to 32, (iii) time location information related to the 8 CSI-RS RE patterns, and (iv) frequency location information related to the 8 CSI-RS RE patterns, and
   wherein locations of the 8 CSI-RS RE patterns are determined based on 4 frequency location values and 2 time location values.

9. The UE of claim 8, wherein four CSI-RS RE patterns exist in a first resource region and a second resource region, respectively.

10. The UE of claim 9, wherein starting subcarrier locations of four CSI-RS RE patterns included in each resource region are different from each other, and starting symbol locations of the four CSI-RS RE patterns are the same.

11. The UE of claim 9, wherein a starting subcarrier location of a first CSI-RS RE pattern included in the first resource region and a starting subcarrier location of a second CSI-RS RE pattern included in the second resource region are the same.

12. The UE of claim 8, wherein starting subcarrier locations of the one or more CSI-RS RE patterns are represented as a bitmap.

13. The UE of claim 8, wherein the operations further comprise:
   receiving, from the BS through the transceiver, tracking reference signal (TRS) information representing whether the CSI-RS is used for a time and frequency tracking.

14. The UE of claim 13, wherein the TRS information is configured such that the CSI-RS is not used for the time and frequency tracking.

* * * * *